AT 175°

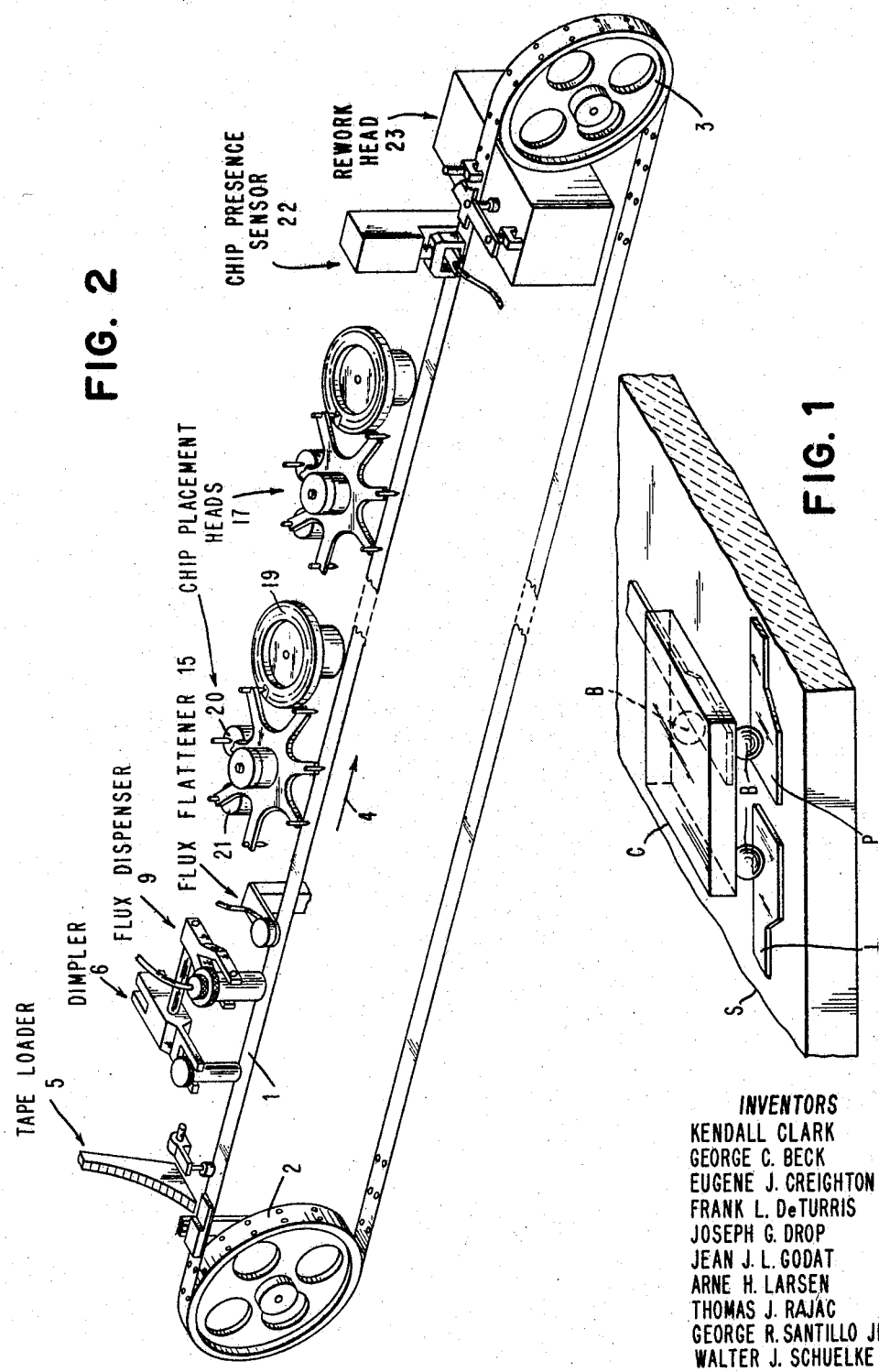

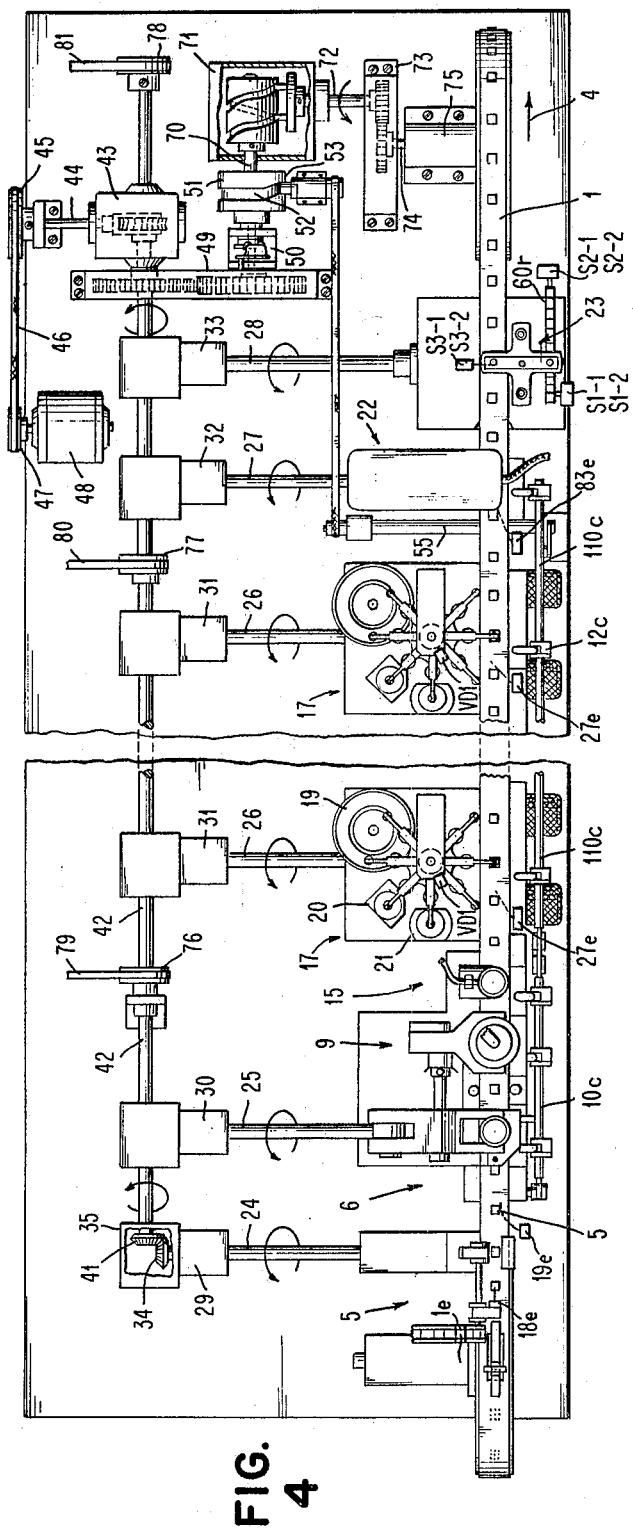

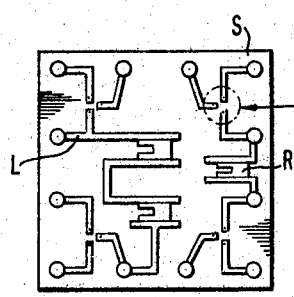
FIG. 6 DIMPLING
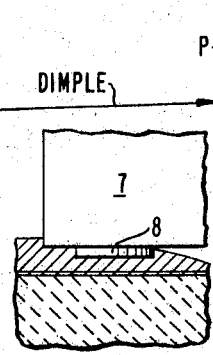
FIG. 8
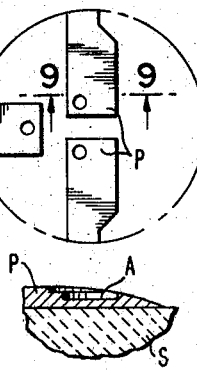
FIG. 7
FIG. 9
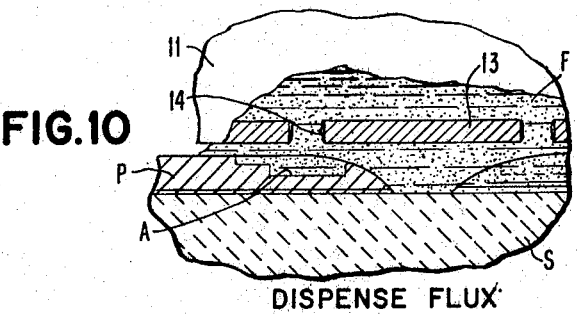
FIG. 10 DISPENSE FLUX
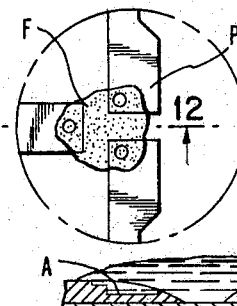
FIG. 11
FIG. 12
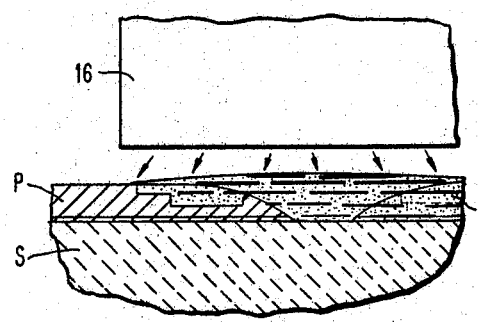
FIG. 13 FLATTEN FLUX
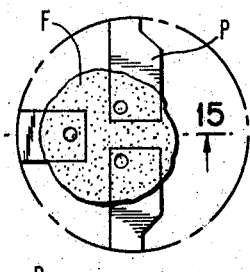
FIG. 14
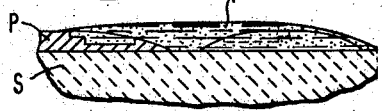
FIG. 15
FIG. 17
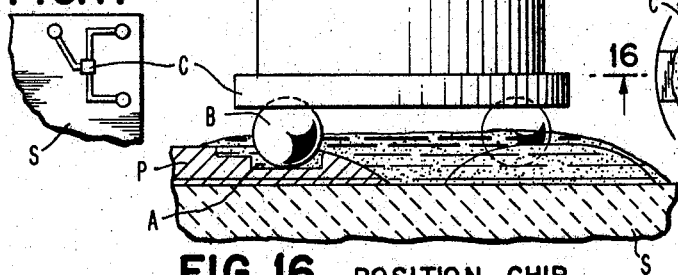
FIG. 16 POSITION CHIP
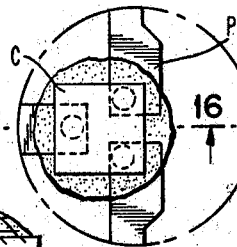
FIG. 18

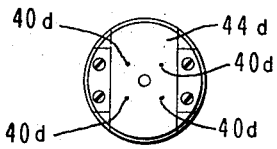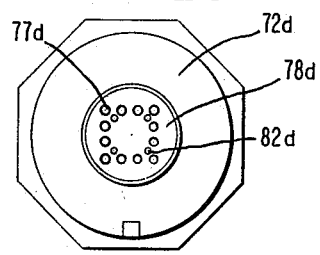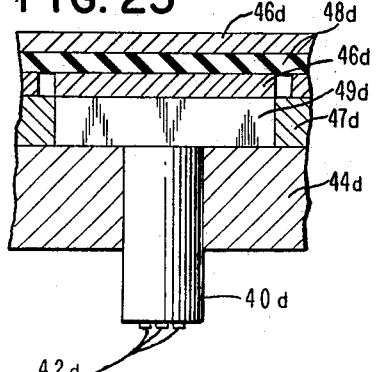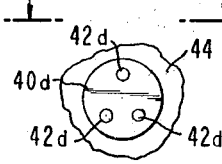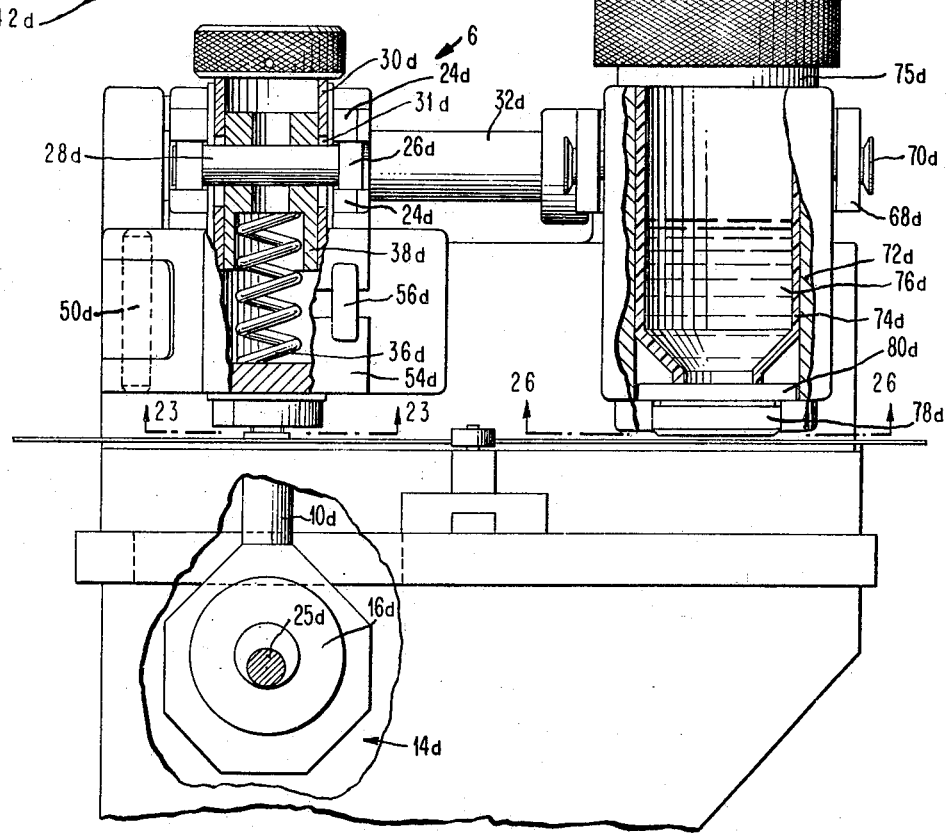

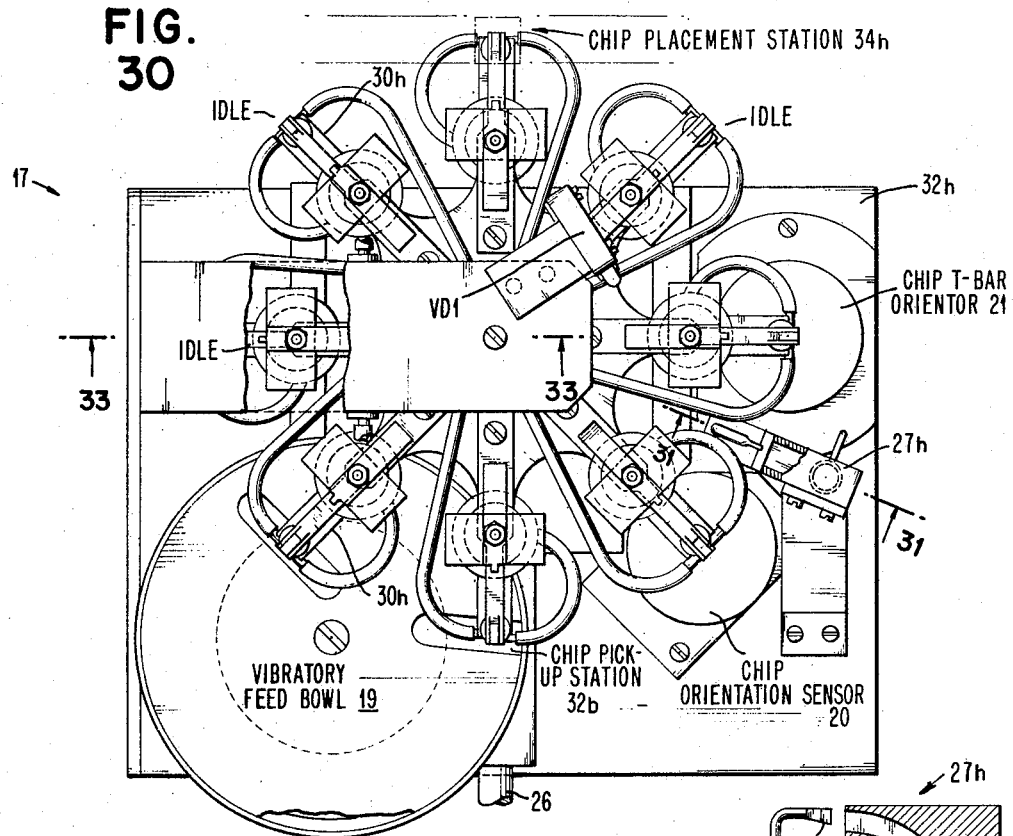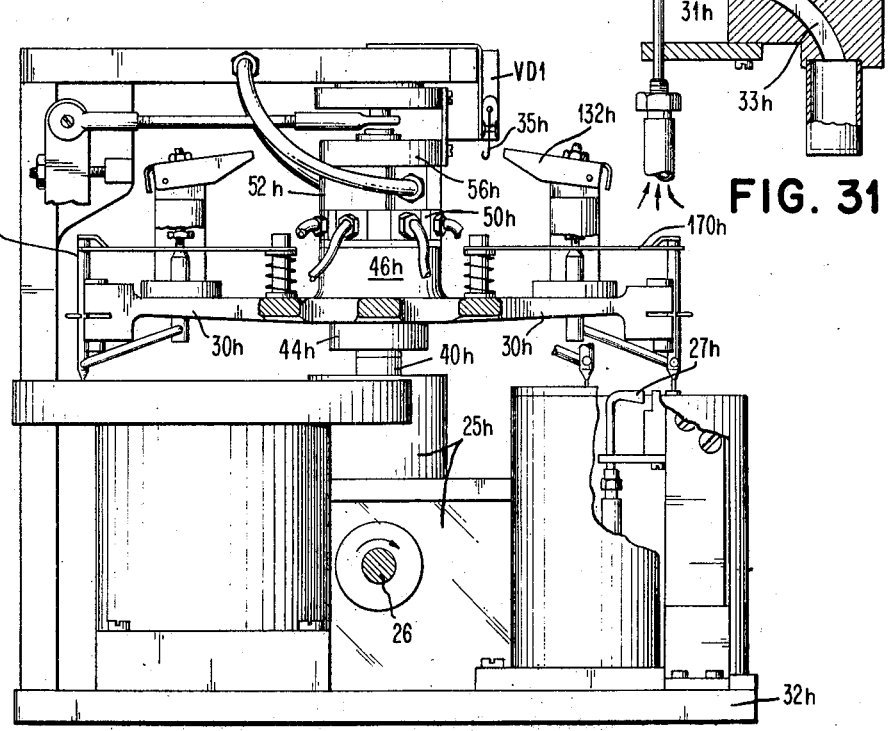

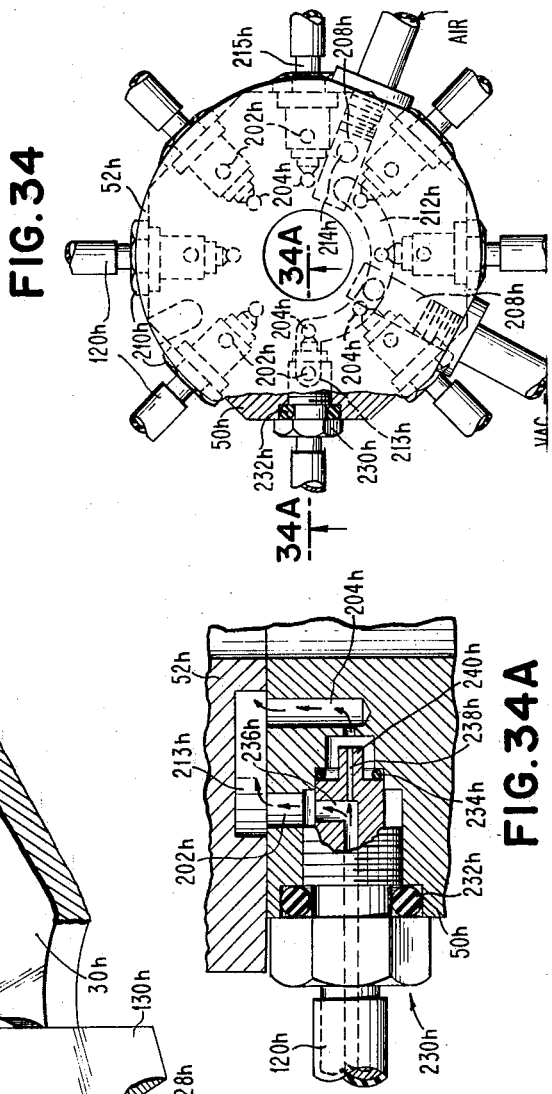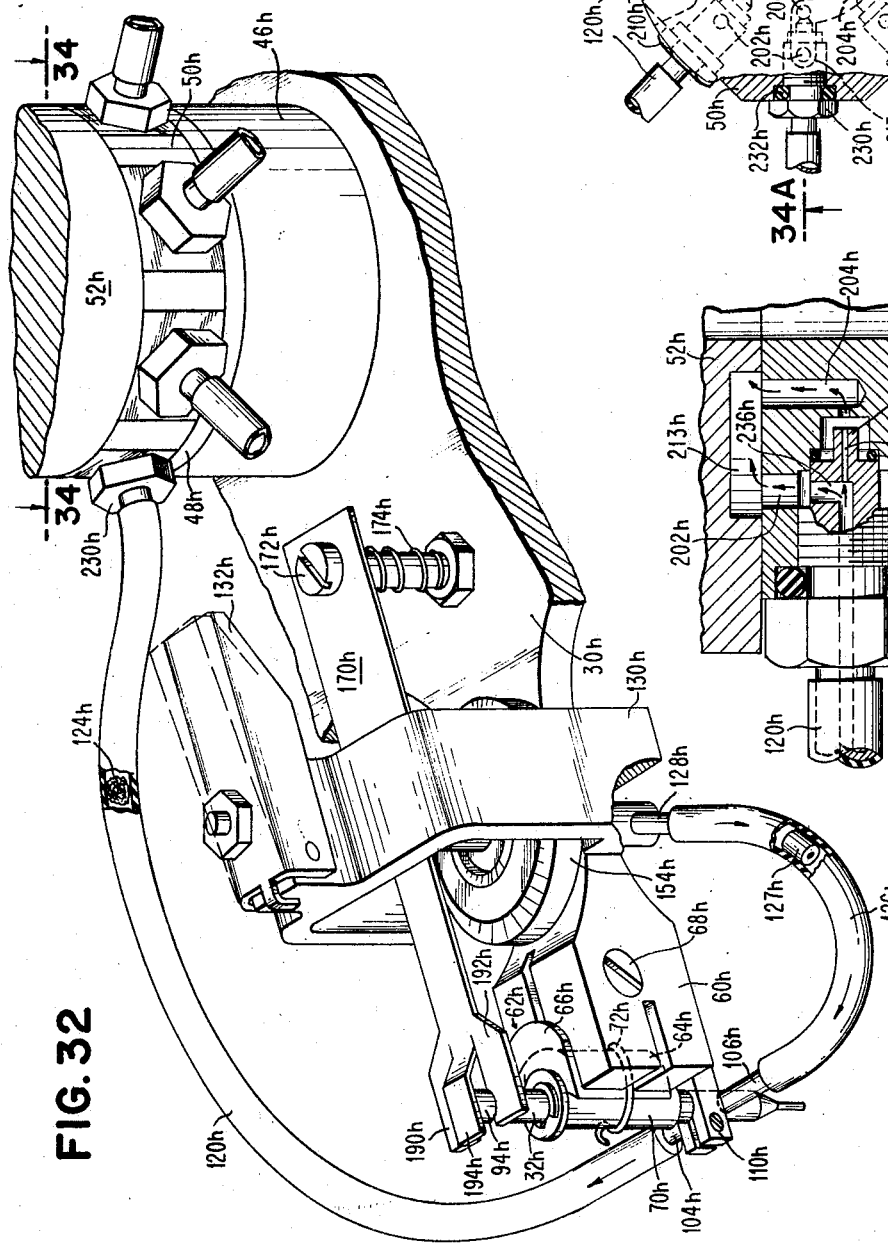

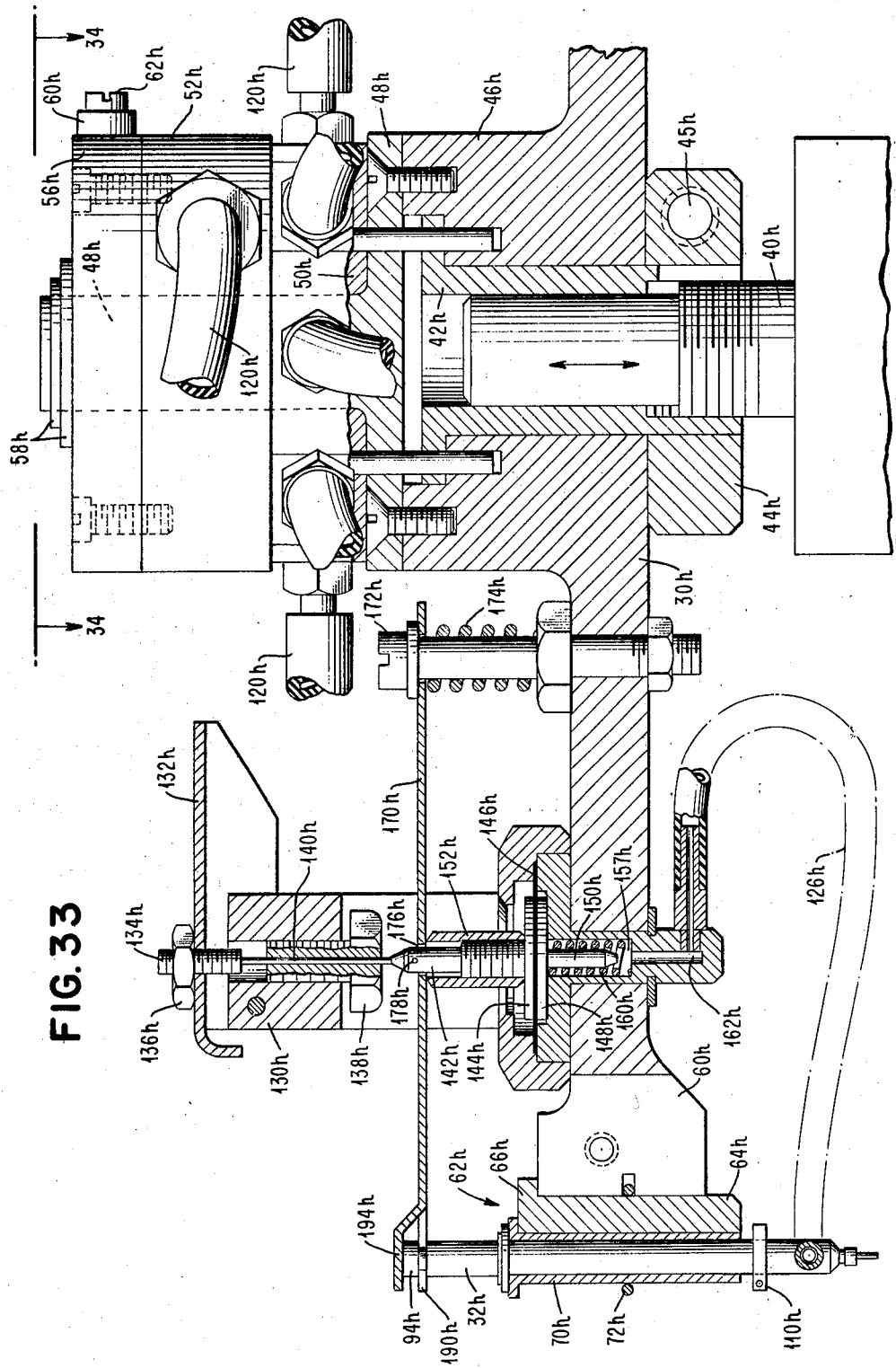

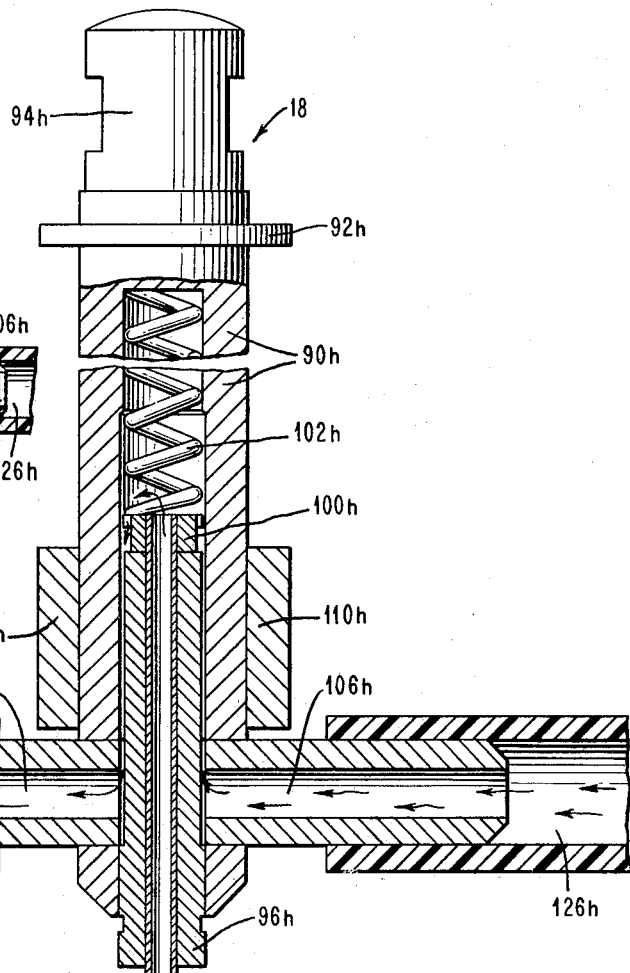
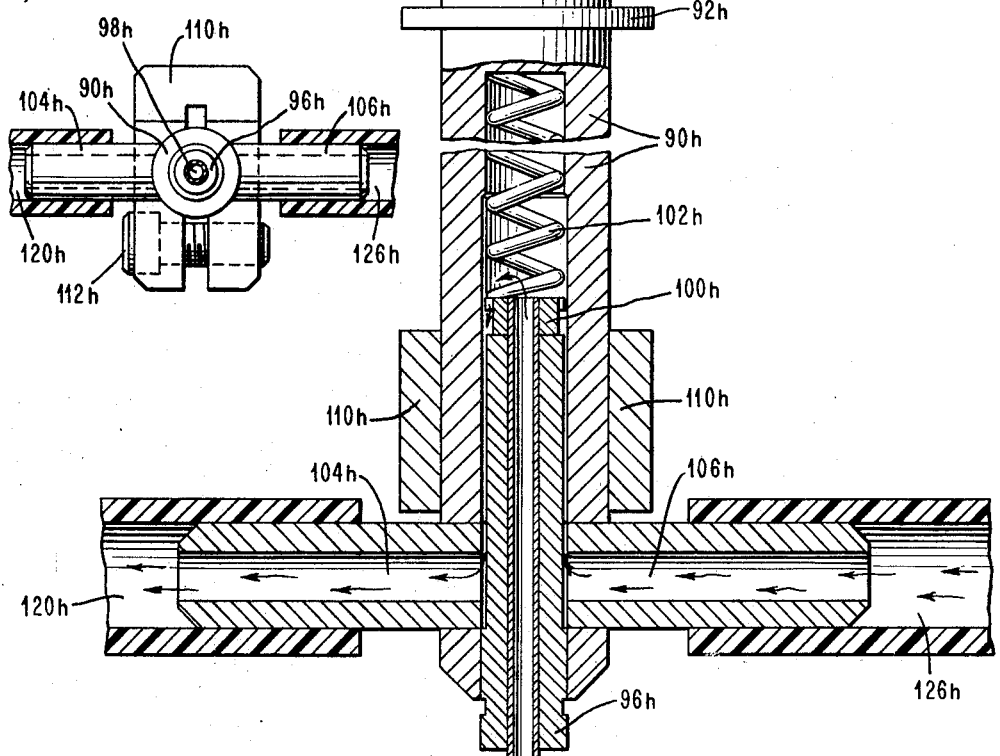
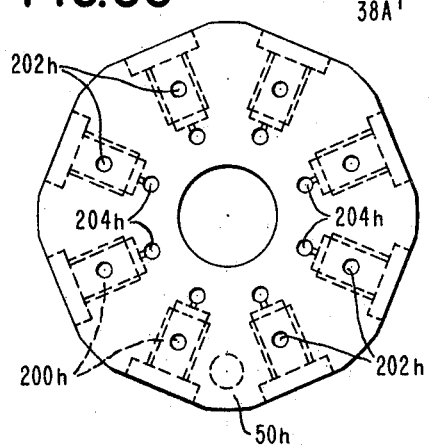
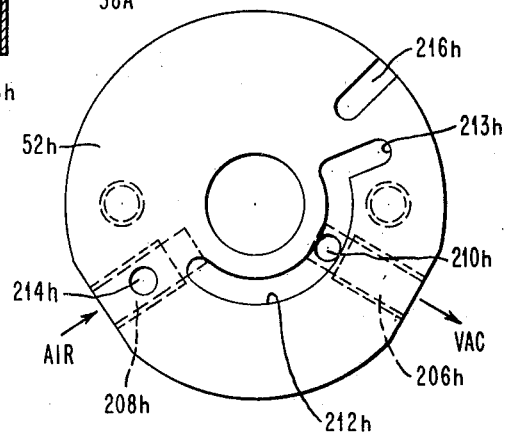

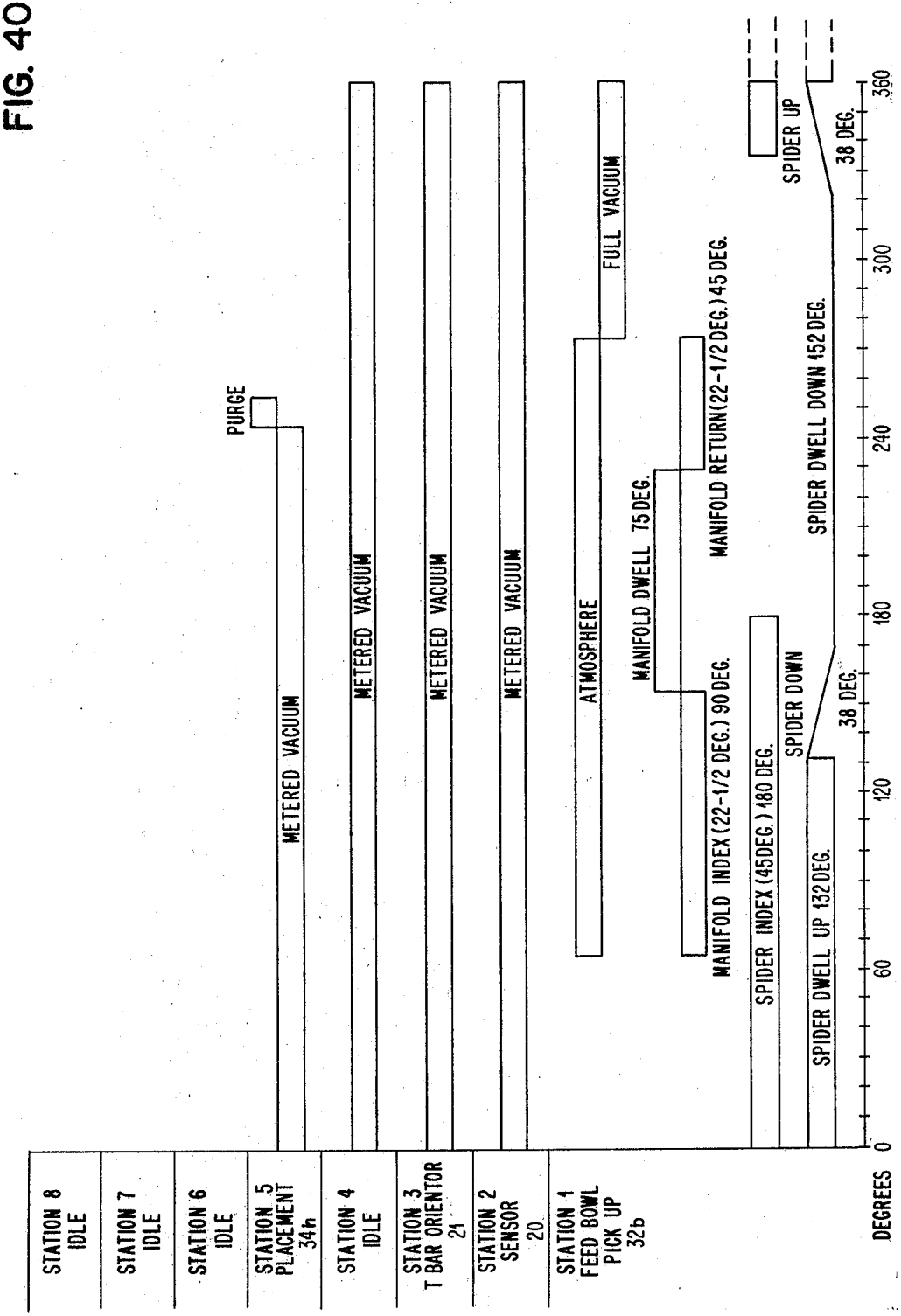

AT 275°

AT 675°

AT 155°

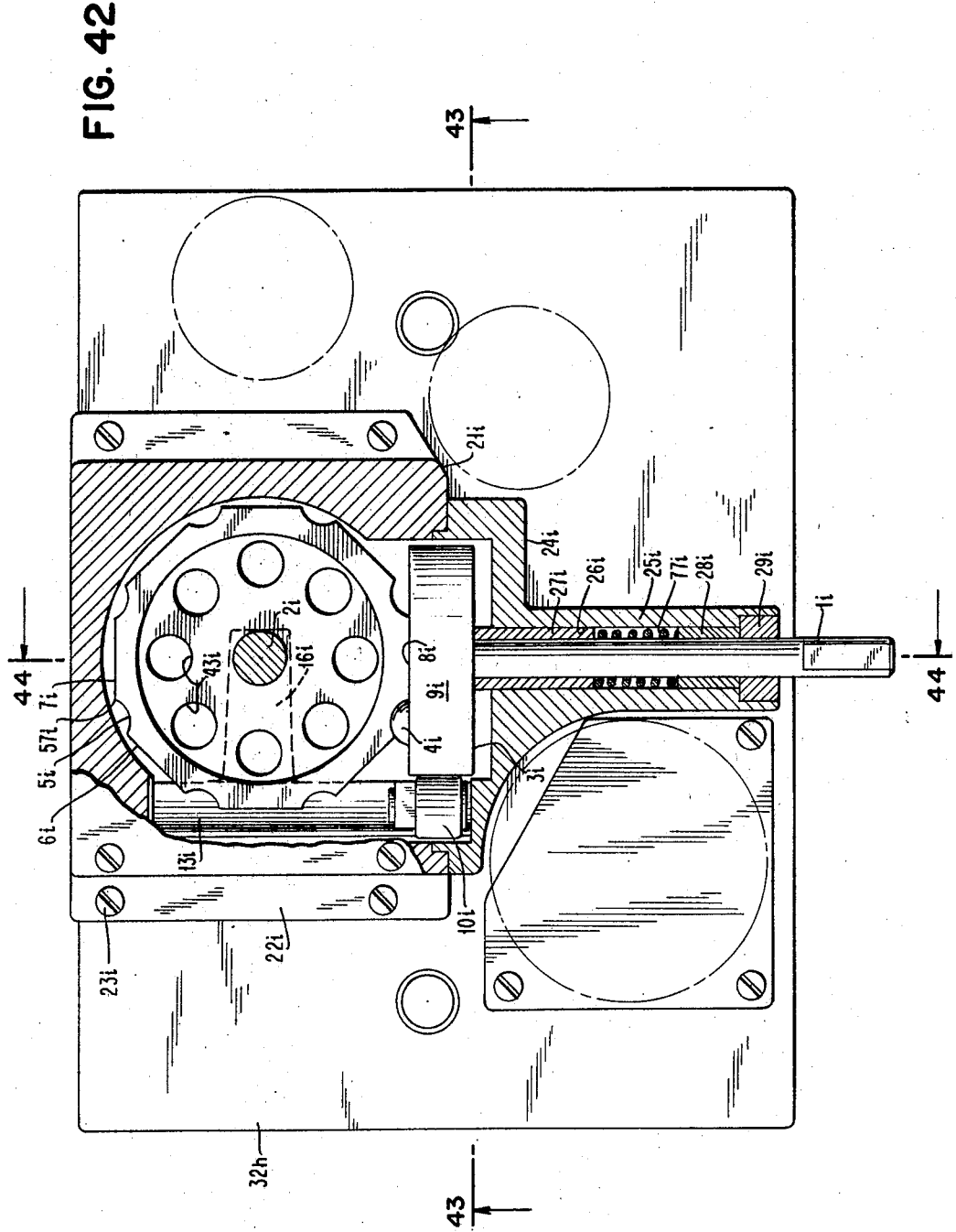

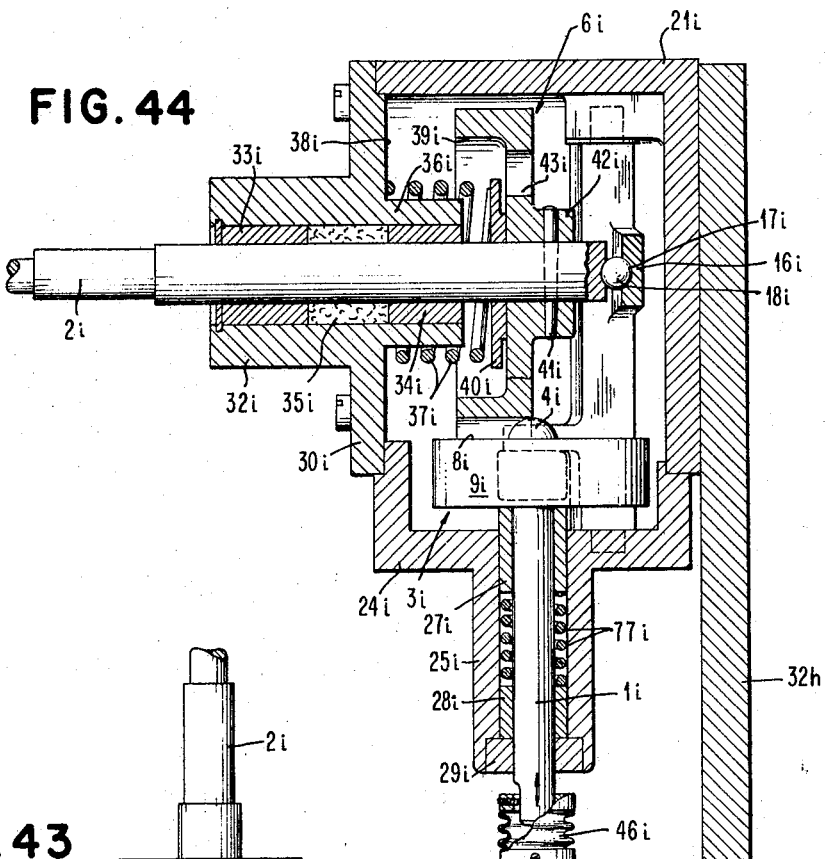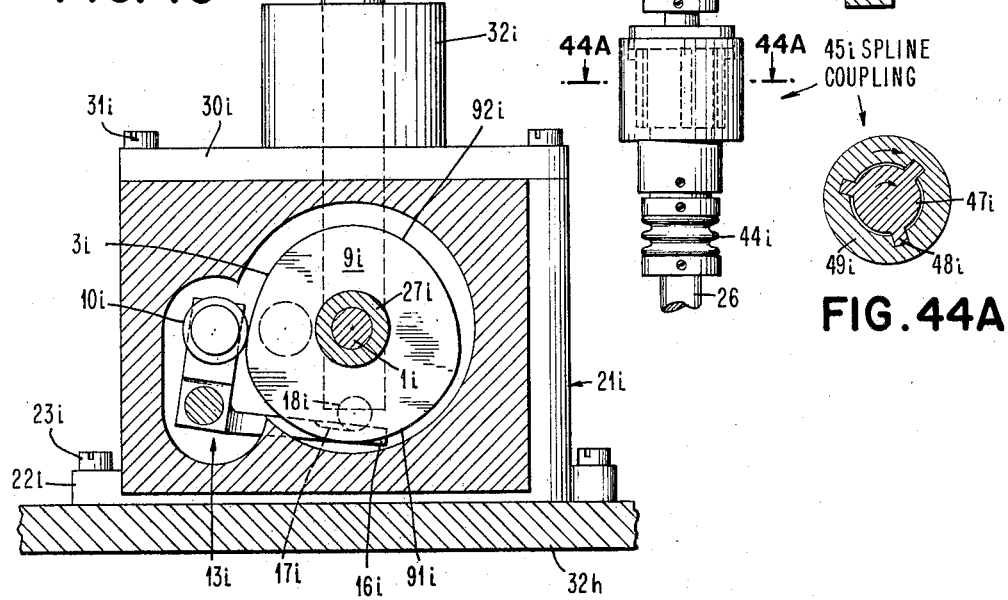

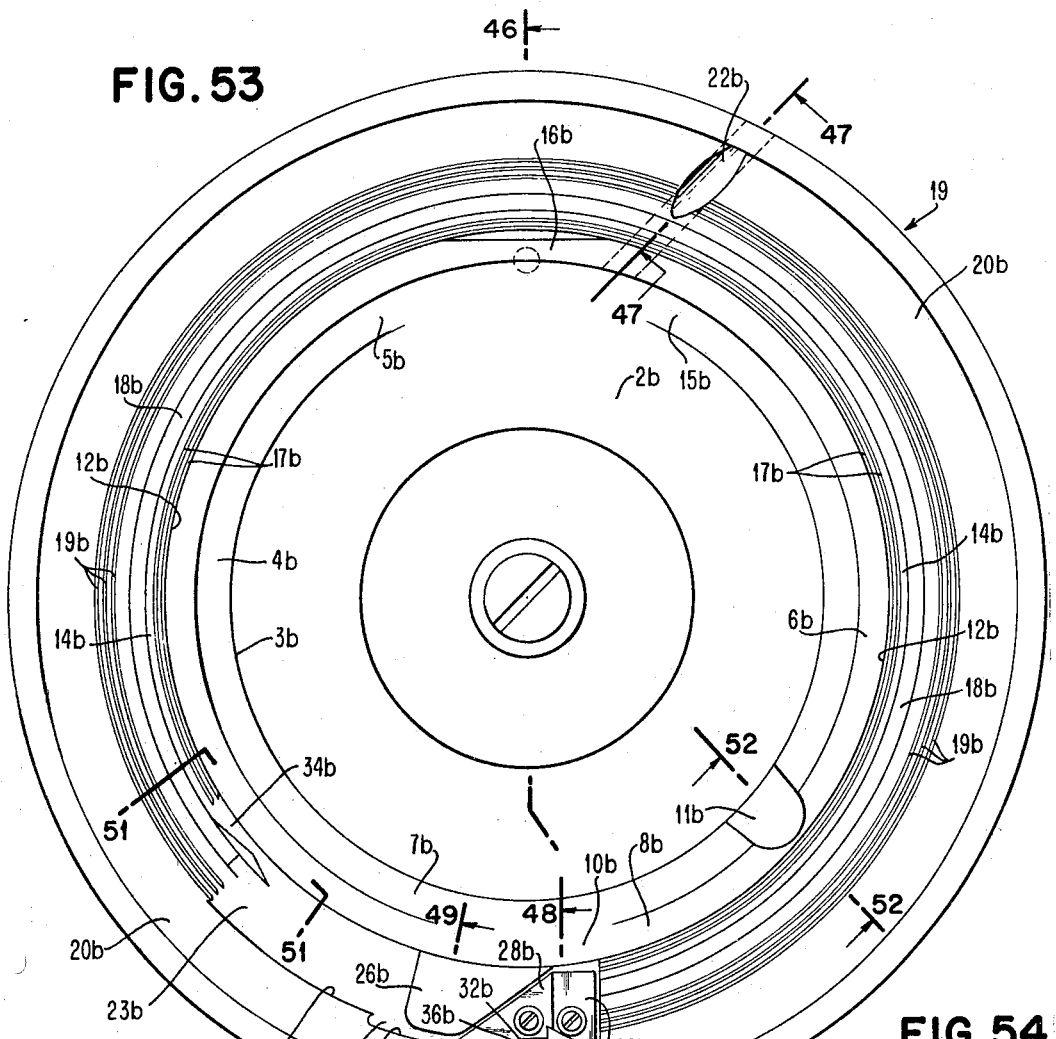
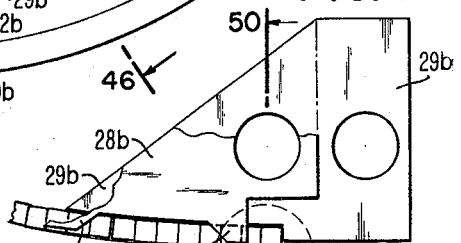
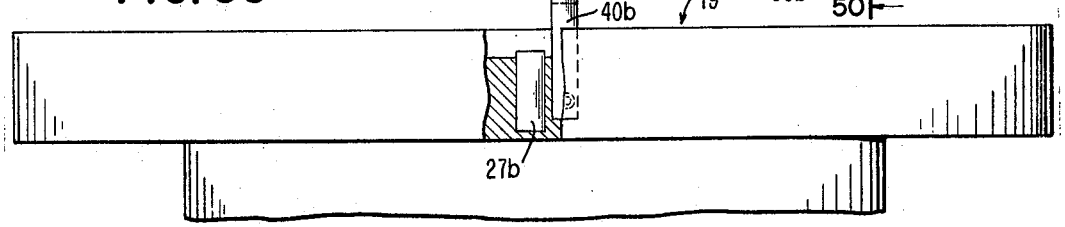

March 10, 1970     K. CLARK ET AL     3,499,203
CHIP POSITIONING MACHINE
Filed May 27, 1965     46 Sheets-Sheet 23

March 10, 1970 K. CLARK ET AL 3,499,203
CHIP POSITIONING MACHINE
Filed May 27, 1965 46 Sheets-Sheet 24
FIG. 65
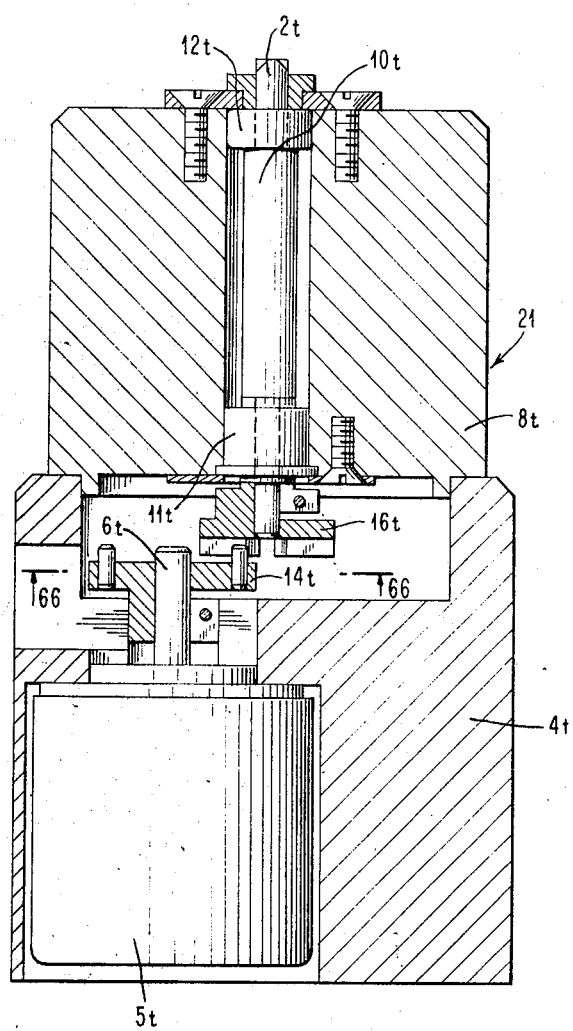
FIG. 66
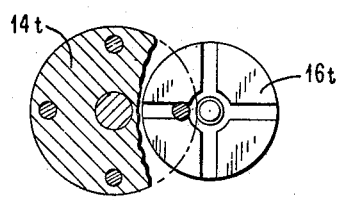
FIG. 62
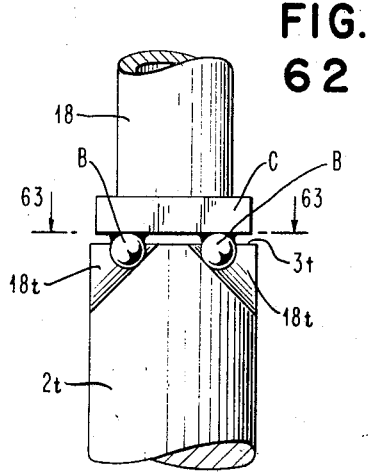
FIG. 63
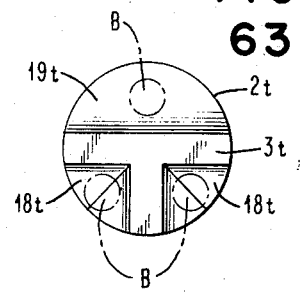
FIG. 64

FIG. 67
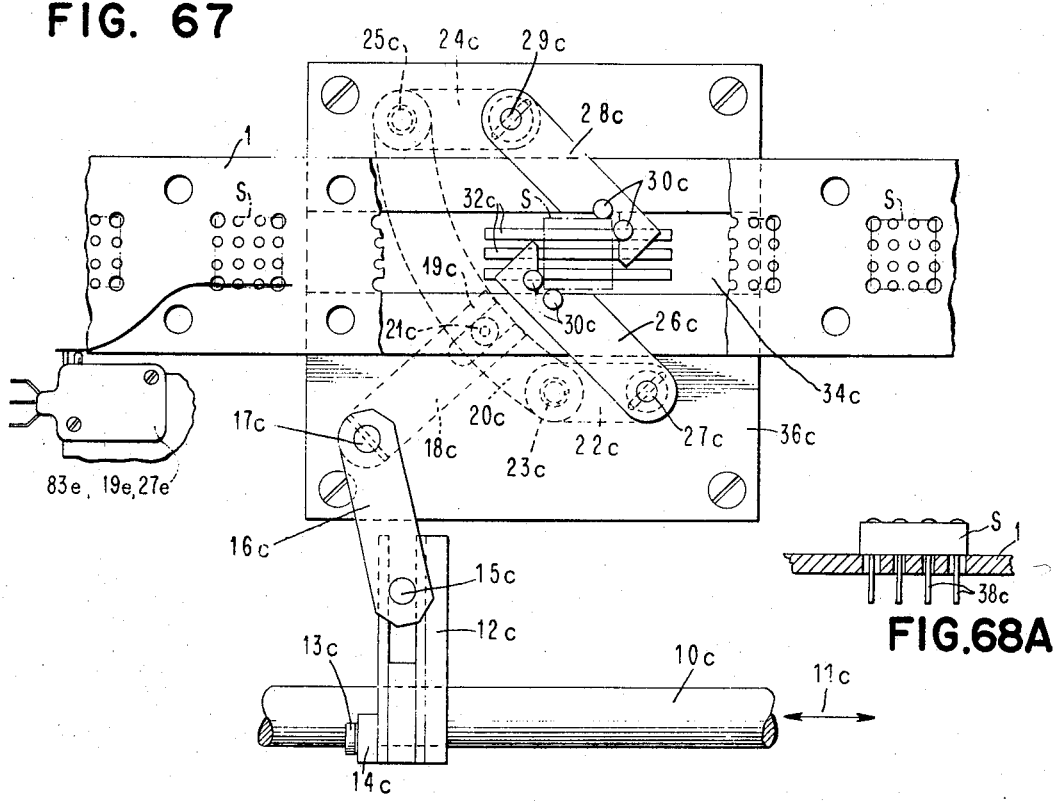
FIG. 68A
FIG. 68
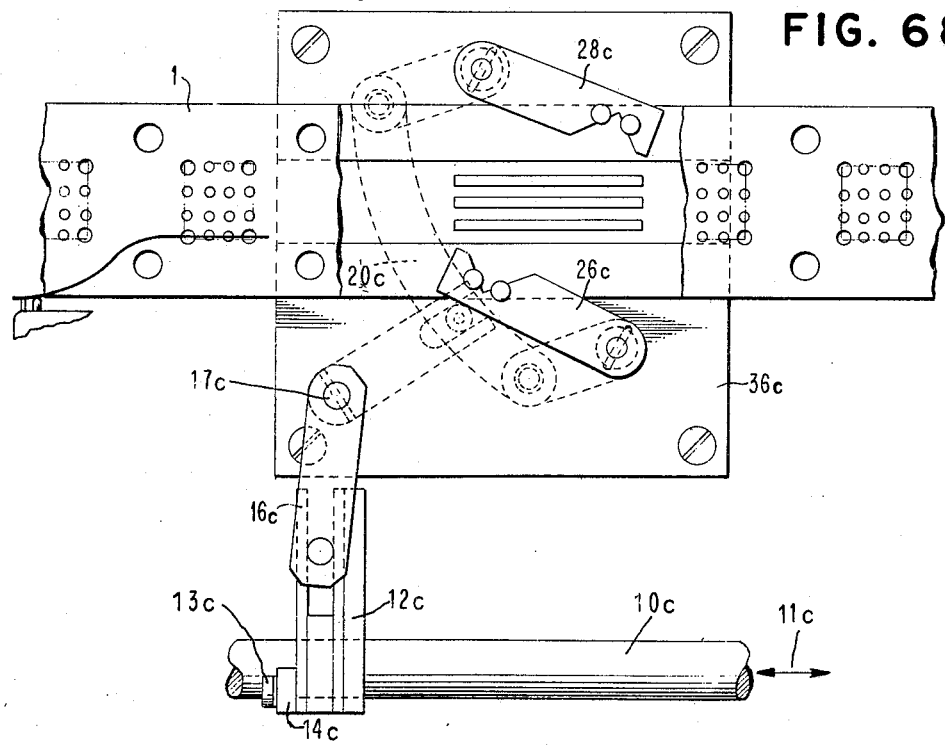

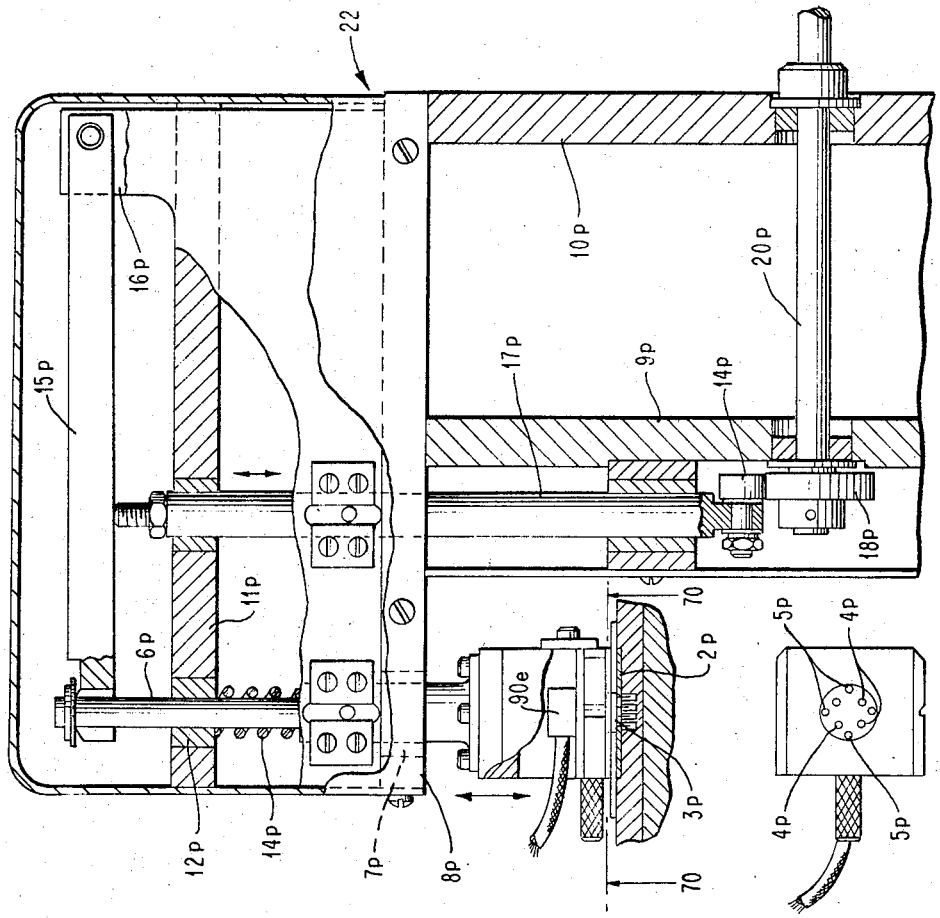
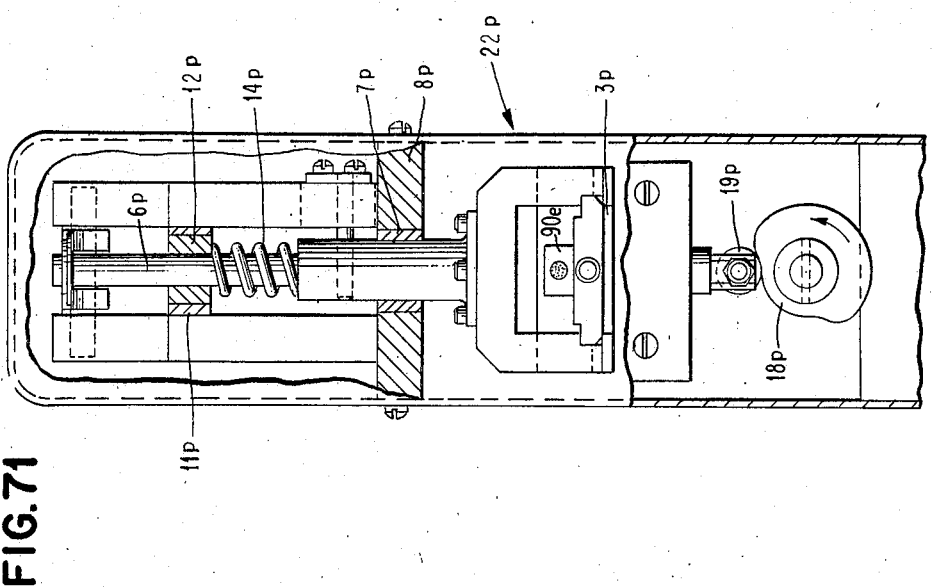

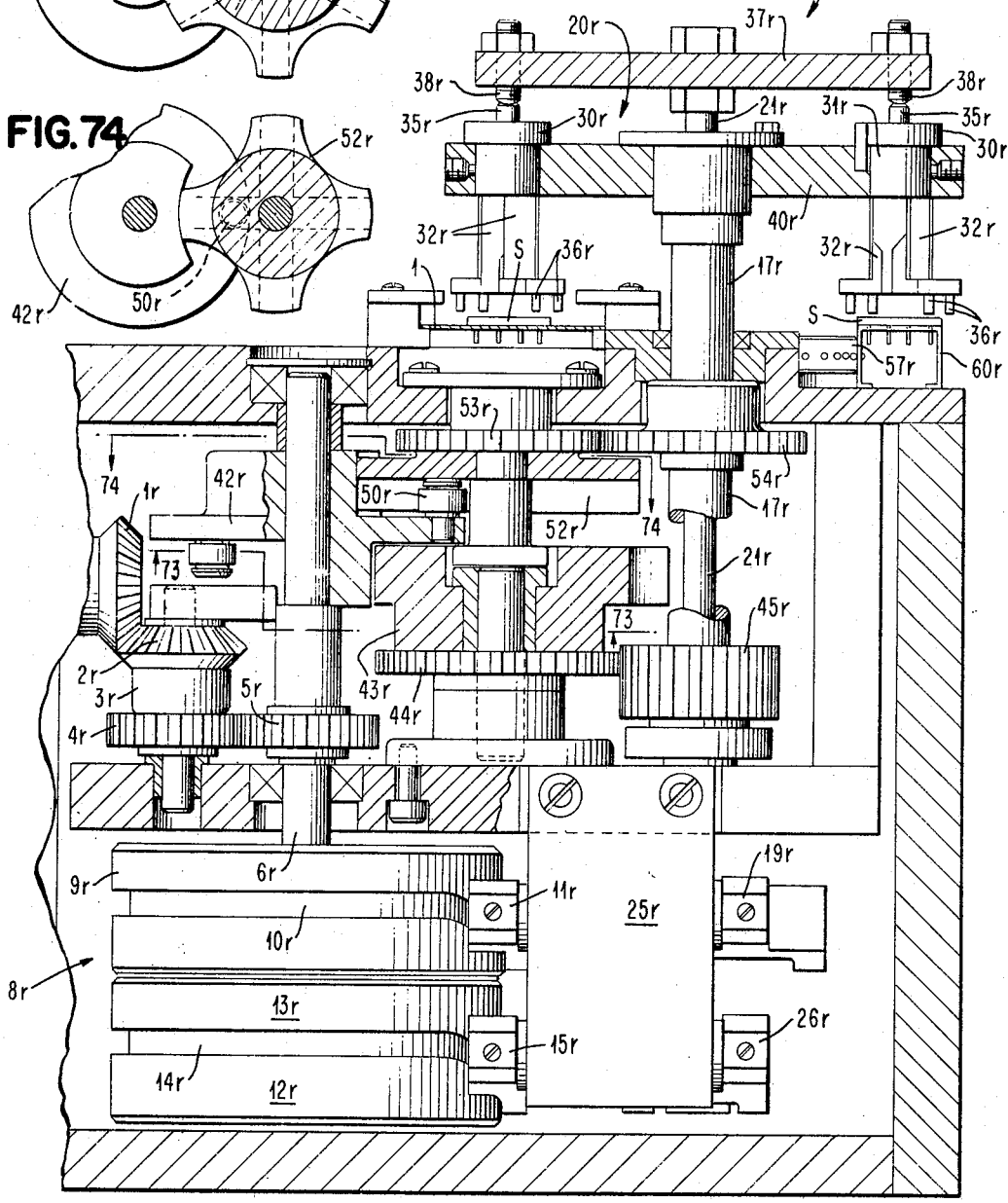

March 10, 1970 K. CLARK ET AL 3,499,203
CHIP POSITIONING MACHINE
Filed May 27, 1965 46 Sheets-Sheet 28

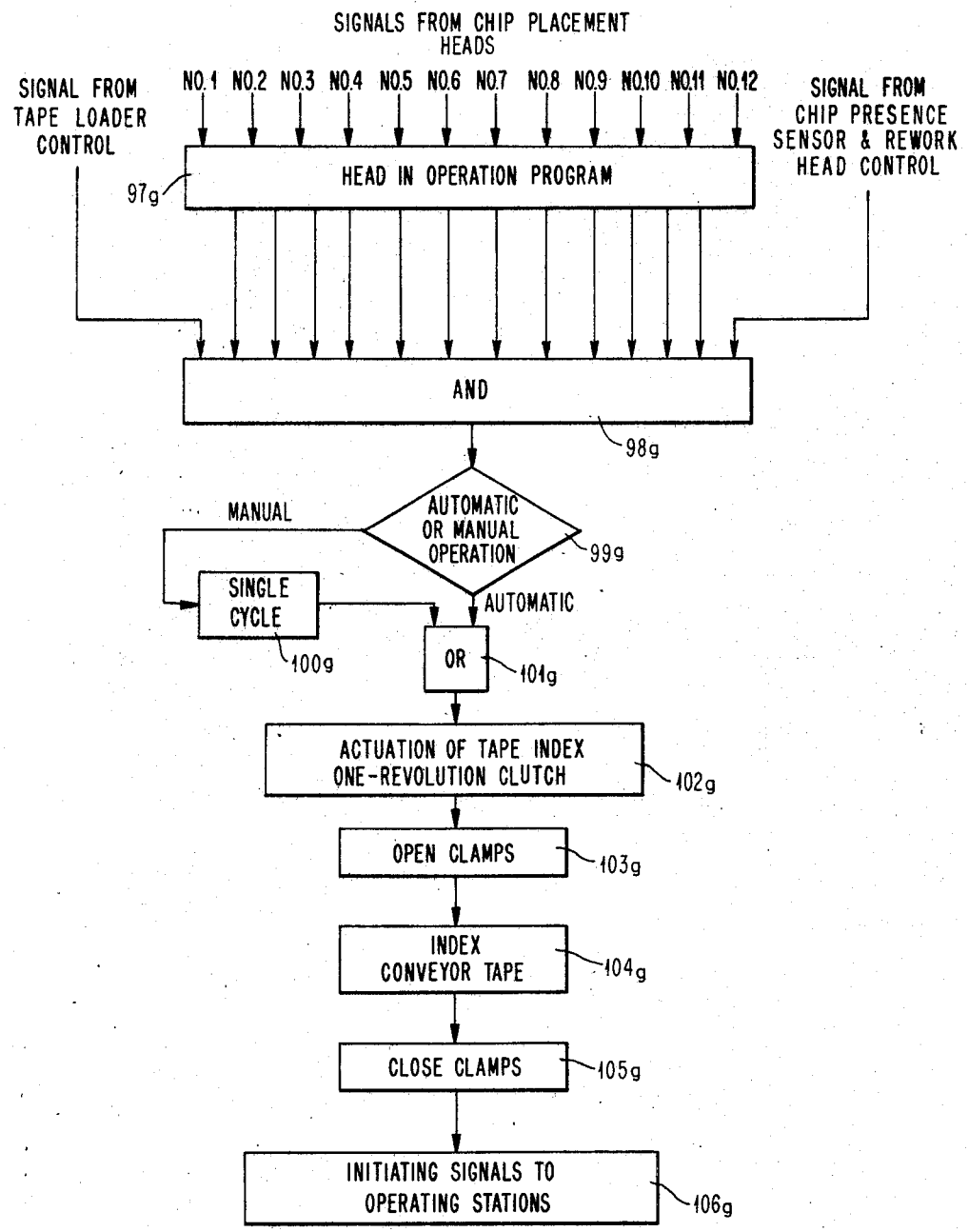

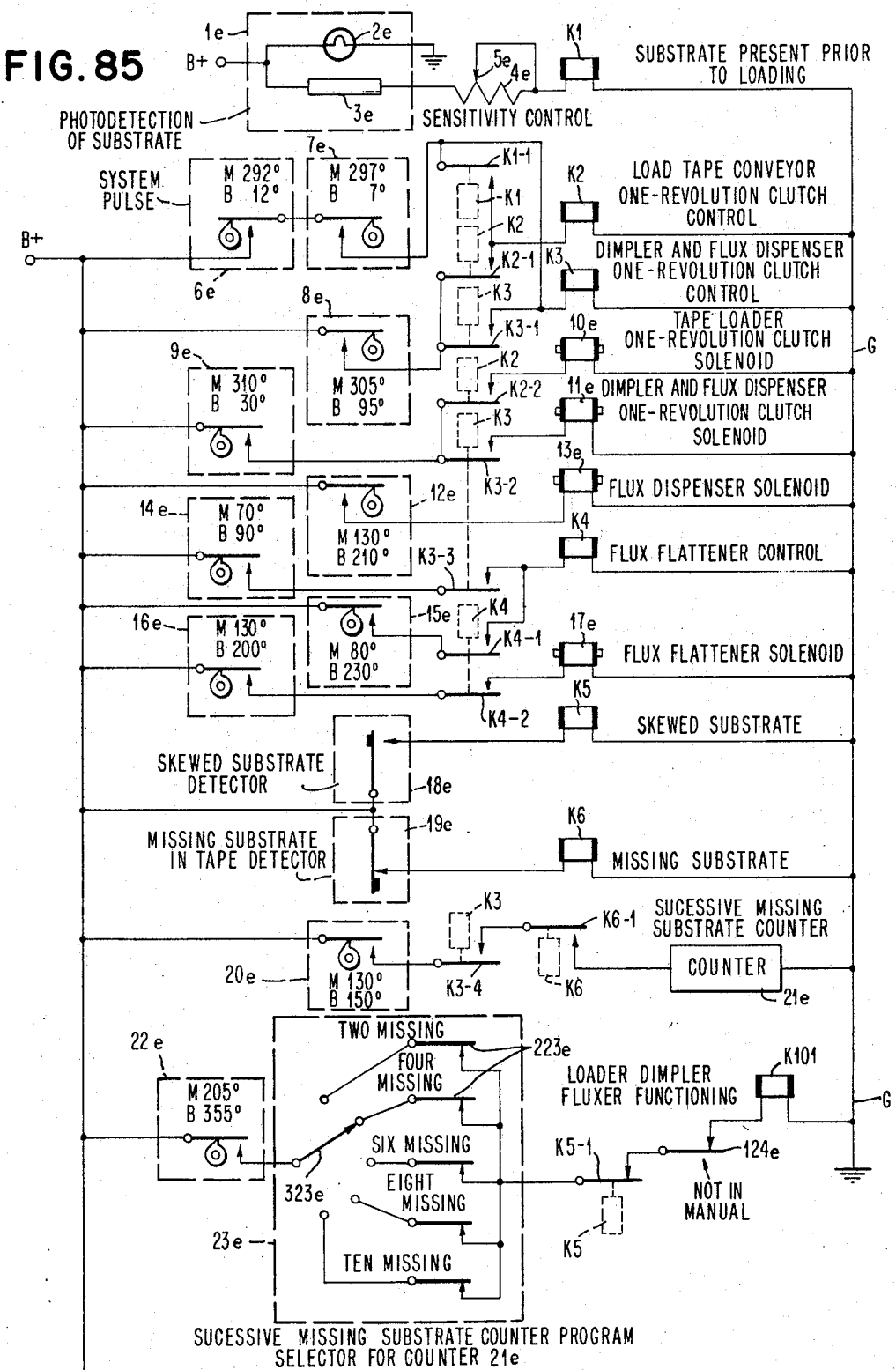

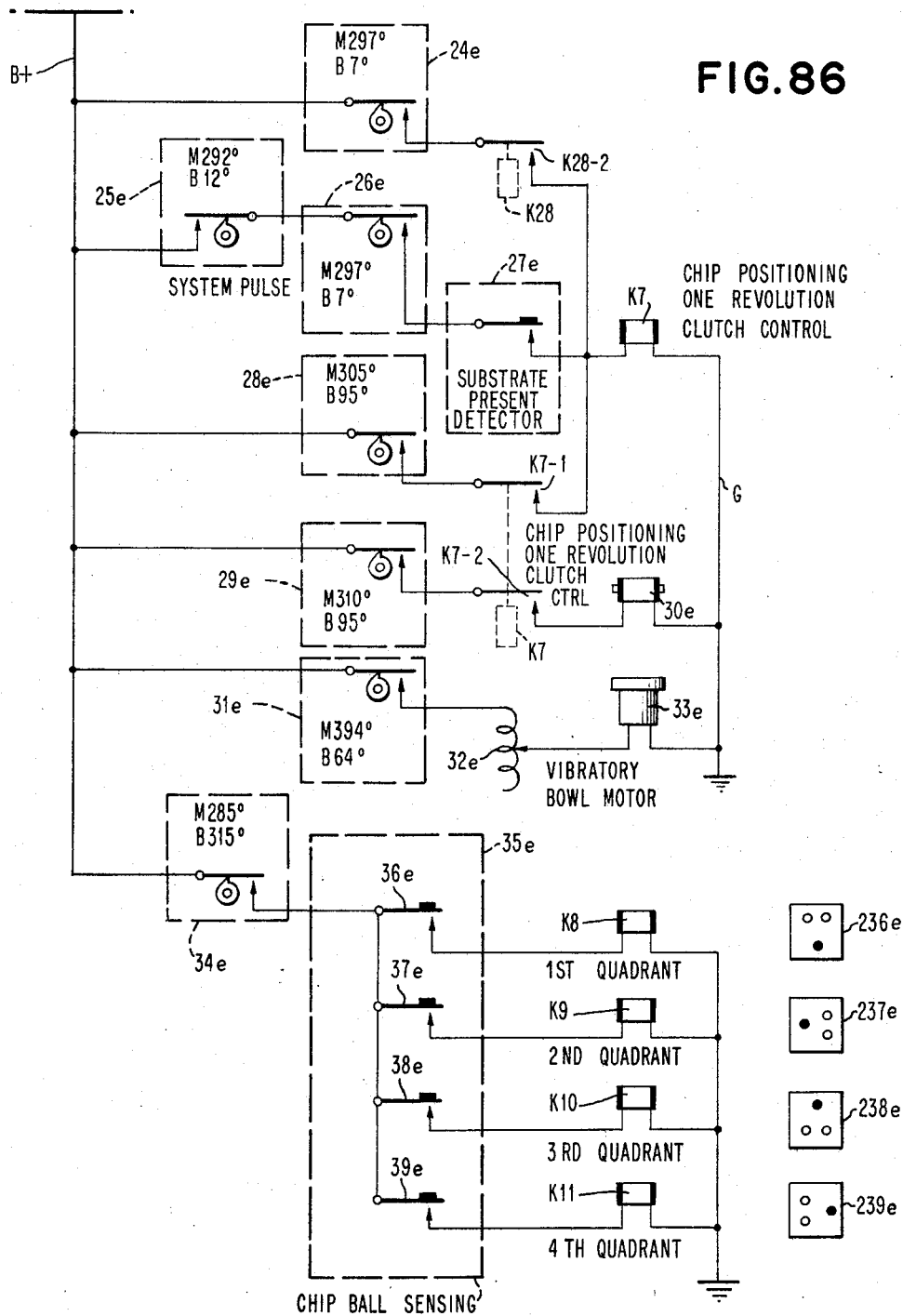

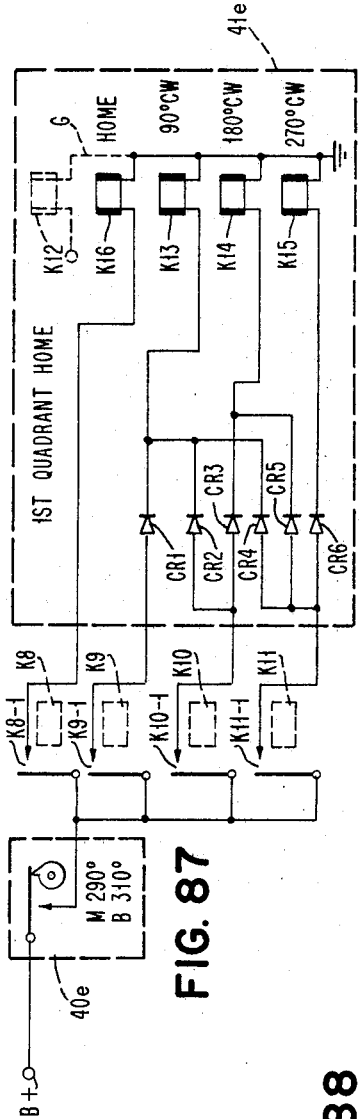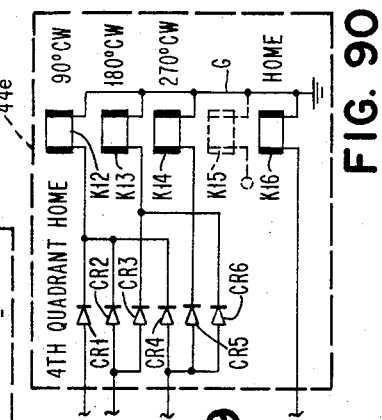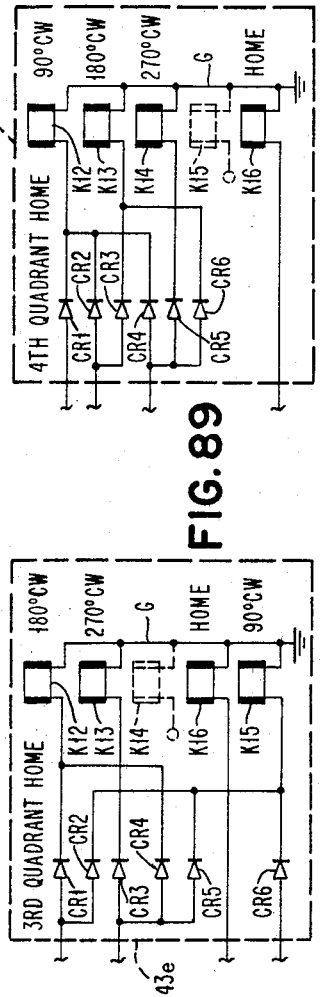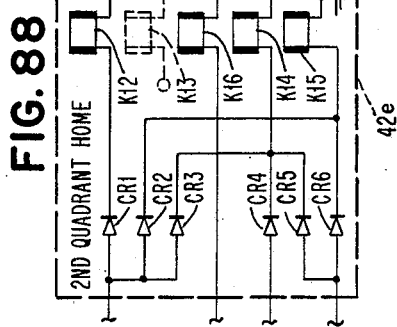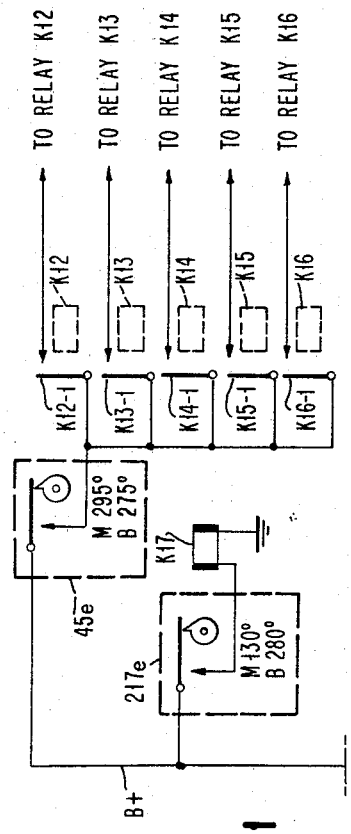

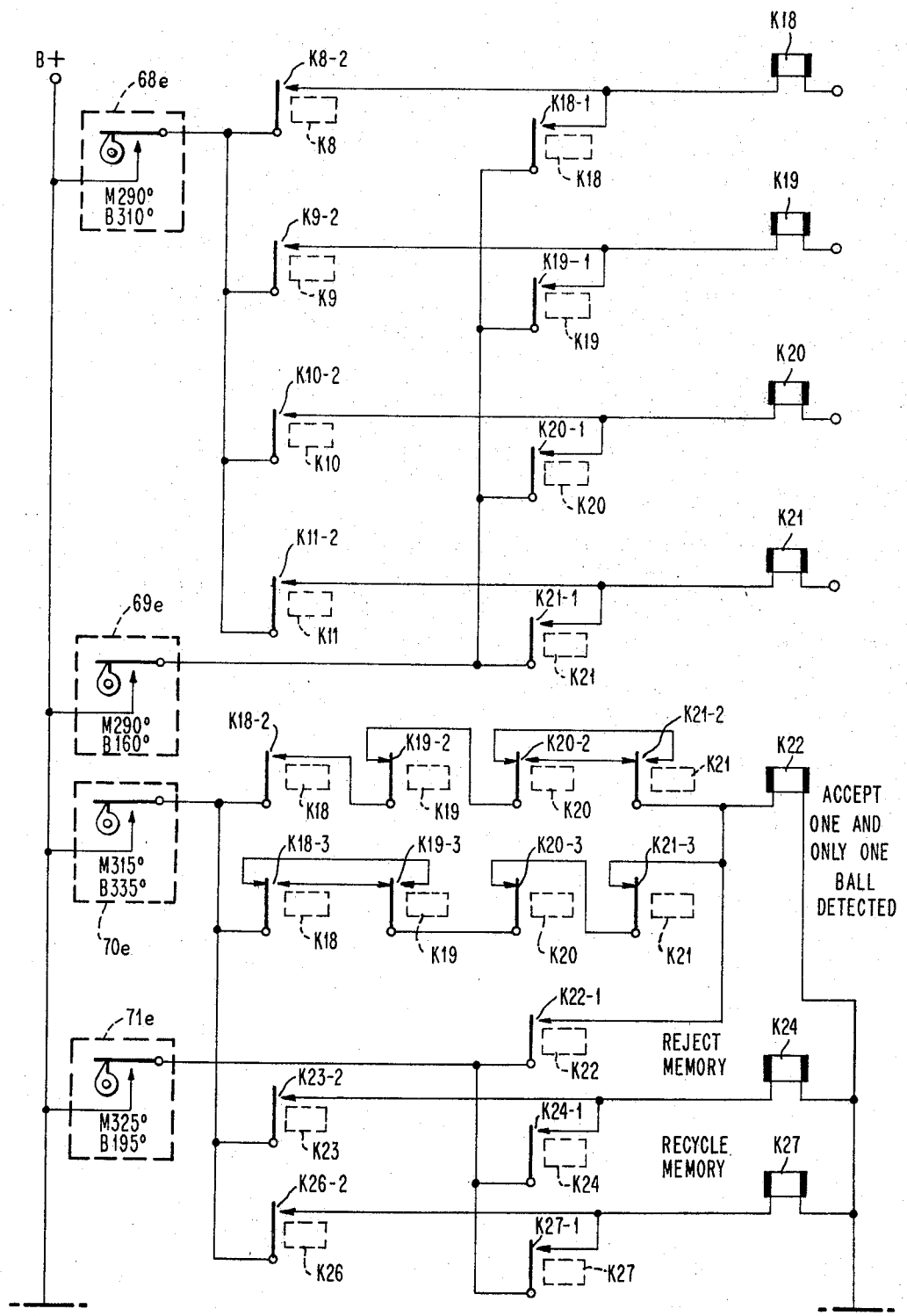

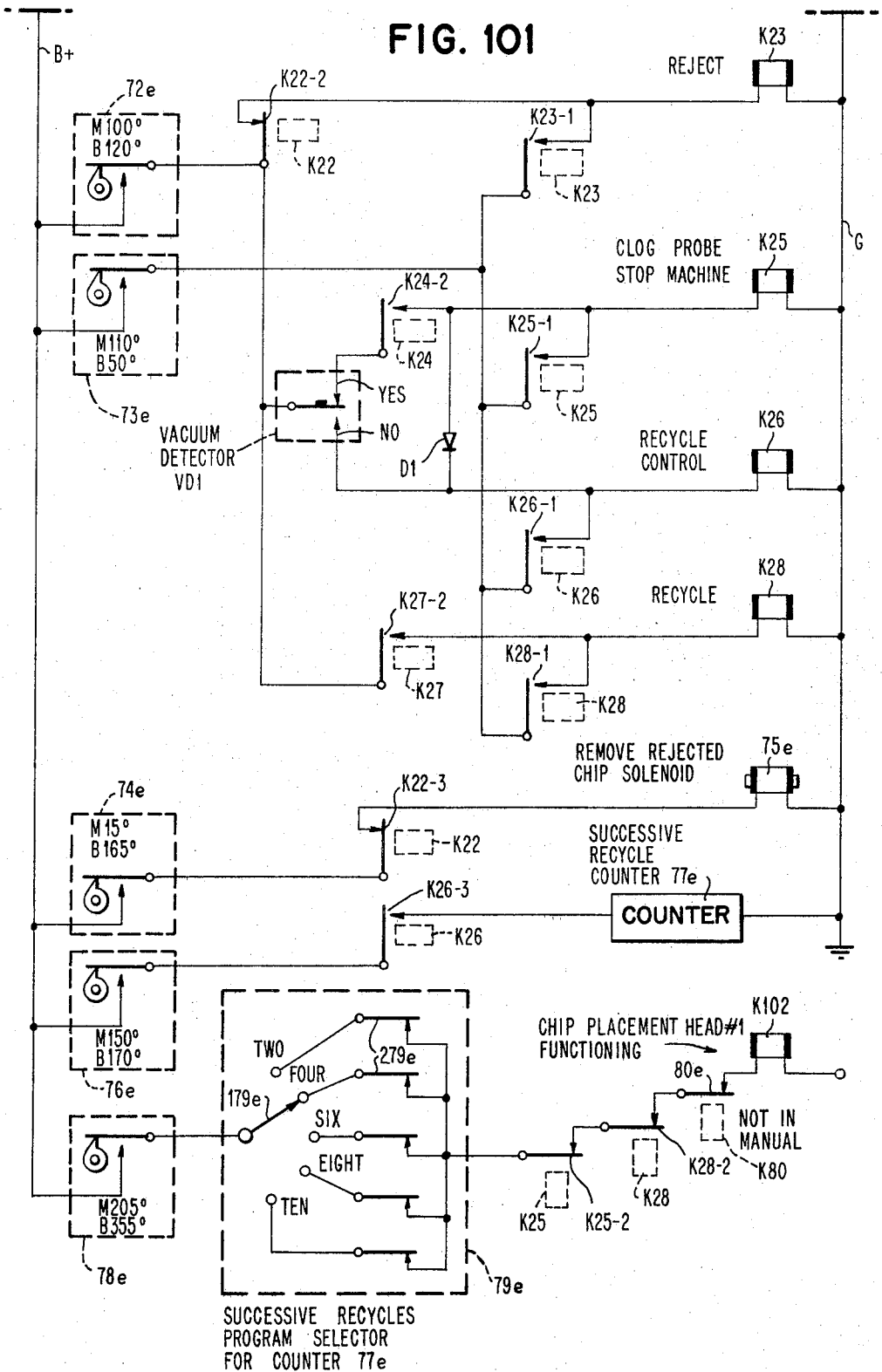

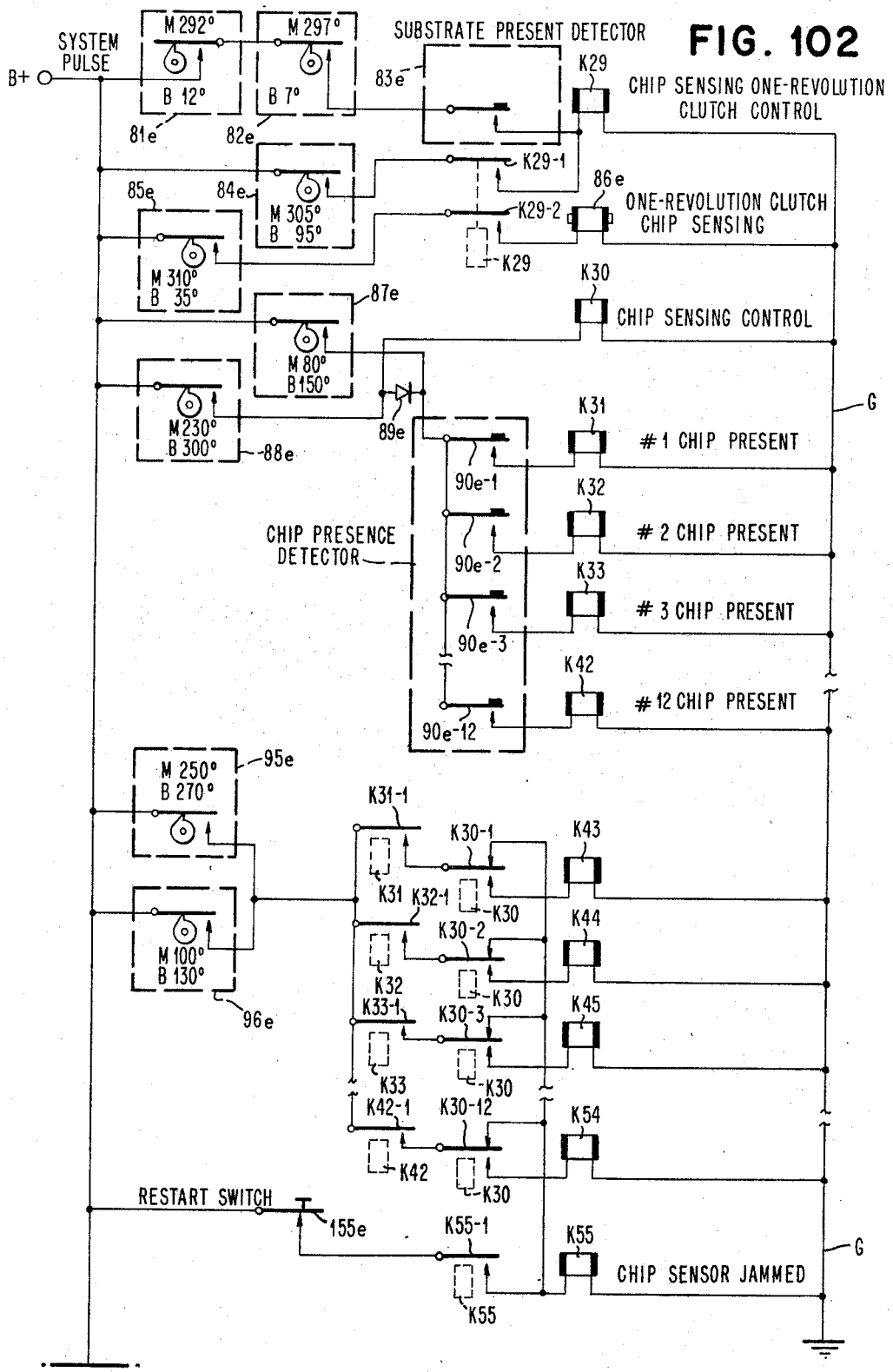

United States Patent Office 3,499,203
Patented Mar. 10, 1970

3,499,203
CHIP POSITIONING MACHINE
Kendall Clark, Poughkeepsie, George C. Beck, Fishkill, Eugene J. Creighton and Frank L. De Turris, Wappingers Falls, Joseph G. Drop and Jean J. L. Godat, Poughkeepsie, Arne H. Larsen, Wappingers Falls, and Thomas J. Rajac, George R. Santillo, Jr., and Walter J. Schuelke, Poughkeepsie, N.Y., assignors to International Business Machines Corporation, Armonk, N.Y., a corporation of New York
Filed May 27, 1965, Ser. No. 459,179
Int. Cl. H01r 15/00
U.S. Cl. 29—203
24 Claims

ABSTRACT OF THE DISCLOSURE

A chip positioning machine for automatically placing chips onto the conductive lands of printed-circuit substrates. The machine has one or more chip placement stations, conveying means for carrying the substrates to the placement stations in sequence, chip supply means, means for selecting the chips from the supply, means for moving the chips into a predetermined orientation, and vacuum means for placing the oriented chips on the substrate. The apparatus further includes means for fluxing the substrate lands including means for dimpling the lands, applying flux to the lands and flattening the flux. The apparatus also includes means for detecting whether the vacuum placement means is properly carrying a chip, and in the absence of such a chip, to recycle the orienting and placement means while holding the substrate at a given station. In addition, the apparatus includes means for sensing the presence of chips on each completed substrate and for removing from the substrate conveyor those substrates which do not have the prerequisite number of chips thereon.

This invention relates to a chip positioning machine for automatically assembling semiconductor chips onto printed-circuit substrates.

With the advent of hybrid transistor circuit technology, there arose more stringent requirements of precision, speed and uniformity than had theretofore been achieved in the art of automated circuit manufacture. The hybrid technique involves first the screen printing of the resistors and conductive lands on an alumina substrate. The transistors or diodes in the form of semiconductor chips are then positioned onto the conductive lands. Because the chips are almost microscopic in size, each measuring 0.028 inch square, and are joined to the lands by contact elements in the form of copper balls which are only 0.005 inch in diameter, they cannot be handled by conventional automated assembly techniques. The problem is further complicated by the need for extreme accuracy and precision in positioning the chips on the relatively small and closely-spaced conductive lands which are only 0.005 to 0.015 inch wide and 0.005 inch apart, as well as by the extreme delicacy of the structure involved.

Furthermore, the vast number of circuit substrates required in the manufacture of each digital computer, which is at present the primary use for this hybrid circuit technology, demands that the chip positioning operation be performed at relatively high speeds and with a high yield in order to maintain the high volume required in production. The large number of circuit substrates utilized in a single computer also demands uniformity in manufacture in order to increase the reliability of the final assembled apparatus.

It is therefore a primary object of the present invention to provide a novel machine for automatically positioning transistor and diode chips onto the conductive lands of printed-circuit substrates with precision, uniformity, at a high production rate, and without damage to the structure of either the chips or the substrates.

To accomplish this object, the substrates with the resistors and conductive lands already screen printed thereon are first automatically loaded onto a metal endless conveyor tape which carries the substrate sequentially through a number of work stations. The substrates are loosely mounted on the conveyor tape so as to be free to move to a limited extent with respect to the tape. This enables a set of substrate clamps at each station to grasp the substrate and accurately align it with respect to the operative device at that station.

The tape is indexed periodically after each working cycle to move the next succeeding substrate to each of the stations. At the first station, the areas of the conductive lands which are to receive the contact balls of the semiconductor chips are suitably prepared by first dimpling flat surfaces on said land areas. Then rosin flux is dispensed onto the dimpled areas and the flux is then flattened and spread by jets of air. The tape then conveys the substrate to the first of a series of chip positioning stations.

At each of said positioning stations the semiconductor chips are first aligned upright with their contact balls lowermost and are randomly angularly oriented with the collector ball in either of the four quadrants. Each chip is then picked up on the end of a vacuum needle with the chip in this initial angular orientation. Since it is necessary to align the angular orientation of the chip so that the contact balls coincide with the configuration of the land pattern upon which the chip is to be placed, the original random orientation of the chip on the needle is first sensed. Then the chip is rotated through the angular displacement necessary for proper orientation to coincide with that of the substrate land pattern. The vacuum needle is then lowered to position the chip at a precise location on the pattern. The substrate is then carried by the conveyor tape to the succeeding chip positioning stations in sequence where additional chips are positioned onto various other respective portions of the substrate conductive land pattern.

After the last chip positioning station the substrate passes to a chip presence sensing device which detects whether all chips are properly positioned on the substrate. Any substrates which do not pass this test are then automatically removed from the conveyor tape so that only good substrates arrive at the discharge end of the latter.

Another object is to provide a chip positioning machine of the character described wherein if the chip orientation sensing device is engaged by either no balls or more than one ball due to a defect or misalignment of the chip, the latter is automatically blown off the vacuum needle by a jet of air.

Still another object is to prevent clogging of the vacuum needles by the flux in situations where the chip fell off or was blown off the needle. This is achieved by a novel vacuum control system whereby the needle is maintained in its upper position and is prevented from moving downwardly to dip the exposed lower end of the needle into the flux in the event that there is no chip on said end of the needle. This prevents the flux from entering the open lower end of the needle to clog the latter.

A further object is to provide a novel control arrangement whereby in the event that a particular needle fails to place a chip upon the substrate because the chip fell off or was blown off or some other cause, the tape conveyor does not index, the substrate is held in position, and the chip placement head recycles to bring the next needle into operation in another attempt to position a chip upon the same substrate. This head recycling operation will continue repeatedly while the conveyor remains stationary until either a chip is finally placed upon the substrate so that thereafter the operation continues normally or a predetermined number of successive chip placement head recycles occurs whereafter the machine is stopped for adjustment or repair.

Further objects of the present invention are to provide novel mechanisms at the several operating stations for clamping the substrate, sensing the initial random orientation of the chip on the vacuum needle, rotating the chip on the needle to the proper orientation, placing the chip upon the substrate, detecting for the required number of chips on each substrate, and removing those substrates which lack the required number of chips.

Although for purposes of illustration the semiconductor chips are disclosed as being of the type wherein each chip constitutes a single diode or transistor, it will be understood that the subject invention may also be utilized to position chips of the type wherein each constitutes a monolithic integrated circuit comprising a plurality of diodes and/or transistors as well as other circuit components together with conductive lands interconnecting same. Furthermore, the subject invention may find utility in other assembly operations where it is desired to position one or more smaller workpieces at precise locations upon a larger workpiece.

The foregoing and other objects, features and advantages of the invention will be more apparent from the following more particular description of a preferred embodiment of the invention, as illustrated in the accompanying drawings wherein;

FIG. 1 is a schematic perspective view of a portion of a printed-circuit substrate with a semiconductor chip in position upon a set of land pads thereof;

FIG. 2 is a schematic perspective veiw showing the overall operation and sequence of stations of the subject machine and including the conveyor tape for carrying the substrates in succession to the various operating stations;

FIG. 3 is a front elevational view of the subject machine;

FIG. 4 is a top plan view thereof;

FIG. 6 is a top plan view of a substrate showing an illustrative printed-circuit conductive land pattern thereon;

FIG. 7 is an enlarged view of a portion of FIG. 6 and shows a set of land pads with dimpled areas;

FIG. 8 is a schematic view showing a coining punch performing the dimpling operation;

FIG. 9 is a vertical sectional view through a land pad and shows a dimpled area formed on the pad surface;

FIG. 10 is a vertical sectional view showing the flux being dispensed onto the land pads;

FIG. 11 is an enlarged view similar to FIG. 7 but showing the dispensed flux;

FIG. 12 is a vertical sectional view taken substantially on line 12—12 of FIG. 11;

FIG. 13 is a vertical sectional view schematically showing the flux flattening operation;

FIG. 14 is an enlarged view similar to FIG. 7 but showing the flux spread over the land pads after the flattening operation;

FIG. 15 is a vertical sectional view taken substantially on line 15—15 of FIG. 14;

FIG. 16 is a vertical sectional view taken schematically on line 16—16 of FIG. 18 and shows a chip being placed upon the substrate by a vacuum needle;

FIG. 17 is an enlarged view similar to FIG. 7 but showing a chip in position upon the land pads;

FIG. 18 is an enlarged view similar to FIG. 7 but showing a chip in position upon the land pads;

FIG. 22 is an elevational view, with parts in cross section, showing the dimpler assembly and the flux dispenser;

FIG. 23 is a view of the dimpler coining head taken on line 23—23 of FIG. 22 in the direction shown by the arrows;

FIG. 24 is an enlarged view of one of the dimpler coining heads shown in FIG. 23;

FIG. 25 is a cross-section view taken on line 25—25 of FIG. 24;

FIG. 26 is a view of the flux dispensing mask taken on line 26—26 of FIG. 22;

FIG. 29 is a side elevation of the chip placement head;

FIG. 30 is a plan view of the chip placement head in combination with each of the specific stations associated therewith;

FIG. 31 is a partial sectional view of the chip blow-off mechanism;

FIG. 32 is an isometric view of a representative arm of the chip placement head showing details of the vacuum pin arrangement;

FIG. 33 is a section view of a representative arm of the chip placement head taken along line 33—33 in FIG. 30;

FIG. 34 is a view taken along line 34—34 in FIGS. 32 and 33 to show the superimposed positions of the vacuum distributor and vacuum manifold;

FIG. 34A is a sectional view showing a representative vacuum nozzle and portion of the vacuum manifold taken along line 34A—34A;

FIG. 35 is a plan view of the vacuum distributor with the vacuum manifold removed;

FIG. 36 is a view of the bottom portion of the vacuum manifold which normally mates with the upper portion of the vacuum distributor;

FIG. 38 is a complete section of a vacuum probe;

FIG. 39 is a view of a vacuum probe taken along line 38A—38A;

FIG. 40 is a timing chart helpful in understanding the operation of the chip placement head;

FIG. 42 is a horizontal section view of the indexing mechanism for the chip placement head;

FIG. 43 is a vertical sectional view taken substantially on line 43—43 of FIG. 42;

FIG. 44 is a vertical sectional view taken substantially on line 44—44 of FIG. 42;

FIG. 44A is a transverse sectional view taken on line 44A—44A of FIG. 44;

FIG. 53 is a top plan view of a preferred specific embodiment of the vibratory bowl feeder subcombination unit of our invention;

FIG. 54 is a detailed view in greatly enlarged scale of the structure of the chip pickup station;

FIG. 55 is a front elevational view in partial cross-section of the vibratory bowl shown in FIG. 53;

FIG. 62 is a side elevational view in enlarged scale showing the engaging relationship between the semiconductor chip and the head of the orientor apparatus of this invention;

FIG. 63 is a top plan view taken on line 63—63 of FIG. 62;

FIG. 64 is a perspective view in enlarged scale illustrating the T-bar configuration of the head of a preferred specific embodiment of the orienting apparatus of our invention;

FIG. 65 is a front elevational view in cross-section of a preferred specific embodiment of the chip T-bar orientor apparatus of our invention;

FIG. 66 is a detailed view in broken section illustrating the Geneva drive arrangement;

FIG. 67 is a top view of a clamping assembly in a closed position for orienting a substrate into a reference position;

FIG. 68 is a top view of the clamping assembly of FIG. 67 with the clamping assembly in an open position, and FIG. 68A is a partial sectional view of a substrate and perforated conveyor belt showing the location of the substrate pins through the perforations of the belt;

FIG. 69 is a side elevational view in broken section of a preferred specific embodiment of the chip presence sensor of the invention;

FIG. 70 is a bottom view of the sensing head shown in side elevation in FIG. 69;

FIG. 71 is a front elevational view in cross-section of the chip presence sensor shown in FIG. 69;

FIG. 72 is a side elevational view in cross-section of a preferred specific embodiment of the rework head;

FIG. 73 is a detailed view of a Geneva drive of the turret indexing mechanism taken on line 73—73 of FIG. 72;

FIG. 74 is a detailed view illustrating the Geneva drive of the tray indexing mechanism taken on line 74—74 of FIG. 2;

Figure 106:
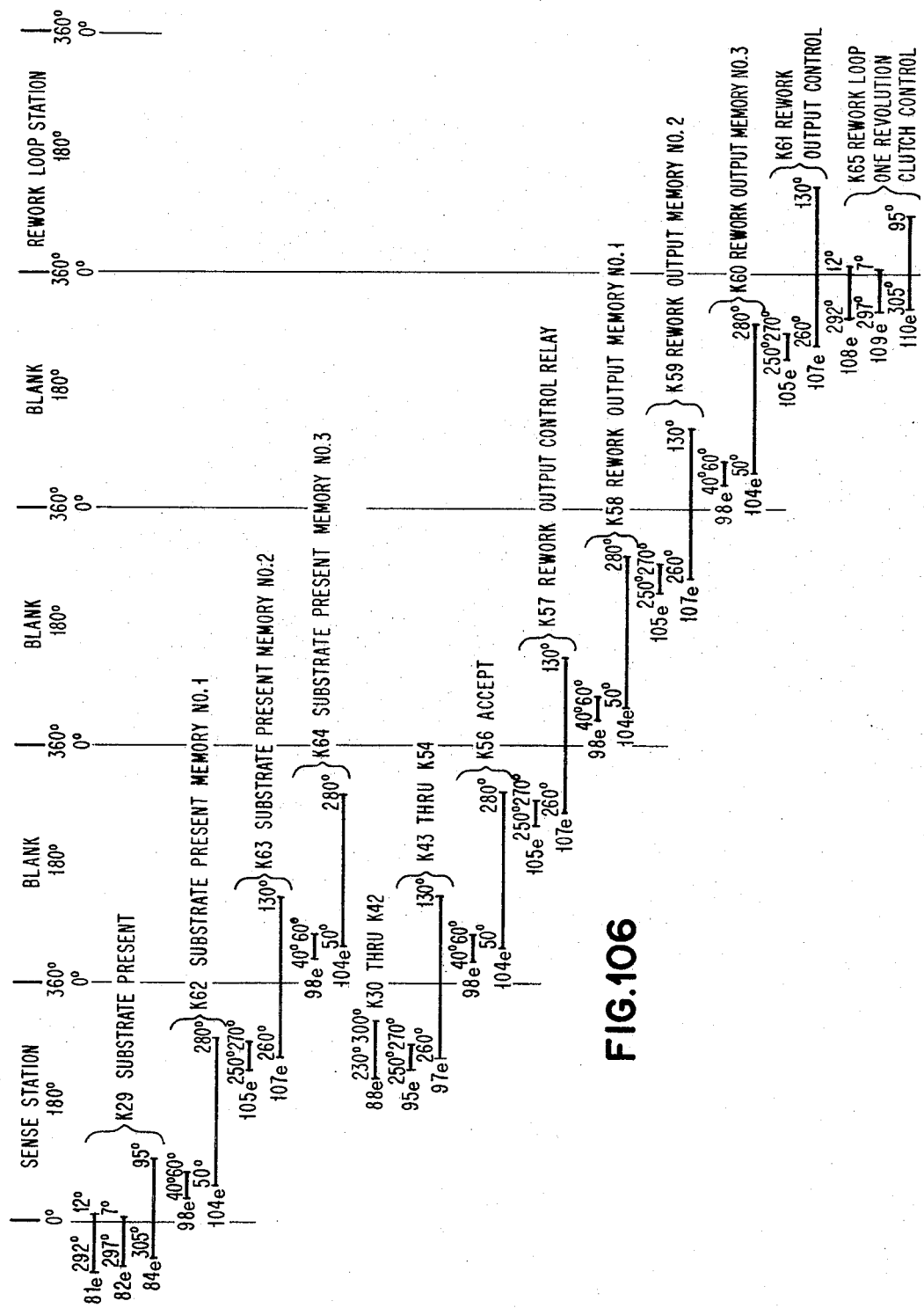

FIGS. 79 to 84 inclusive are logic flow diagrams showing the sequence of operations and logical functions performed by the electrical control system;

FIGS. 85 to 105 inclusive are electrical circuit diagrams showing the electrical control system for the subject machine; and FIG. 106 is a timing diagram showing the sequence of operations of several of the relays involved in the memory portion of the rework head control circuitry.

THE OVERALL OPERATION

The general nature of the structure and overall mode of operation of the subject chip positioning machine will first be described, after which the specific structure of each of the several devices will be explained in more detail. Referring first to FIG. 1 which shows the end product of the machine, a semiconductor chip C is assembled onto a substrate S with the three contact balls of the chip resting upon the enlarged pads P of the conductive lands L formed on the upper surface of substrate S and constituting the printed circuit pattern.

Referring to FIG. 2, the successive operating stations are shown schematically and the series of substrates are carried in sequence from one station to the next by a metal conveyor tape 1 entrained around a pair of pulleys 2, 3 so that the upper run of tape 1 moves in the direction of the arrow 4 from left to right as viewed in the drawing. Tape loader 5 constitutes the first station and loads the substrates onto tape 1.

At the next station a dimpler 6 is provided with an array of coining punches to dimple a circular flat area 0.007 inch in diameter on each of the pads of the substrate. These flat areas are to receive copper balls of the chip when the latter is placed onto the substrate at the subsequent operating stations.

The dimpling operation is shown schematically in FIGS. 6 to 9 inclusive. FIG. 6 shows the upper surface of a substrate S with the pattern of the printed and tinned conductive lands L and screened resistors R thereon. FIG. 7 is a greatly enlarged view of a portion of FIG. 6 and shows the pad portions P of the lands and upon which the chip is to be positioned. In FIG. 8 there is shown a dimpling tool 7 having a coining punch 8 being pressed into the pad P to form therein the circular flat areas A shown in FIGS. 7 and 9.

The next station performs a flux dispensing operation whereby a droplet of flux is discharged onto the substrate area including land pads P. The flux dispenser is indicated generally by the reference numeral 9 in FIG. 2 and the fluxing operation is shown schematically in FIGS. 10 to 12 inclusive. Referring first to FIG. 10, the reference numeral 11 indicates generally a cartridge for containing liquid flux F and having a lower open end closed by a metal plate forming a mask 13 provided with an opening 14. The interior of cartridge 11 is maintained at a vacuum pressure to prevent liquid flux F from leaking through mask opening 14. At the proper timed instant a solenoid provides a pulse of air that overcomes the vacuum momentarily to force a droplet of flux F through opening 14 in mask 13. If no substrate S is present at the flux dispensing position at this time, the droplet of flux will adhere to the mask 13 and main body of flux within cartridge 11 due to surface tension and will eventually be withdrawn upwardly back through opening 14. Thus no dispensing operation will occur to contaminate the tape and other parts in the absence of a substrate.

However, if substrate S is present the flux droplet will will contact the substrate surface and adhere thereto so as to be deposited thereupon in the form shown at FIG. 12. The flux droplet F as thus deposited is too high to permit accurate placing of the chips, and also will contaminate the vacuum needles.

To reduce the flux droplet height, the next operating station comprises a flux flattener indicated generally at 15 in FIG. 2 and functioning to emit a jet of compressed air against each of the flux droplets F to flatten and spread the latter. The flux flattening operation is shown schematically in FIGS. 13 to 15 inclusive. The nozzle for emitting a jet of air against the flux droplet F is indicated at 16 in FIG. 13 and the resulting flattened flux F is shown in FIG. 15.

Now that each of the pad configurations has been dimpled and fluxed to receive a chip C, the next operation is to position the latter thereon. For this purpose there are provided a series of chip placement heads indicated generally at 17 in FIG. 2 and constituting the next stations in the sequence to which substrate S is carried by conveyor tape 4. The number of chip placement heads 17 will correspond to the number of chips C to be positioned upon each of substrates S since each head 17 positions a chip at a particular location of the printed circuit pattern.

Before chip C is positioned upon substrate S it must first be oriented upon vacuum needle 18 so that its copper balls B are in proper alignment with the respective dimpled areas, A. The first step in this orientation procedure is to dispense chips C by means of a vibratory feeder bowel 19 shown associated with each of chip placement heads 17 in FIG. 2. As will be described in detail below, each bowl 19 feeds chip C in sequence to a pick-up location where each chip is picked up by the lower end of a respective one of vacuum needles 18. In the process of dispensing chip C each feeder bowl 19 orients each chip in two respects. First, chips C are aligned in an upright position with contact balls B extending downwardly as shown in FIG. 16. Second, when each chip C is dispensed to the pick-up point it is angularly oriented about a vertical axis to one of the four possible orientation quadrants described above.

After chip C is picked up on the lower end of vacuum needle 18, it must then be angularly rotated about a vertical axis from the original pick-up orientation to the required orientation for proper alignment with the particular land pattern configuration of the substrate at the location thereon at which the chip is to be positioned. For this purpose there is provided a chip orientation sensor indicated generally at 20 in FIG. 2 and which contacts the collector ball to determine the quadrant in which the latter is located. Chip placement head 17 is rotatably indexed to bring said needle with chip C thereon to chip orientation sensor 20. Thereafter chip placement head 17 is again angularly indexed to bring vacuum needle 18 with chip C thereon to the chip T-bar orientor indicated generally at 21 which rotates the chip on vacuum needle 18 to the desired quadrant orientation corresponding to the land pattern configuration.

The chip positioning operation per se, usually referred to herein as "chip placement," is shown schematically in FIGS. 16 to 18 inclusive. This operation is performed after chip placement head 17 is twice angularly indexed after the chip orientation by T-bar 21. In FIG. 16 chip C is shown as being held upon the lower end of a vacuum needle 18 and being positioned onto substrate S so that the copper contact balls B of chip C are located on the dimpled flat areas A of substrate pads P. FIGS. 17 and 18 show chip C in assembled relation on the land pattern of substrate S. Chip C is temporarily held in this assembled relation by the adhesive properties of flux F until the chip is permanently bonded to substrate pads P by a subsequent oven apparatus (not shown) which melts and reflows the solder previously deposited upon copper balls B and conductive land pads P. However, this bonding operation forms no part of the present invention and will not be further described.

After substrates S are carried by tape conveyor 1 from the last of the series of the chip placement heads 17, the next operating station in the sequence is a chip presence sensor indicated generally at 22 in FIG. 2. This device tests each substrate S to determine if the required number of chips C have been positioned thereon. Each substrate is thereby characterized as an "accept" or "reject" and this characterization is retained in the memory circuitry of the electrical control system to be described below until substrate S is carried by conveyor 1 to a rework head indicated generally at 23. This final station may be selectively programmed to remove from tape conveyor 1 either all of the accepted substrates or all of the rejected substrates. Generally it is programmed to remove all of the rejected substrates so that the latter may be reworked, usually by operators manually positioning chips at the missing locations. The accepted substrates continue on conveyor tape 1 toward its discharge end where they are removed by suitable interface apparatus (not shown) and loaded upon a subsequent conveyor for passage through said chip bonding oven (not shown).

Figure 5:
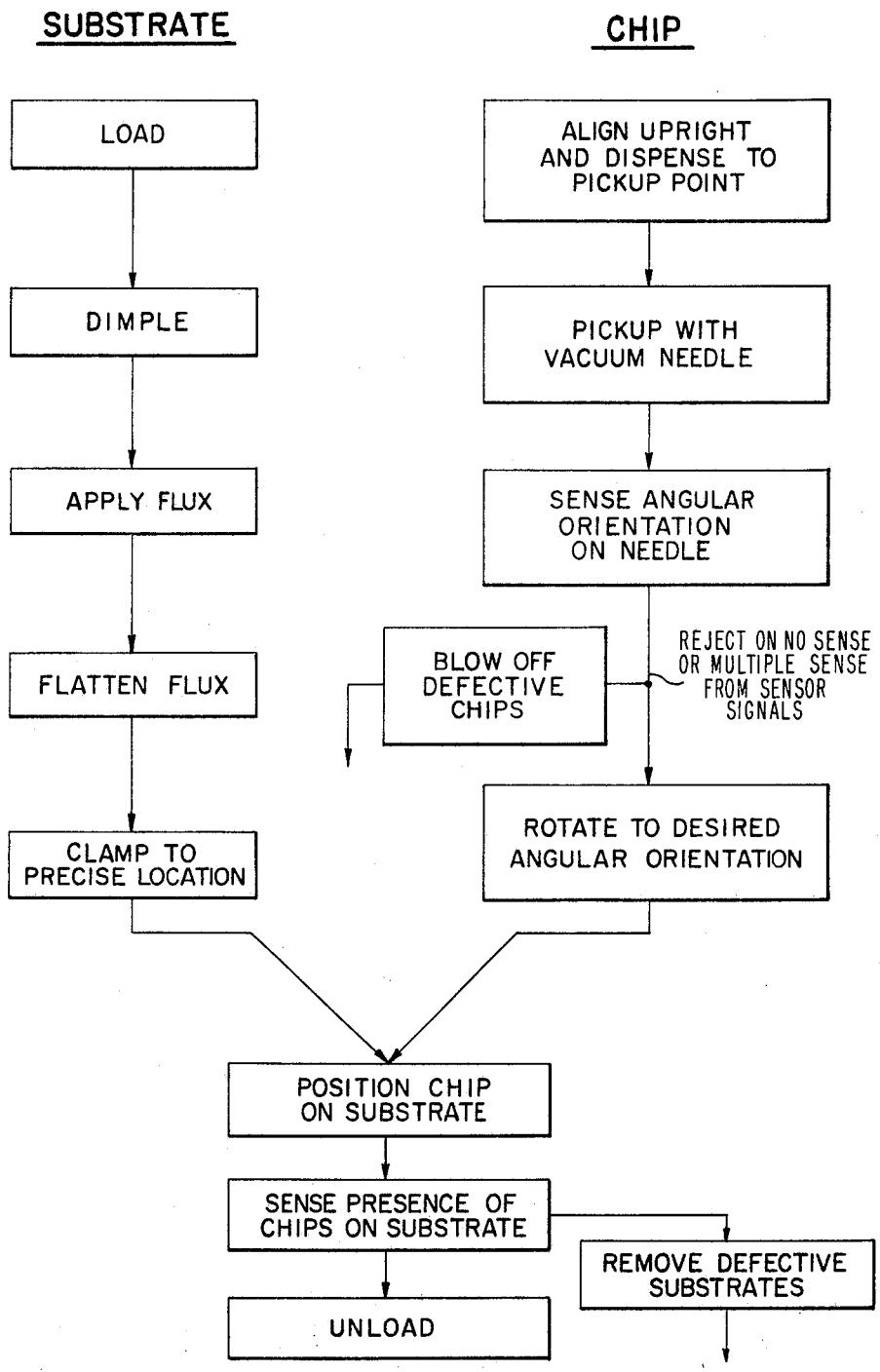
FIG. 5 is an operation flow diagram showing the sequence of operations performed successively upon each substrate and each chip.

The overall sequence of operative stations described generally above is shown in the operation flow chart of FIG. 5. The left flow column headed "SUBSTRATE" shows the sequence of operations on each substrate S, and the right column headed "CHIP" shows the sequence of operations upon each chip C before the latter is positioned on a substrate S. The lower middle column shows the sequence of operations involving the assembled combination of the substrate S with chip C thereon.

As shown in FIG. 4, the several operating stations comprising tape loader 5, dimpler 6, flux dispenser 9, flux flattener 15, chip placement head 17, chip presence sensor 22, and rework head 23 are each drivingly actuated by a respective one of a series of transverse shafts 24 to 28 inclusive. The latter are in turn drivingly rotated through 360° at the proper time during each cycle of operation by a respective one of the solenoid-actuated one-revolution clutches 29 to 33 coupling said shafts 24 to 28 respectively to the bevel gear 34 of one of a series of right-angle drive transmissions 35 to 40 each having a bevel gear 41 drivingly engaging the respective gear 34 and fixedly mounted on a longitudinal main drive shaft 42. The latter is in turn driven by a right-angle drive transmission 43 having an input shaft 44 with a pulley 45 driven by a belt 46 from another pulley 47 mounted on the shaft of a variable speed electric motor 48. The speed of the latter may be selectably adjusted to operate the subject chip positioning machine at a rate varying from one substrate every two seconds to one substrate every half second.

Main drive shaft 42 is also drivingly connected through a transmission 49 and one-revolution clutch 50 to a cam 51 having a cam groove 52 within which rides a cam follower 53 rotatably mounted on one end of link 54. The other end of the latter is connected to one end of a transverse rod 55 having its opposite end connected to a lever 56. The lower end of the latter is pivotally mounted at 57 to a support 58 fixed to the machine frame member 59. The upper end of lever 56 is connected by link 60 to an intermediate portion of another lever 61 pivoted at its lower end 62 to support 58 and pivotally connected at its upper end 63 to a clamp actuating shaft 110c.

The latter extends longitudinally along the front of the machine adjacent the series of chip placement heads 17. Shaft 110c is provided therealong with a plurality of slotted members 12c which are moved by shaft 110c to open and close the substrate-locating clamps associated with chip placement heads 17, as will be explained in detail below. The left-hand end of shaft 110c is pivotally connected through link 64 to a clamp actuating shaft 10c also having slotted members 12c for actuating the three substrate-locating clamps associated with dimpler 6, flux dispenser 9 and flux flattener 15. The adjoining ends of shafts 10c, 110c are pivotally connected to the upper ends of links 65, 66 having their lower ends pivotally mounted to a support 67 mounted on frame member 59. The other end of shaft 10c is pivotally connected to the upper end of a link 68 having its lower end pivotally mounted to a support 69 mounted on frame member 59.

It will thus be seen that when one-revolution clutch 50 is actuated in a manner to be described below, cam 51 is rotated to move shafts 10c, 110c longitudinally through link 54 and rod 55, thereby actuating all of the clamps at the several stations.

Rotation of cam 51 through one cycle of revolution also causes conveyor tape 1 to be indexed one position in the following manner. Cam 51 is drivingly connected to the input shaft 70 of an index drive 71 having an output shaft 72. Each time that one-revolution clutch 50 is actuated cam 51 and input shaft 70 of index drive 71 rotate through a complete 360 degree revolution during the major portion of which index drive output shaft 72 will remain stationary. However, for a minor portion of the cycle of revolution of input shaft 70 the output shaft 72 indexes through an angular displacement of 60 degrees. This displacement is reduced by a reduction drive 73 having an output shaft 74 drivingly connected to conveyor tape pulley 3 rotatably mounted in bearing 75.

Each of the chip placement heads 17 is adjustably mounted for both transverse and longitudinal movement by mounting devices indicated generally at 82 in FIG. 3 so that each head 17 may be properly aligned with the respective substrate land location upon which the chip is to be placed. The transverse and longitudinal positions of each head 17 are adjusted by manual controls 83, 84. Mounting devices 82 may be of conventional construction and will not be further described.

LOADER MECHANISM

Figure 19:
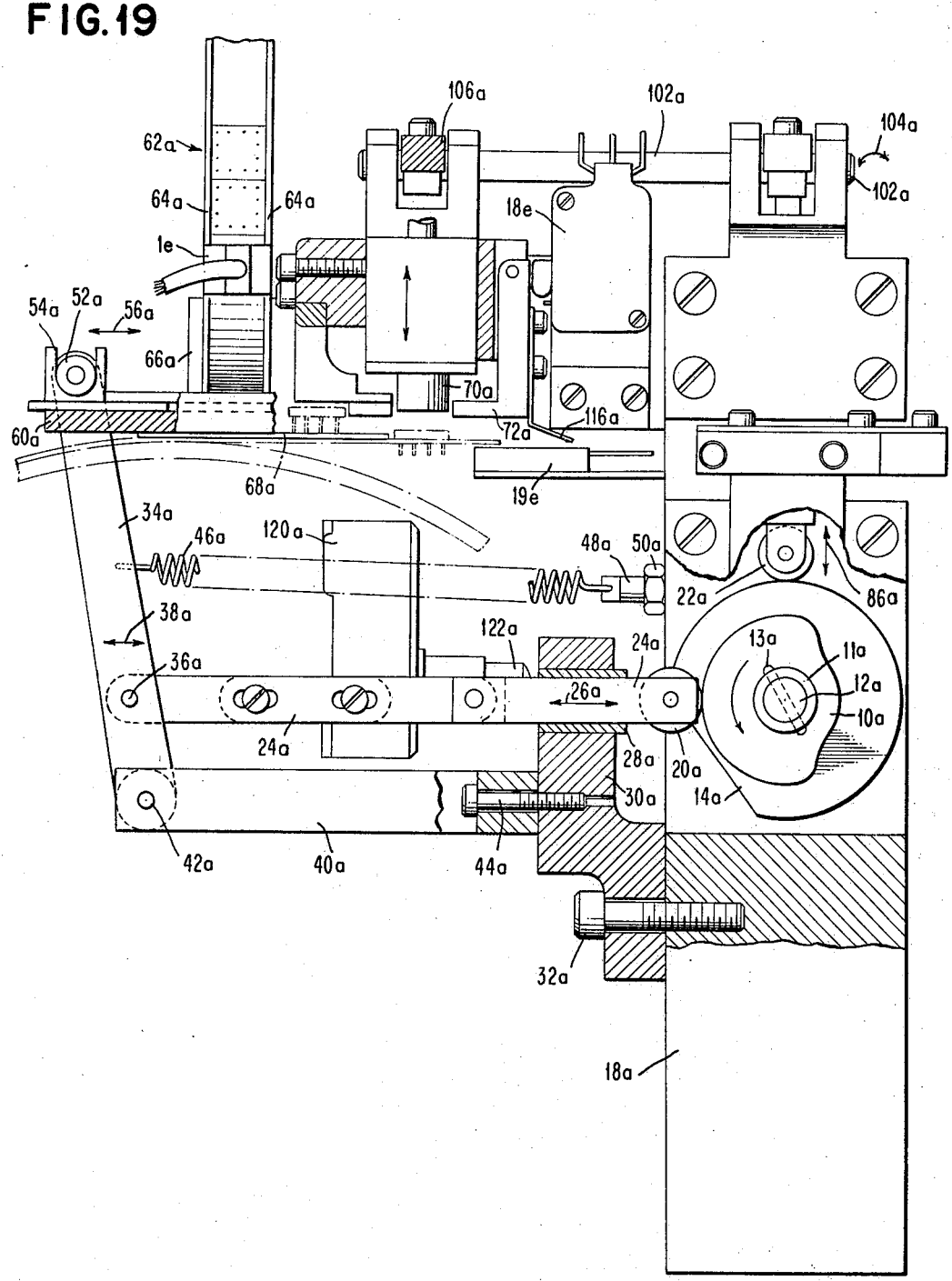
FIG. 19 is an elevational view of the article loading assembly of this invention with parts shown in cross section.
Figure 20:
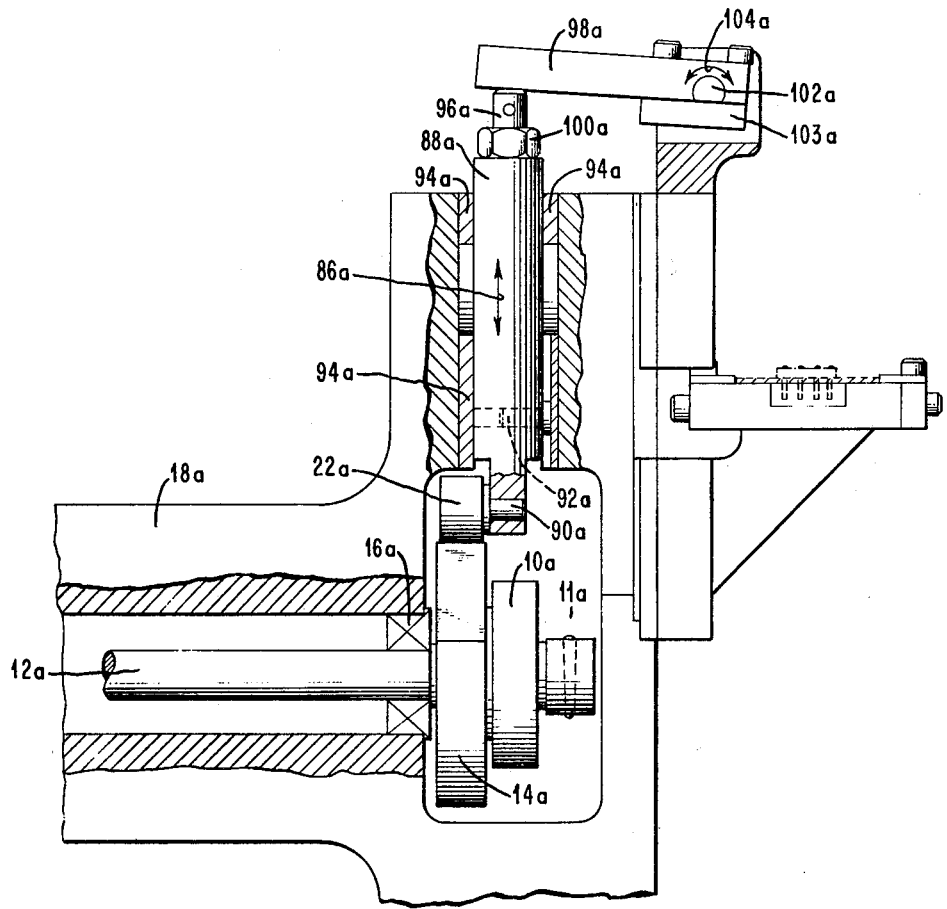
FIG. 20 is an elevational view showing the driving portion of the article loading assembly of FIG. 19.

Referring to FIGS. 19 and 20, 10a is a cam connected to a shaft 12a such as by a key (not shown). Collar 11a serves to hold cam 10a in position on shaft 12a and spline 13a holds collar 11a on shaft 12a. Also connected to shaft 12a is cam 14a which is adjacent to and larger than the cam 10a. Rotation of the shaft 12a is permitted by bearing assembly 16a connected to frame 18a and mounted on the shaft 12a adjacent cam 14a. Follower rollers 20a and 22a are in cooperative engagement with cams 10a and 14a, respectively. Referring to FIG. 19, follower roller 20a which is pinned to bar member 24a permits reciprocation of the bar member 24a in the directions shown by arrows 26a. The bar 24a is slidably supported within bushing 28a located in support member 30a which is connected to the frame 18a by means of a suitable screw 32a. Consequently bar 24a which is connected to lever arm 34a by pin 36a swings the lever arm 34a in the direction shown by arrows 38a. The lever arm 34a is permitted to pivot with respect to support member 40a by means of fixed pivot pin 42a. The support member 40a is attached to the support member 30a by means of screw 44a. Spring 46a is connected between lever arm 34a and lug 48a which is screwed into the frame 18a. Hence, the spring 46a functions to bias the lever arm 34a to the right and movement of the bar member 24a to the left moves the lever arm 34a to the left against the force exerted by the spring 46a. Nut 50a facilitates adjustment of the lug 48a with respect to the frame 18a.

Connected to the other end of the lever arm 34a is a roller 52a, a portion of which is mounted within a U-shaped member 54a. The U-shaped member 54a is accordingly reciprocated by the reciprocating motion of the roller 52a in the directions shown by the arrows 56a due to the similar motion of the lever arm 34a which is actuated by the bar 24a connected to the follower roller 20a which cooperates with the cam 10a. Connected to the U-shaped member 54a is a pusher element 58a which is slidably mounted in a groove in support member 60a. Hence, reciprocal movement of the U-shaped member 54a causes the same reciprocal movement of the pusher element 58a. The pusher element 58a is preferably a metal strip extending to a desired length in the slot or groove in the support member 60a.

Figure 21:
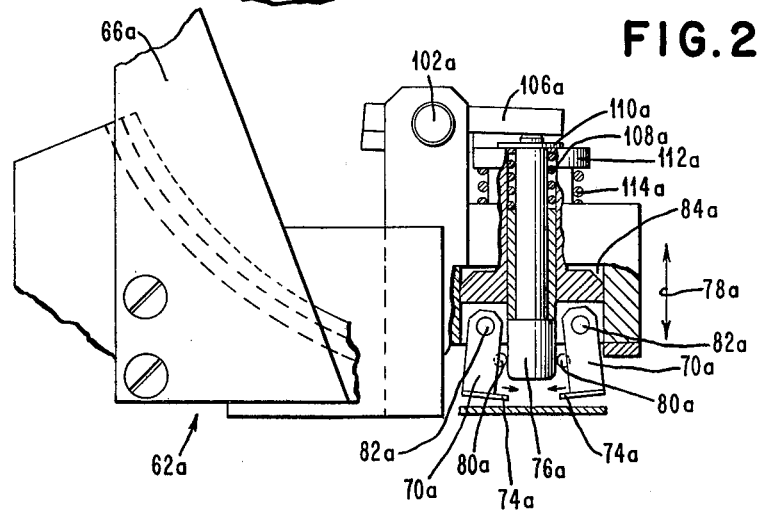
FIG. 21 is a view of the positive positioning mechanism of the article loading assembly of FIG. 19 with parts in cross section.

Referring to FIGS. 19 and 21, an article containing slide 62a is employed for feeding articles or substrates onto the support member 60a. The article containing slide 62a is preferably a curved set of spaced metal rails or strips 64a in which the substrates are slidably positioned and gravity fed onto the support member 60a. Frame 66a supports the article containing slide 62a. When the pusher element 58a is moved to the right, it cooperates with the article containing slide 62a in a manner such as to individually push to the right substrates that are fed from the slide 62a onto the support member 60a. The substrates with their pins extending downwardly are slid along slide member 68a to a position between a pair of pivot arms 70a (FIG. 21). Stop 72a (FIG. 19) functions to stop the substrate from sliding through the pivot arms 70a. Extensions 74a which are connected to the pivot arms 70a function to hold the substrate between the pivot arms 70a.

In this position, the substrate is ready to be positively and accurately placed on the belt in such a manner that the pins of the substrate will extend through matching holes in the belt. Piston 76a (FIG. 21), which is caused to recpirocate in the directions shown by arrows 78a, functions to place the substrate onto the belt by both the positive engagement with the top surface portion of the substrate and by pushing the pivot arms 70a outwardly due to contact between the downwardly moving piston 76a and balls 80a attached to the pivot arms 70a. The pivot arms 70a are permitted to swing outwardly by pivot pins 82a connected to a frame 84a.

The means for creating the reciprocating movement of the piston 76a is now described. Referring to FIGS. 19 and 20, the follower roller 22a is caused to reciprocate as shown by the arrows 86a due to its cooperative relationship with the cam 14a. Referring to FIG. 20, the follower roller 22a is connected to a bar 88a by means of pin 90a thereby causing the bar 88a to reciprocate with the roller 22a.

Pin 92a which is inserted in a slot in the bar 88a prevents rotation thereof. Bushing 94a located within the frame 18a permits the bar 88a to reciprocate as shown by the arrows 86a. Bearing on lug 96a, which is threadedly connected to the bar 88a, is a lever arm 98a which is caused to move up and down with the bar 88a. Nut 100a permits adjustment of the lug 96a. The reciprocal movement of the lever arm 98a causes oscillation of the shaft 102a which is connected to the lever arm 98a by means of a clamp 103a as shown in FIG. 20. The oscillating motion of the shaft 102a causes lever arm 106a (FIG. 21), which is connected to the shaft 102a in the same manner as the lever arm 98a is connected thereto, to move the piston or plunger 76a in the downward direction against the force of spring 108a when the free end portion of the lever arm 106a is moving downwardly.

The spring 108a urges head 110a upwardly, however, the force of the lever arm 106a on the raised portion of the head 110a moves the piston or plunger 76a into contact with the substrate and also into contact with the balls 80a connected to the pivot arms 70a. The pivot arms 70a are returned to a position normal to the surface of the tape due to the inwardly directed force from a spring (not shown). When the head 110a of the piston 76a reaches the position shown in FIG. 21, contact is made with override head 112a which is resiliently supported by spring 114a. Accordingly, complete collapse of the spring 108a is prevented thereby insuring long life thereof.

In the event the pins of the substrate have not completely entered the holes in the belt thereby causing the substrate to lie at an angle with respect to the belt, due to, for example, bent pins or some other defects, finger 116a, (FIG. 19), which is positioned to contact improperly oriented substrates, actuates a microswitch 118a thereby halting the operation of the loader mechanism. Additionally, a microswitch arrangement connected to bar 24a serves to stop the operation of the loader mechanism in the event the lever arm 34a is prevented from reciprocating due to blocking of the movement of pusher element 58a by improperly positioned substrates. Movable contact portion 122a of the microswitch arrangement 120a thus fails to contact the support member 30a in accordance with the predetermined time cycle when causing the loader mechanism to stop operating. The indexing operation permits substrates loaded onto the belt to be moved progressively to the right.

DIMPLER

Referring to FIG. 22, an elevational view of the dimpler assembly 6 is shown. With regard to FIGS. 22 and 28, shaft 10d is caused to reciprocate in the direction shown by arrows 12d by means of an eccentrically arranged drive assembly generally designated by reference numeral 14d. The drive assembly 14d comprises rotating driver shaft 25 and cooperating eccentric cam 16d (FIG. 22). The eccentrically arranged drive assembly 14d causes shaft 10d to reciprocate thereby causing lever arm 18d, which is pivotally connected at bifurcated lever arm portion 19d to shaft 10d by means of pin 20d located within coupling assembly 21d, to oscillate about the center of shaft 32d and to raise and lower the dimpler mechanism at the opposite end of lever arm 18d in the directions shown by arrows 22d (FIG. 28).

A pair of bifurcated arms 24d integrally connected to the lever arm 18d serve to engage floating pivot blocks 26d which move pins 28d that pass through holes 31d in hollow cylinder 30d.

Figure 27:
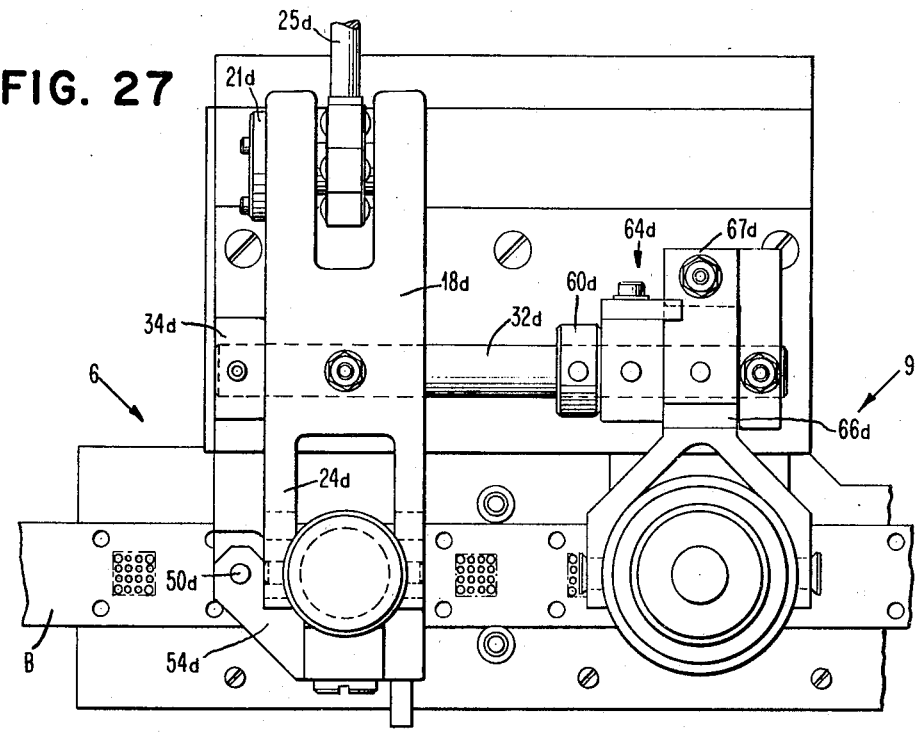
FIG. 27 is a top view of the dimpler and flux dispensing assemblies.
Figure 28:
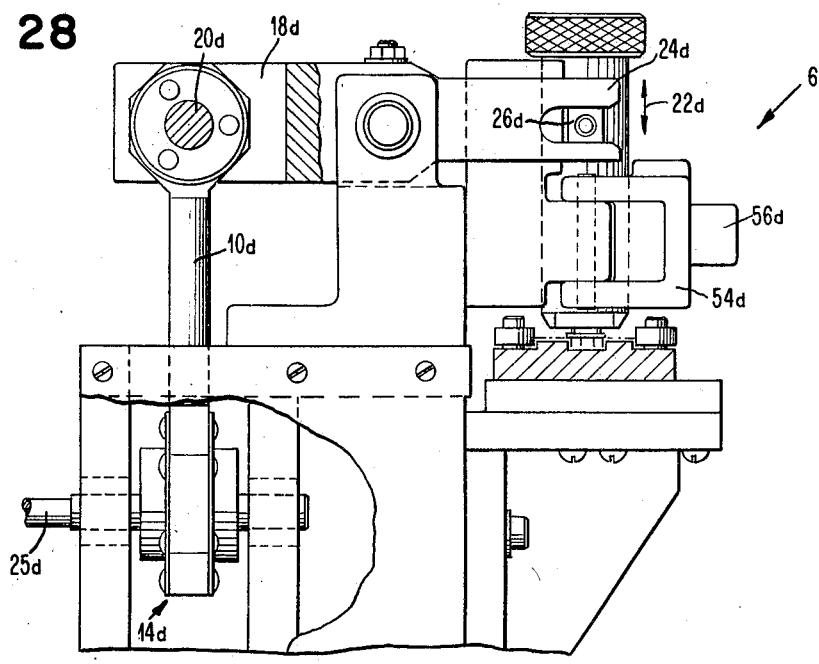
FIG. 28 is an elevational side view with parts in cross-section, showing the dimpler assembly of FIG. 22.

The lever arm 18d is connected to oscillating pivot shaft 32d which is movably supported within bearing 34d (FIGS. 27 and 28). The function of the shaft 32d with respect to operating the fluxer or flux dispenser 9 is described below.

Referring to FIG. 22, an override spring 36d is compressed below the pin 28d by cylinder section 38d. Accordingly, movement of the pin 28d in a downward direction due to engagement between the floating pivot blocks 26d with the arms 24d of the lever arm 18d functions to move cylinder section 38d downwardly compressing spring 36d and hence lowering cylinder 30d. In this manner, dimpler punches 40d (FIG. 23) which are pins containing three protrusions 42d move downwardly and are forced into the conductive solder lands on the substrate thereby coining three dimples into the conductive lands suitable for the subsequent insertion therein of the three contact balls of the transistor chip.

FIG. 23 is a view taken on line 23—23 of FIG. 22 and shows the arrangement of the dimpler punches 40d on a base plate 44d. FIG. 24 is an enlarged view of the dimpler punches 40d with the three protrusions 42d. FIG. 25 is a sectional view taken on line 25—25 of FIG. 24 showing the connection of the dimpler punch 40d to the base plate 44d.

Referring to FIG. 25, thin metal discs 46d are located above support plate 47d in the base plate 44d and a thin resilient member 48d, preferably of rubber, is sandwiched between the discs 46d. The discs 46d are preferably bonded to the resilient member 48d. In addition, the discs 46d above a square head portion 49d, which is connected to the dimpler punch 40d, is preferably sectioned in rectangular portions to permit each dimpler punch 40d individual resilient motion. The resilient member 48d permits the base plate 44d, dimpler punches 40d, and protrusions 42d to flex during the dimpling action on the solder lands to accomodate dimensional variations in land height and to reduce the possiblility of damaging the dimper punches 40d or the protrusions 42d in the event of inadvertent contact wtih the hard substrate.

Referring to FIGS. 22 and 27, pivot pin 50d mounted in frame 52d serves to permit locking arm 54d to swing out after turning lock member 56d a quarter of a turn. Removal of the dimpler assembly is permitted when the locking arm 54d is swung out.

FLUX DISPENSER

Referring to FIGS. 22 and 27 a flux dispenser 9 is shown which is connected to shaft 32d so as to operate simultaneously with the dimpler assembly 6. Connected to the shaft 32d is a collar 60d which is mounted adjacent to bearing 62d. A limit stop 64d is provided to limit the downstroke of the flux dispenser by limiting the upstroke at end portion 67d of bifurcated lever arm 66d, connected to shaft 32d and functions similar to the lever arm 18d of the dimpler assembly. A pair of floating pivot blocks 68d (FIG. 22) are respectively connected to a pair of pins 70d which are threadedly connected to opposite sides of a hollow container 72d. Accordingly, downward movement of the lever arm 66d causes the floating pivot blocks 68d which slide in the bifurcated lever arm 66d and operate in the same manner as shown and described with reference to the similar elements in the dimpler assembly, to lower the container 72d towards the substrate located on the belt below the flux dispenser. A plastic container 74d is located within the container 72d and liquid flux 76d, which is to be dispensed on the dimpled portions of the lands of the substrate, is contained therein.

A mask 78d with annular head portion 80d is located at the bottom end of and sealed to the container 72d. The upper end of plastic container 74d is sealed by a cap 75d. The annular head portion 80d has a recess portion which contains the neck of the plastic container 74d so as to permit the contents of the container 74d to communicate with apertures 82d in the mask 78d (FIG. 26). Recesses 77d provide clearance for the projecting pinheads of the substrate. Accordingly, air pressure can be pulsed into the flux container 74d by means of a solenoid air valve (not shown) and fitting 84d, which communicates with the flux container 74d, forces the flux fluid 76d through the apertures 82d in the mask 78d onto the substrate. The cycle time is such that air is continuously sucked out of the conduit 84d by a regulated vacuum pump (not shown) except during the period of the positive air pressure pulse. The vacuum is maintained during the period of time when the substrate is being indexed and positioned for the application of flux thereon and the air pressure pulse is applied when the substrate is properly positioned by the below described clamping assembly. Consequently, when the substrate is beneath the apertures 82d in the mask 78d, air is applied to the flux container 74d to force the flux fluid onto the substrate. The vacuum period of the cycle time prevents flux from dripping onto the belt.

FLUX FLATTENER

Figure 28A:
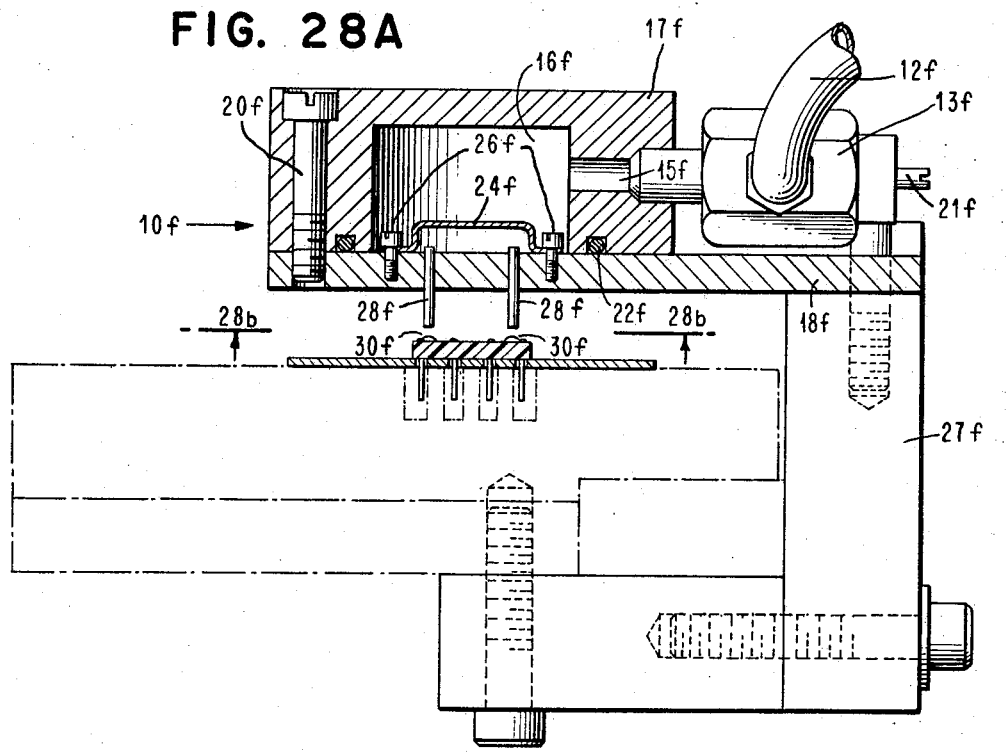
FIG. 28A is a sectional view of the flux flattener of this invention.

Referring to FIG. 28A, reference numeral 10f generally designates a flux flattener apparatus. A pneumatic air hose 12f, the other end of which connects to a solenoid air valve (not shown) is suitably connected by coupling 13f, threaded conduit 14f, and aperture 15f to a plenum chamber 16f which is located within a housing 17f. The housing 17f is fastened to a support base 18f by means of three screws 20f, only one of which is shown in FIG. 29. A needle valve 21f provides additional control of the air pressure flowing into the plenum chamber 16f. An O-ring 22f is used to provide a hermetic seal between the housing 17f and the support base 18f. Mounted within the plenum chamber 16f is a curved cap 24f which is open at each end and is bent and fastened by a pair of screws 26f to the support base 18f. The support base 18f and the coupling 13f are connected to a base member 27f by screws. Preferably, four nozzles 28f, one each for every transistor chip, are located beneath the cap 24f and extend through the support base 18f to direct air against raised flux portion 30f located on the substrate in order to evenly spread the flux on the substrate. The cap 24f functions to deflect air entering the plenum chamber 16f from the air hose 12f so that the air is evenly directed around and through each end of the cap 24f and dispersed equally through each of the nozzles 28f to effect a constant flux flattening operation. Accordingly, the cap 24f functions to shield the nozzles 28f from the direct flow of air into the plenum chamber 16f so that certain of the nozzles will not receive more air than the other nozzles thereby preventing the flattening of flux on the entire surface of the substrate. The flux, which is a composition of white rosin and alcohol functions to remove the oxide layers that normally develop on or are formed on the copper balls of the transistor chip and on the conductive lands on the substrate during the fabrication process. Removal of the oxide layers insures subsequent solder reflow joining and good electrical contact between the transistor chip and the conductive lands on the substrate, after the transistor chip and the substrate have subsequently been processed through a chip joining oven.

Figure 28B:
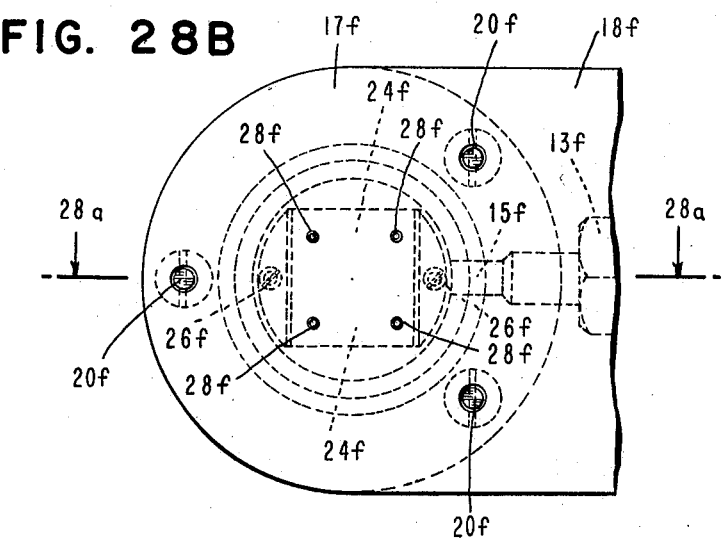
FIG. 28B is a view taken on line 28B—28B of FIG. 28A.

FIG. 28B is a view of the bottom portion of the support base 18f taken in the direction shown by arrows 30 of FIG. 28A. The relative positions of the nozzles 28f are shown with respect to the cap 24f and aperture 15f which are outlined by dotted lines to indicate their location behind the support base 18f. In one example, pulses of .25 lb. of air pressure per square inch was used to flatten the flux.

CHIP PLACEMENT HEAD

Referring now to FIGS. 29 and 30, chip placement head 17 includes eight stations, four of which are idle and four of which perform specific functions in regard to feeding, orienting and placing the transistor chips in their proper position upon a substrate. The major moving part of chip placement head 17 is spider 30h which is provided with eight radial arms, each of which supports a vacuum needle 18. Each vacuum needle 18 is adapted to pick up a transistor chip, transport it between stations, and place it in its proper position upon a prefluxed substrate. The spider is actuated by an index mechanism to be described hereinbelow. Prior to each arm of the spider reaching a station, the entire mechanism is in an elevated position to allow the needle to clear obstructions between stations. Upon arriving at the stations, the spider is lowered by the indexing mechanism and lower the vacuum needles into the respective stations. At the termination of the stations' operations, the indexing mechanism raises the spider and rotates the spider arm to succeeding stations.

Before proceeding to a more detailed description of chip placement head 17, the following summary of operations performed at each of the stations will aid in understanding the operation of the system. The ultimate purpose of chip placement head 17 is to provide a transistor chip at placement station 34h (FIG. 30) with its copper ball contacts oriented in such a manner as to exactly mate with the dimple pattern on the substrate land configuration, and deposit the chip in place upon the substrate at the correct time. To accomplish this function, vibratory feed bowl 19 performs the function of providing chips to a chip pick-up station 32b in a queued-up ball-contact down configuration. While the ultimate desire is to place each semiconductor chip on a substrate, this cannot be done unless the chip's ball-contacts are arranged to precisely mate with the substrate dimpled land pattern. Vibratory feed bowl 19 is incapable of assuring this required preset orientation. Accordingly, a vacuum needle 18 picks up a chip at pick-up station 32b and carries it to chip orientation sensor 20. Upon receiving a semiconductor chip, chip orientation sensor 20 performs two functions. First, a pair of guide jaws within the sensor 20 precisely locate the chip with respect to the tip of vacuum needle 18. In addition, when vacuum needle 18 inserts a chip in the ball-contacts down orietnation into chip orientation sensor 20, an oddly placed ball-contact acts to deflect a lever arm thereby providing an indication of the chips orientation. A signal is produced indicating the sensed orientation and is transmitted to chip T-bar orientor 21. The T-bar orientor responds to the signal by pre-rotating to a position where its T-bar head will mate with the ball contact pattern. The aforementioned guide jaws are opened and the chip is readied for the next index step. When vacuum needle 18 and its associated chip are next indexed to T-bar orientor station 21, the vacuum needle places the chip upon a rotatable T-bar which as aforestated has been pre-rotated to fit within the interior of the chip's contact pattern. The T-bar orientor 21 then rotates the chip on the end of vacuum needle 18 to the correct orientation for placement. In addition to correcting the angular orientation of the chip, the mating of the T-bar with the contact pattern of the chip provides a final precise orientation of the chip and assures that its contacts will exactly mate with the substrate dimple pattern. Vacuum needle 18 and its associated chip is then indexed through an idle station to chip placement station 34h where it is placed upon a prefluxed substrate borne by a conveyor tape (not shown).

In addition to the above-described stations, chip placement head 17 is provided with blow-off mechanism 27h and a recycle switch VD1. Blow-off mechanism 27h is positioned intermediate chip orientation sensor 20 and chip T-bar orientor 21. Blow-off mechanism 27h is shown in section in FIG. 31 and comprises an airblast head 31h and an operatively disposed channed 33h which leads to a receptacle. Blow-off station 27h is so positioned that during the indexing of a vacuum needle from chip orientation sensor 20 to chip T-bar orientor 21, the needle tip and its associated semiconductor chip pass directly between airblast head 31h and channel 33h. If for any reason chip orientation sensor 20 provides an output which is indicative of a malformed chip a chip held on end, a chip with insufficient ball-contacts, etc., it energizes a logic circuit which causes a blast of air to be applied to head 31h. This airblast is sufficient to dislodge a chip from the tip of a vacuum needle and cause it to enter channel 33h to the receptacle.

Recycle switch VD1 (FIG. 29) is basically a microswitch with a downwardly extending switch actuating lever 35h. Its operation in combination with other portions of chip placement head 17 will be described in greater detail hereinafter.

The main drive for chip placement head 17 comes from shaft 26 which feeds directly into head indexing mechanism 25h. This mechanism is described in greater detail hereinafter, but for the time being it will suffice to say that the mechanism provides an indexing drive motion via shaft 40h to spider 30h. It also provides a required vertical displacement of shaft 40h and spider 30h during the time when vacuum needles 18 are being indexed between stations (to prevent damage to the needle tips). As shown in FIG. 33, shaft 40h has a threaded portion which threads into interior threads in bushing 42h. Clamp 44h prevents rotary movement between shaft 40h and bushing 42h once the desire orientation between them has been established. Clamp 44h is tightened by virtue of a bolt which extends through hole 45h. Bushing 42h is shrunk to fit into spider collar 46h to prevent any relative movement therebetween. A centering plate and shaft 48h are rigidly affixed to spider collar 46h via a plurality of set screws. Vacuum distributor 50h fits down over the centering shaft 48h and provides the means for distributing both vacuum and positive air pressure to the respective arms of spider 30h. Directly over and mating with distributor 50h is vacuum manifold 52h which provides the function of supplying and switching vacuum and positive air pressure between various ones of the outputs of distributor 50h. Distributor 50h is rigidly affixed to and rotates with spider collar 46h by virtue of pins 54h which extend through centering plate 48h, bushing 42h and into collar 46h. A manifold top plate 56h fits directly over manifold 52h and is affixed thereto by set screws. Retaining plates 58h fit down over shaft 48h and rigidly force manifold 52h to bear against distributor 50h and provide an airtight seal therebetween. A bushing 60h is rigidly attached to the side of manifold top plate 56h by set screw 62h. The relative position of vacuum manifold 52h with respect to vacuum distributor 50h can be varied by causing a force to be applied to bushing 60h thereby causing a rotation of manifold top plate 56h and manifold 52h about the centering plate shaft 48h. The specific operation of this apparatus will be described in detail hereinafter.

Since each arm of spider 30h is structurally identical, only one need be explained. An isometric view of one arm is shown in FIG. 32 and the same arm in section is shown in FIG. 33. Spider arm 30h has an enlarged and slotted end portion 60h with a vertical hole drilled therethrough which is adapted to accommodate a vacuum needle holding fixture 62h. Fixture 62h comprises a round portion of bar stock 64h which has been slotted to accommodate vacuum needle 18. A cap 66h is attached to bar stock portion 64h. The center line of bar stock portion 64h falls to the right of the end of enlarged portion 60h of spider arm 30h. If it is thus desired to adjust the exact location of vacuum needle 32h, cap 66h may be grasped and rotated with a resultant lateral movement of vacuum needle 18 occurring due to the offset between the center line of bar member 64h and the enlarged end 60h. When set screw 68h is tightened, it draws the slotted portions of enlarged member 60h together, thereby gripping vacuum probe holding fixture 62h and preventing any further lateral movement thereof. Vacuum needle 18 is slidably mounted in necked cylinder 70h which is in turn held to vacuum probe holding fixture 62h by spring clip 72h.

The structure of a vacuum needle 18 is shown in FIG. 38. Outer housing 90h is a hollow tube with one closed-off end. At the upper extremity of housing 90h, a downward limiting stop 92h and slotted nut 94h are attached. Interior to housing 90h is a fixed bushing 96h which has slidably mounted therin hollow probe pin 98h. Attached to one end of probe pin 98h is an extended diameter collar 100h. A compression spring 102h bears down upon extended collar 100h and acts to maintain probe pin 98h in a downwardly extended position. Extending through housing 90h are a pair of tubes 104h and 106h. It should be noted that bushing 96h is attached to the inner surface of housing 90h only below the entry point of tubes 104h and 106h. Above their attachment point, there is a clearance space between housing 90h and the outer circumference of bushing 96h. Thus, if a vacuum is applied to tube 104h, not only will air be drawn up through probe pin 98h and down through the clearance area between bushing 96h and probe body 90h, but also, air will be drawn into tube 106h, around bushing 96h and into tube 104h. Thus, if a vacuum is applied to tube 104h and there is a semiconductor chip held at the end of probe pin 98h, all of the air drawn through vacuum needle 18 must come via tube 106h. If on the other hand, there is no chip held by probe pin 98h, a significant portion of the air drawn into tube 104h will be drawn through probe pin 98h thereby considerably reducing the vacuum applied via tube 106h. As will become hereafter apparent, this fact is utilized to control the recycle actuating mechanism.

An adjustable stop 110h surrounds housing 90h and provides a lower limiting stop for the travel of vacuum needle 18. FIG. 39 better shows the details of stop 110h. By causing nut 112h to be loosened, stop 110h may be moved either up or down on housing 90h. As can be seen by examining FIG. 55, vibratory feed bowl 19 has a stop 40b associated therewith. When vacuum probe 32h is lowered into feed bowl 19, stop 110h is adjusted to impact with stop 40b to prevent the tip of probe pin 98h from touching the surface of a semiconductor chip and thereby being damaged.

Returning now to FIG. 32, hose 120h connects tube 104h to a vacuum outlet nozzle 230h from vacuum distributor 50h. A filtering agent 124h is shown in a cutaway portion of hole 120h and prevents debris from being drawn up into the vacuum mechanism. An additional hose 126h connects tube 106h to the recycle lever actuation mechanism via vacuum port 128h. A constrictor 127h is inserted into hose 126h for a purpose to be hereafter discussed.

The purpose of the recycle lever actuation mechanism is twofold. It is basically a pneumatic logic element which reacts to the absence of a semiconductor chip at the tip of a vacuum needle by (1) raising the vacuum needle and (2) raising the switch actuating lever so that it may engage the recycle switch. The recycle lever actuation mechanism is supported by a vertically disposed housing 130h which is rigidly affixed to spider arm 30h. Pivotally mounted on the upper extended portion of vertical housing 130h is recycle actuation lever 132h. As can be more clearly seen in FIG. 33, a screw is threaded through recycle actuation lever 132h and is held in place by nut 136h. A hollow hex-head screw 138h is threaded into the extended portion of vertical housing 130h and forms the guide for a slidably mounted push pin 140h. Push pin 140h rests at its lower extremity upon impeller 142h. The lower portion of impeller 142h is threaded and extends through washer 144h, and diaphragm 146h to a diaphragm hold plate 148h. A guide pin 150h is attached to and points downwardly from diaphragm hold plate 148h. A bushing 152h is threaded onto the threaded portion of impeller 142h and holds washer 144h, diaphragm 146h and diaphragm hold plate 148h in a sandwich-like configuration. The outer circumference of diaphragm 146h is clamped between members 154h and 156h. Member 156h has an orifice 157h which houses compression spring 160h. A communicating orifice 162h connects to vacuum port 128h and hose 126h.

A leaf spring 170h is restrained at one end by a nut and shaft arrangement 172h. Compression spring 174h allows leaf spring 170h to pivot in the plane of the paper while maintaining it in its indicated position. A clearance hole 176h in leaf spring 170h mates with impeller 142h and locking pin 178h holds leaf spring 170h against bushing 152h. At its far extremity (see FIG. 32) leaf spring 170h is arranged to lock with slotted nut 94h via its separated arms 190h and 192h. Arm 194h bears upon the upper portion of slotted nut 94h.

In brief, the actuation of recycle lever 132h causes it to be tilted upwardly so that its end engages the downwardly extending arm 35h of recycle switch VD1 (FIG. 29). This indicates to the machine that no semiconductor chip is held by the tip of the associated vacuum needle and that when the placement operation occurs with this respective vacuum needle, that the conveyor tape must be held in place until the next vacuum needle is indexed into the chip placement station 34h. If this does not occur, the substrate which arrives at the chip placement station at the same time with the particular needle without a chip arrives, the substrate will obviously have no chip placed thereon and will be defective. At the same time lever 132h is raised, leaf spring 170h also raises vacuum needle 18 and prevents it from being immersed in the prefluxed surface of the substrate at chip placement station 34h. This action thereby prevents the needle from being clogged and carrying the flux to other portions of the chip placement head. It is vitally important in the operation of this machinery that no flux enter any portions thereof.

In the detailed description of the operation of recycle lever actuation mechanism which follows, FIGS. 32 and 33 will be primarily referred to. When spider arm 30h arrives at chip pickup station 32b it is lowered into place over the station through the action of the spider's movement. Stop 110h engages stop 40b in vibratory bowl 19 and causes leaf spring 170h to be flexed upwardly thereby preventing any vacuum needle bounce. At this time, no vacuum is applied via tube 120h to vacuum needle 18. In the recycle lever actuating mechanism, compression spring 160h pushes diaphragm 146h upwardly until washer 144h engages the bottom of member 154h. Impeller 142h is thus also moved upwardly and push pin 140h bearing against threaded screw 134h causes recycle lever 132h to be tilted upwardly (as shown in phantom in FIG. 32).

When vacuum needle 18 is placed over chip pickup station 36h, a vacuum is applied via hose 120h to the needle. The air which is thus caused to be drawn up through probe pin 98h (FIG. 38) picks up a semiconductor chip and causes the tip of probe pin 98h to be sealed. The vacuum applied via hose 120h must thereby be satisfied by the air flow through hose 126h. The increased vacuum in hose 126h is reflected into orifice 157h in the recycle lever actuation mechanism via port 128h and orifice 162h. The increased vacuum opposes the action of compression spring 160h and thereby brings diaphragm 146h down to the unstressed position shown in FIG. 33. Note that diaphragm 146h completely seals the vacuum system from the atmosphere and so long as a significant vacuum is applied via hose 126h diaphragm 146h will remain in its indicated position. When diaphragm 146h is drawn downwardly by the applied vacuum, the impeller 142h and push pin 140h are also drawn down with the result being that recycle actuation lever 132h is lowered to the horizontal position.

Immediately after a chip is picked up by vacuum needle 18 the amount of vacuum applied to tube 120h is somewhat lowered by vacuum manifold 52h (in a manner to be described hereinafter), but so long as a chip remains on the tip of probe pin 98h, the vacuum reflected through hose 126h is sufficient to overcome spring 160h and maintain diaphragm 146h in its unstressed position.

Should it occur that no semiconductor chip is picked up at chip pickup station 136h or, that during the indexing operation of the chip placement head, the chip is dislodged from the tip of probe pin 98h (e.g. by chip blowoff mechanism 27h), the following action occurs. The aforementioned reduced vacuum which was applied immediately after vacuum probe 32h left chip pickup station 36h is of sufficient quantity to maintain diaphragm 146h in its unstressed position only so long as the tip of probe pin 98h is sealed. If for any reason a semiconductor chip is dislodged therefrom, the resulting reduction in vacuum through hose 126h allows compression spring 160h to expand and raise diaphragm 146h to a point where washer 144h bears against the bottom of member 154h. This action, through the aforedescribed mechanism, causes leaf spring 170h to raise thereby raising vacuum needle 18 and also raises recycle lever 132h to its tilted position. Thus, when this particular vacuum needle leaves the chip T-bar orientor 21, the tilted portion of recycle lever 132h engages arm 35h of recycle switch VD1 (FIG. 29). The actuation of recycle switch VD1 inhibits the indexing of the conveyor tape for one cycle and allows a substrate on the tape to await the arrival of the following vacuum needle. The action of leaf spring 170h in raising vacuum probe 32h prevents the tip of probe pin 98h from being dipped into the flux on the surface of the positioned substrate, thereby preventing it from being clogged.

With reference now to FIGS. 34 to 36, vacuum manifold 52h and distributor 50h will be described. In FIG. 34, vacuum manifold 52h is shown in place over vacuum distributor 50h. The center shaft of centering plate 48h extends up through and aligns vacuum distributor 50h and vacuum manifold 52h with each other. To better visualize the structure of vacuum distributor 50h, refer to FIG. 35 where it alone is shown. A plurality of threaded fittings 200h are provided therein and adapted to accept vacuum nozzles (to be hereinafter described). Each threaded fitting is provided with two holes 202h and 204h both of which communicate with the upper surface of vacuum distributor 50h. Turning now to FIG. 36, a vacuum manifold 52h has been flipped over to show its underside which normally mates with the upper side of vacuum distributor 50h. Vacuum manifold 52h is provided with two inlet fittings, fitting 206h being utilized to provide vacuum and fitting 208h being utilized to provide pressurized air. Vacuum fitting 206h is provided with a hole 210h which communicates with a semicircular indented channel 212h. At one extremity, indented channel 212h is provided with a perpendicular leg 213h. Air inlet 208h is also provided with a hole 214h which communicates with the surface of vacuum manifold 52h. An atmospheric inlet 216h is also formed into the surface of vacuum manifold 52h.

Referring now back to FIG. 34, the relative positions of the air and vacuum inlets 206h and 208h respectively are shown as is also the location of channels 212h with respect to holes 204h. Note that hole 202h only has vacuum applied to it when it is coincidently positioned with perpendicular vacuum channel 213h. Note also that hole 214h in an inlet 208h is coincident with hole 202h in vacuum fitting 215h when both the air inlet and fitting are aligned.

Referring to FIG. 34A, a sectional view of a representative vacuum nozzle 230h in place in a vacuum fitting in vacuum distributor 50h is shown. When nozzle 230h is inserted into the vacuum fitting and tightened down, it compresses O-rings 232h and 234h to provide airtight seals. Hole 236h provides communication between the interior hollow section of nozzle 230h and hole 202h in vacuum distributor 50h. An additional smaller diameter hole 238h is drilled in aligning pin 240h and opens the interior of nozzle 230h to hole 204h in vacuum distributor 50h. With vacuum manifold 52h in place as shown, perpendicular channel 213h communicates with both holes 202h and 204h. Thus, if a vacuum is applied via vacuum inlet 208h, air may be drawn through both holes 236h and 238h and 202h and 204h respectively, to create a substantial vacuum at the outlet of vacuum nozzle 230h. If now, vacuum manifold 52h is rotated with respect to vacuum distributor 50h allowing only hole 204h to communicate with vacuum channel 212h, a "metered" vacuum is applied via hole 238h to vacuum nozzle 230h. This is the same reduced vacuum referred to hereinbefore which is applied to a vacuum needle immediately after it leaves pickup station 32b.

Figure 37A:
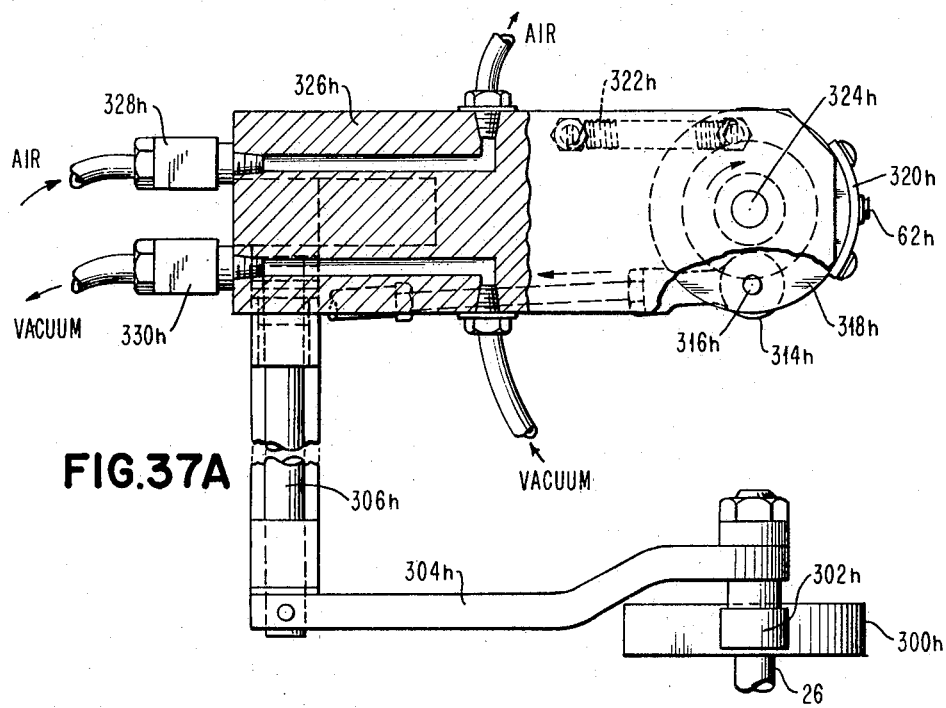
FIG. 37A is a plan view of the mechanism of FIG. 37.
Figure 37:
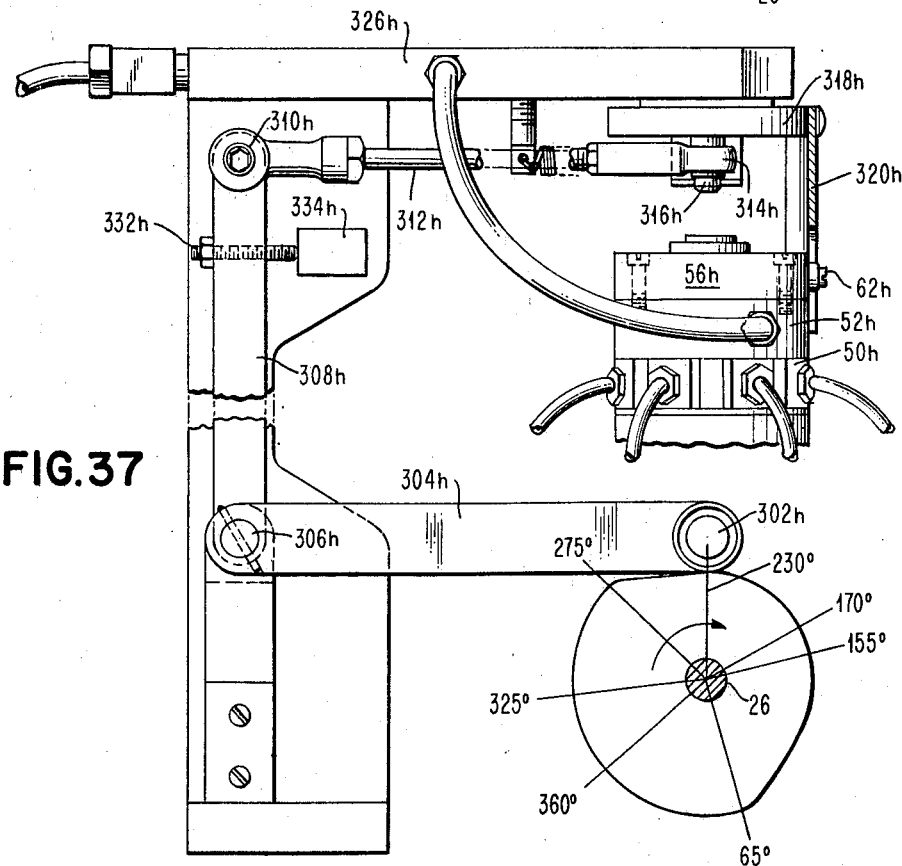
FIG. 37 is a side elevation of the cam and drive mechanism which causes relative movement between the vacuum distributor and vacuum manifold.

Referring now to FIGS. 37 and 37A, the means for providing controlled relative movement between vacuum manifold 52h and vacuum distributor 50h will be described. Cam 300h is mounted on shaft 26 and makes a single revolution for each index of chip placement head 17. Cam 300h is provided with a high dwell which extends between 275 degrees–65 degrees and a low dwell which extends from 155 degrees–230 degrees. From 230 degrees to 275 degrees is a relative "steep" rise to the high dwell, whereas from 65 degrees–155 degrees is a relatively gradual slope to the low dwell. Follower 302h is coupled to arm 304h which is in turn rigidly affixed to shaft 306h. Also rigidly affixed to shaft 306h is vertical arm 308h which terminates in ball joint 310h (not shown in FIG. 37A). A threaded screw 332h is mounted on 308h and engages fixed stop 334h to provide a forward limit to the movement of arms 308h. Emanating from ball joint 310h in a generally horizontal direction is manifold actuating arm 312h. The other extremity of arm 312h terminates in a bearing 314h which is rotatably mounted via pin 316h to disc 318h. Extending downwardly from, and rigidly affixed to disc 318h, is camming bar 320h which engages the bearing surface of nut 62h. Also attached to disc 318h is a preloading spring 322h. Disc 318h is mounted to rotate about shaft 324h which is anchored in a portion of frame 326h. Also forming a portion of frame 326h (FIG. 37A) are pressurized air inlets 328h and vacuum inlet 330h.

As cam 300h rotates, follower 302h rises up on the high dwell and causes arms 304h to rotate in a counter clockwise direction. This rotation imparts a like rotation to arm 308h which draws manifold actuating arms 312h to the left. This in turn causes a clockwise rotation of disc 318h which is transmitted to manifold top plate 56h via camming bar 320h and nut 62h. This action causes a relative clockwise rotation to occur between manifold 52h and distributor 50h and results in a movement of the relative positions of the vacuum channel and communicating holes respectively contained therein.

Figure 41A:
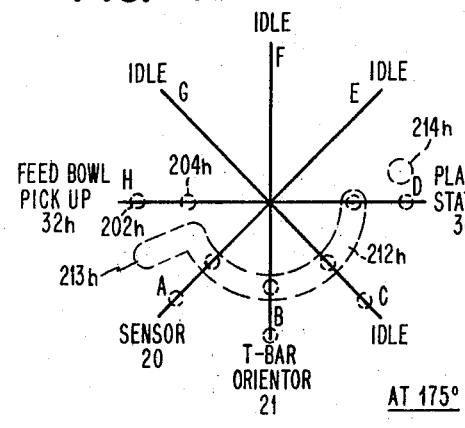
FIGS. 41a through 41d are line drawings showing the relative positions of the vacuum manifold and the vacuum distributor at discrete times during the operation of the chip placement head.

Referring now to FIGS. 40 and 41a and b, the complete operation of chip placement head 17 will be described. Before proceeding, however, it should be noted that in FIGS. 41a and b, each of the eight arms (a–h) of spider 30h is represented by a straight line and each of the particular stations is located as shown. Each straight line also denotes the location of the vacuum distributor nozzle associated with a respective spider arm. Superimposed on the line drawing is a representation of vacuum channel 212h and pressurized air hole 214h as they are both contained in vacuum manifold 52h. For purposes of explanation, only spider arm H will be hereinafter discussed. In FIG. 40, to which reference is now made, the horizontal axis is plotted in degrees of rotation of index shaft 26. The bars running horizontally in the figure are indicative of the actions at each station as well as the actions of the various portions of chip placement head 17.

Figure 41B:
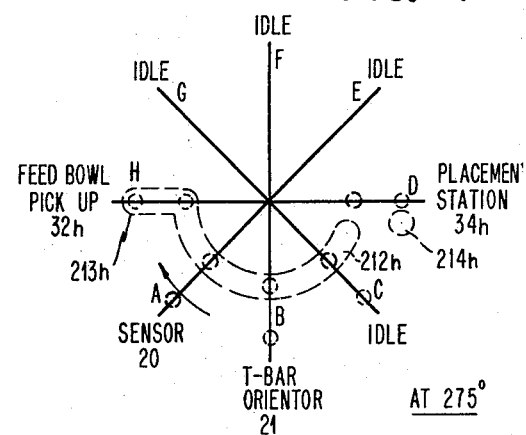

Assuming now that index shaft 26 is at 170 degrees, index mechanism 25h has just lowered the spider down to its low dwell and spider arm H is positioned directly over chip pickup station 32b. The stop on vacuum needle 18 is in engagement with the stop in vibratory feed bowl 19 and all is in readiness for a chip pickup operation to occur. Shaft 26 continues to rotate and at 230 degrees, cam 300h (FIG. 37) begins to cause follower 302h to rise towards the high dwell. This, in the course of events, causes a clockwise rotation to occur in disc 318h with a like rotation occurring in vacuum manifold 52h. Thus, manifold 52h begins a clockwise rotation of 22½ degrees with respect to vacuum distributor 50h, causing vacuum channel 212h to also rotate clockwise. At approximately 245 degrees, vacuum channel 212h loses communication with vacuum hole 204h associated with spider arm D. Substantially simultaneously, positive pressurized air hole 214h is positioned over hole 202h and causes a flow of pressurized air therethrough. Since at this time, spider arm D is directly over the prefluxed substrate at placement station 34h, the puff of pressurized air is transmitted to vacuum needle 18 via hose 120h (FIG. 32) and positively pushes the chip down onto the fluxed surface of the substrate thereby assuring a positive connection therebetween. At this point restrictor 127h in hose 126h comes into play and delays the amount of the puff of pressurized air to the recycle lever actuation mechanism. This allows the chip to be set before the pressurized air causes the actuation of the recycle lever mechanism via diaphragm 146h. At 275 degrees (FIG. 41b) perpendicular vacuum channel 213h is in full communication with holes 202h and 204h of vacuum nozzle 230h associated with spider arm H. This applies a full vacuum to the associated vacuum needle 18 and causes a chip to be drawn up to the end of probe pin 98h. The application of the full vacuum to the vacuum needle acts to draw diaphragm 146h to its nonstressed position whether there is a chip present at chip pickup station 32b or not.

Figure 41C:
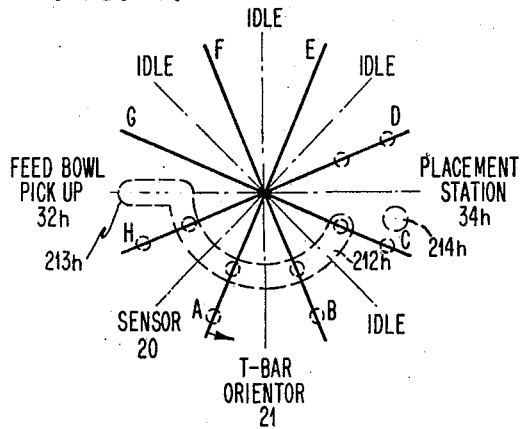

When shaft 26 and cam 300h reach approximately 325 degrees, index mechanism 25h raises the spider and begins to rotate it and vacuum distributor 50h in a counter clockwise direction. Vacuum manifold 52h does not change position, however, since cam follower 302h is still riding on the high dwell of cam 300h. As can be seen from FIG. 41c, spider arm H has only hole 204h communicating with vacuum channel 213h. This relative rotation results in metered vacuum being applied via hole 204h to the vacuum needle on spider arm H. It is at this time that the operation of the recycle lever actuation mechanism occurs if no chip was picked up at chip pickup station 32b. As will be recalled, the metered vacuum which passes through hole 204h is sufficient to maintain diaphragm 146h in its nonstressed position only if a chip seals the bottom of probe pin 98h. If no chip has been picked up, recycle actuation lever 132h is tilted to interact with recycle switch lever 35h. At 65 degrees each arm of spider 30h is halfway between stations (FIG. 41c). At this point, follower 302h enters the gradual fall on cam 300h to the low dwell. Thus, vacuum manifold 52h begins to rotate in a counter-clockwise direction back to its original position. The combined rotations of vacuum manifold 52h and spider 30h continue until at 155 degrees (FIG. 41d) follower 302h reaches the low dwell of cam 300h, at which point the rotation of vacuum manifold 52h ceases. As can be seen from FIG. 39, spider 30h is at this point in the middle of its downward travel in preparation for the next cycle of operation.

Figure 41D:
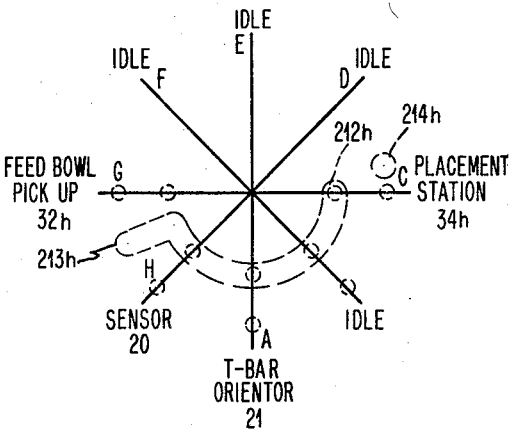
Figure 45:
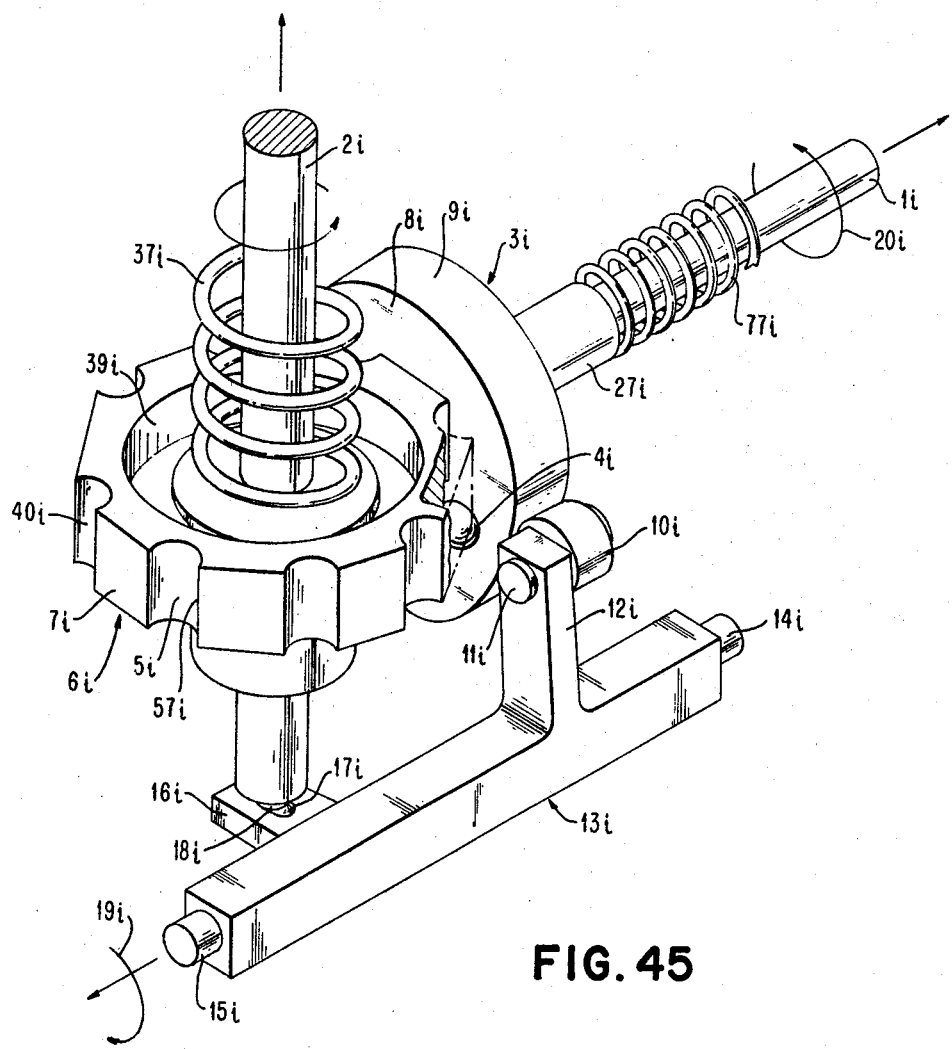
FIG. 45 is a schematic prospective view of the essential parts of the indexing mechanism with the housing and other deails omitted for clarity in illustration.
Figure 46:
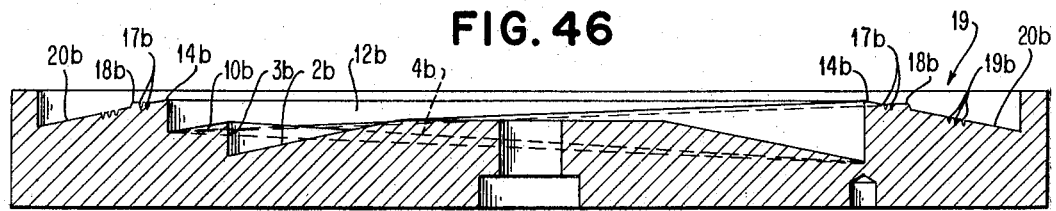
FIG. 46 is a cross-sectional view of the vibratory bowl feeder taken on line 46—46 of FIG. 53.
Figure 47:
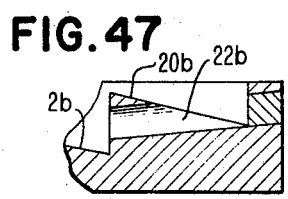
FIG. 47 is a detailed view in broken section taken on line 47—47 of FIG. 53.
Figure 48:
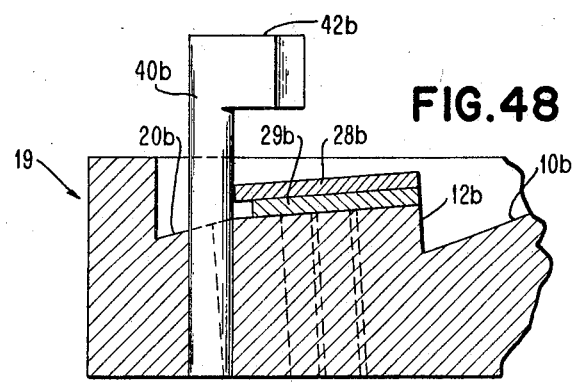
FIG. 48 is a detailed view in enlarged scale in broken section taken on line 48—48 of FIG. 53.
Figure 51:
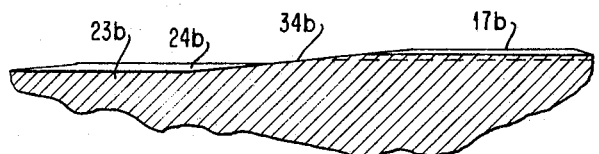
FIG. 51 is a detailed view in broken section taken on line 51—51 of FIG. 53.

In FIG. 41d, the positioning of the various spider arms A–H at the end of the cycle is indicated. The next cycle commences immediately after the operations at each of the respective stations.

PLACEMENT HEAD INDEXING MECHANISM

The indexing mechanism which provides the above-described rotary and vertical movements of chip placement head spider 30h is shown in FIGS. 42 to 45 and will now be described. The indexing mechanism comprises an input shaft 1i and an output or spider shaft 2i to which said spider 30h is fixedly secured. A cam 3i is fixedly mounted to one end of input shaft 1i and is provided on its end face with an actuating pin 4i for drivingly engaging the semi-cylindrical grooves 5i formed in the periphery of an index plate 6i fixedly secured on the output spider shaft 2i.

Between each pair of adjacent grooves 5i the periphery of index plate 6i is formed with a flat surface 7i which is engaged by the planar end face 8i of cam 3i after each indexing movement to maintain spider 30h in the exact desired position. Input shaft 1i and cam 3i are axially movable in directions toward and away from index plate 6i to permit the latter to be rotatably indexed. Sprint 77i urges input shaft 1i and cam 3i radially inwardly toward the axis of spider shaft 2i to maintain cam end face 8i in engagement with index plate 6i.

As input shaft 1i and cam 3i rotate, a semi-spherical actuating pin 4i enters the lower end of one of the grooves 5i and moves first upwardly and then downwardly therein to angularly displace index plate 6i and spider shaft 2i therewith through an angle of 45 degrees by the time pin 4i leaves the lower end of said groove 5i.

The vertical edge 57i at the intersection of the cylindrical surface of each groove 5i and the adjacent planar surface 7i is at a greater radial distance from the axis of shaft 2i than any other part of said surface 7i. Therefore as index plate 6i starts to rotate the trailing edge 57i of the engaged surface 7i pushes against cam face 8i to urge cam 3i and input shaft 1i in a direction radially outward from the axis of output shaft 2i so as to further compress spring 77i. The leading edge 57i of the next adjacent flat surface 7i again pushes against cam face 8i to urge cam 3i and input shaft 1i outwardly against the action of spring 77i. When said next adjacent flat surface 7i becomes parellel to cam face 8i spring 77i urges input shaft 1i and cam 3i toward index plate 6 to cause said cam face 8i to engage said next flat surface 7i on the periphery of index plate 6i. Index plate 6i and spider shaft 2i are thus maintained stationary in the proper angular position until actuating pin 4i engages the next adjacent groove 5i to repeat the rotary indexing motion.

The vertical motion of spider output shaft 2i is provided in the following manner. The periphery of cam 3i is provided with a cam surface 9i engaged by a cam follower 10i rotatably mounted on a follower shaft 11i projecting horizontally from the upper end of a vertical arm 12$i$ having its lower end integral with a spider shaft vertical actuator indicated generally at 13$i$. The latter is provided at its opposite ends with coaxially-aligned bearing pins 14$i$, 15$i$ for rotatable movement about the axis of the latter. Spider shaft vertical actuator 13$i$ is further provided with a radially outwardly extending arm 16$i$ having at its outer end a spherical recess 17$i$ for seating a spherical ball 18$i$ which engages the lower end of spider shaft 2$i$.

As best seen in FIG. 43, cam surface 9$i$ is provided with a rise portion 91$i$ and a dwell portion 92$i$. As cam follower 10$i$ approaches rise portion 91$i$ spider shaft vertical actuator 13$i$ is angularly displaced about the axis of bearing pins 14$i$, 15$i$, in the direction indicated by the arrow 19$i$ thereby causing arm 16$i$ to swing upwardly to raise spider shaft 2$i$ and thereby provide the upward vertical movement of spider 30$h$. As input shaft 1$i$ continues to rotate in the direction of the arrow 20$i$, cam follower 10$i$ eventually approaches dwell portion 92$i$ to permit spider shaft vertical actuator 13$i$ to rotate about the axis of bearing pins 14$i$, 15$i$ in the direction opposite to that of arrow 19$i$, thereby permitting arm 16$i$ to swing downwardly so as to lower spider shaft 2$i$ and thereby provide the required downward movement for spider 30$h$.

The indexing mechanism is enclosed within a housing indicated generally at 21$i$ and provided with mounting lugs 22$i$ secured by screws 23$i$ to said base plate 32$h$ of chip placement head 17. One lateral wall 24$i$ of housing 21$i$ is integrally formed with a horizontally extending cylindrical bearing enclosure 25$i$ having an internal cylindrical bore 26$i$ therethrough. Mounted within the latter are a pair of axially spaced tubular bearing sleeves 27$i$, 28$i$ within which input shaft 1$i$ is rotatably mounted. The outer end of bearing enclosure 25$i$ has an end plate 29$i$ fixedly mounted therein and provided with an opening through which input shaft 1$i$ extends outwardly. The outer end of bearing sleeve 28$i$ abuts against the inner end face of plate 29$i$ to limit the outward axial movement of sleeve 28$i$. The inner end of sleeve 28$i$ bears against the outer end of said spring 7$i$ which has its inner end abutting against the outer end of the other sleeve 27$i$. The inner end of the latter engages cam 3$i$. It will thus be seen that spring 7$i$ is under compression to urge sleeve 27$i$ inwardly against cam 3$i$ thereby urging both input shaft 1$i$ and cam 3$i$ inwardly to maintain end face 8$i$ of cam 3$i$ in engagement with the periphery of index plate 6$i$.

Housing 21$i$ further comprises a top plate 30$i$ secured by screws 31$i$ and integrally formed with an upwardly projecting cylindrical bearing housing 32$i$ having therein a conventional bearing means including sleeves 33$i$, 34$i$ and packing 35$i$ for mounting spider shaft 2$i$ for both rotary and vertical reciprocal movement.

Housing 32$i$ is formed with an integral cylindrical portion 36$i$ extending downwardly from top plate 30$i$. A compression spring 37$i$ has its upper end surrounding said portion 36$i$ and in abutment against the lower surface 38$i$ of top plate 30$i$. The lower end of spring 37$i$ extends within a cylindrical recess 39$i$ formed in index plate 6$i$ and engages an abutment element 40$i$ to urge index plate 6$i$ together with spider shaft 2$i$ downwardly and thereby maintain the lower end of spider shaft in engagement with ball 18$i$ on the seat 17$i$ formed in arm 16$i$.

Spider shaft 2$i$ is fixedly secured to index plate 6$i$ by a pin 41$i$ extending transversely through a hub portion 42$i$ of index plate 6$i$. Index plate 6$i$ is formed with a plurality of openings 43$i$ to permit lubricating oil to flow therethrough.

Input shaft 1$i$ is drivingly rotated by one-revolution clutch 31 (FIG. 4) through said shaft 26 which is coupled to shaft 1$i$ by a first flexible bellows coupling 44$i$ (FIG. 44), a spline coupling 45$i$ and a second bellows coupling 46$i$. As shown in FIG. 44A, spline coupling 45$i$ is conventionally constructed and comprises an inner male element having splines 48$i$ to permit non-rotatable sliding motion within an outer female element 49$i$.

VIBRATORY BOWL FEEDER

The vibratory bowl feeder has the function of providing individual semiconductor chips C in the proper upright position to the pickup probe or vacuum needle 18. The semi-conductor chips C are relatively small, being in the order of 28 by 28 mils and having a thickness of 8 mils. With ball terminals B attached, the total thickness of the semiconductor chip is approximately 13 mils. In order to fulfill the aforementioned function, the vibratory bowl feeder 19 must be capable of dependably and consistently moving the very small semiconductor chips contained in a reservoir in haphazard order to the pick-up station 32$b$ with the ball terminals B down, and with the chip C suitably oriented for transfer to the chip orientation sensor.

A preferred specific embodiment of the vibratory bowl feeder, which forms a part of the overall combination apparatus, is shown in FIGS. 46 through 55. The bowl 19 is supported in a horizontal position and is actuated by a vibratory motor mechanism that moves the bowl simultaneously upwardly and angularly to effect the desired movement of the semiconductor chips contained in the bowl. More specifically, the bowl is moved upwardly a distance of approximately 2 mils while it is simultaneously rotated in a counter-clockwise direction a distance of approximately 4 mils, measured at the perimeter of the bowl. The vibrations that the bowl 18 is subjected to can be of any suitable frequency. However, we have found that movement on the order of 120 vibrations per second works very well. The mechanism for vibrating the bowl is well known in the arts and will not be described.

Referring now to FIG. 53, there is shown a central reservoir area 2$b$ in which semiconductor chips C are periodically loaded. The chips are merely deposited in the reservoir area without any effort to arrange them in a particular order. The reservoir area 2$b$ is a circular central depression in the bowl having an outwardly inclined angular sloping surface bounded by a peripheral wall 3$b$, shown more clearly in FIG. 46. Spaced radially upwardly from the reservoir 2$b$ is an upwardly inclined outwardly sloping circular ramp 4$b$ having a lower end 5$b$ providing a continuous smoothly sloping surface from reservoir 2$b$. Still another upwardly inclined outwardly sloping circular ramp 6$b$ is provided and serves as continuation of ramp 4$b$. As most clearly shown in FIG. 53, ramp 6$b$ is spaced radially outwardly from ramp 4$b$. Between the upper end 7$b$ of ramp 4$b$ and the lower end 8$b$ of ramp 6$b$ there is an inclined surface area 10$b$ in which the surfaces of extensions of ramps 4$b$ and 6$b$ smoothly join. In ramp 6$b$ there is provided a cut-out 11$b$, the end of which is spaced from the outside of ramp 6$b$. The outside of ramp 6$b$ is bonded by a circular vertically extending wall 12$b$ as most clearly shown in FIG. 33. Spaced radially outwardly from ramp 6$b$ is a ledge 14$b$ having an outwardly inclined angular surface, as most clearly shown in FIG. 46. The upper end 15$b$ of ramp 6$b$ is approximately even with the top of ledge 14$b$. An area 16$b$ is provided where the surfaces of the top 15$b$ of ramp 6$b$ and ledge 14$b$ are continuous. Two small grooves 17$b$ are provided in the top surface of angular ledge 14$b$, as most clearly shown in FIGS. 46 and 49. Spaced radially outwardly from grooves 17$b$ is a ledge 18$b$. Spaced downwardly from ledge 18$b$ are three grooves 19$b$, which are provided in annular outwardly tapered surface 20$b$.

Figure 49:
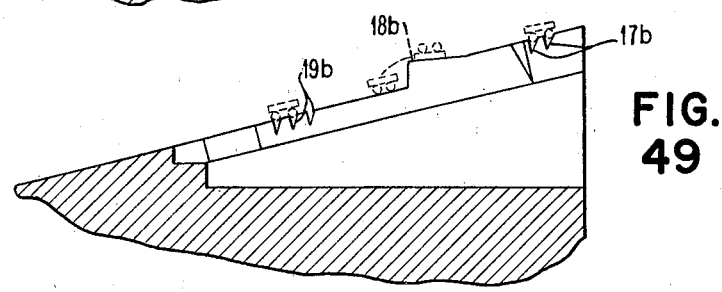
FIG. 49 is a detailed view in enlarged scale in broken section taken on line 49—49 of FIG. 53.
Figure 50:
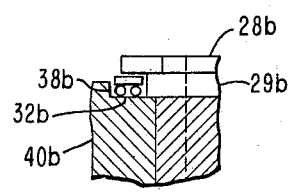
FIG. 50 is a detailed view in enlarged scale in broken section taken on line 50—50 of FIG. 54.
Figure 52:
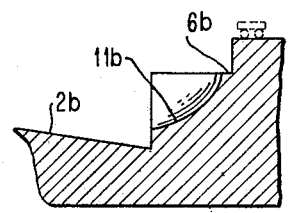
FIG. 52 is a detailed view in broken section in enlarged scale taken on line 52—52 of FIG. 53.

In operation semiconductor chips C are deposited in the reservoir area 2$b$. When the bowl is vibrated in the manner described previously, the chips work their way to the outside of the reservoir area 2$b$ and subsequently, progress counterclockwise up ramp 4$b$ generally staying to the outside of the ramp. The outwardly inclined surface of ramp 4b has a tendency to move the chips to the outside and to align same in a single file or column. The chips, as they proceed up ramp 4b, enter the surface area 10b and move radially outwardly to thereby continue up ramp 6b. The cut-out 11b causes all except the outside row to fall back into the reservoir 2b to begin over. The outside row of chips continues up ramp 6b and arrives at surface area 16b. Upon arrival to surface area 16b the vertical surface 12b no longer prevents the chips from moving radially outwardly. The chips with the copper ball terminals B down are caught in grooves 17b and proceed counterclockwise in single file around the top of the ledge 14b. In FIG. 49 there is illustrated a semiconductor chip C with the ball terminals riding in the grooves 17b. When a semiconductor chip arrives on the top of ramp 6b in an upside down position, that is with the ball terminals extending upwardly, the chip will slide across grooves 17b. As indicated in FIG. 49, the chip in an upside down position will be flipped over as it falls over the edge of ledge 18b and will subsequently be captured in grooves 19b. The chips in engagement with grooves 19b will then progress around the bowl 19 to the nesting station 32b which will be described hereinafter. Only two grooves 17b are provided in the upper ledge 14b in order to prevent the formation of more than a single row of semiconductor chips. Three grooves 19b are provided in the area below the ledge 18b in order to increase the probability of capturing the chips that have been flipped over. Any chips that do not become engaged in grooves 17b or 19b slide to the outside edge of angular surface 20b and subsequently fall into downwardly inclined aperture 22b where they are diverted back to the reservoir area 2b to begin anew the cycle.

On vibratory bowl 19 is provided a relatively large outwardly sloping flat area 23b positioned adjacent the ends of grooves 17b and 19b. An intermediate downwardly inclined ramp 34b connects the ends of grooves 17b and the surface 23b as most clearly shown in FIGS. 49 and 53. The outside edge of surface 23b is bonded by a relatively small upwardly extending surface 24b. Semiconductor chips that work their way around in grooves 17b and 19b are diverted downwardly and outwardly by surface 23b and are aligned, usually in single file against surface 24b preparatory to being received in the pick-up or nest area 32b. A feeding track 25b serves as an extension of sloping surface 23b and receives the semiconductor chips that slide off grooves 17b and 19b. An inwardly downwardly inclined surface 26b spaced from the inside edge of the feeding track 25b causes all but a single outside row of chips to slide down to area 10b and re-enter ramp 6b. The outside surface of the feeding track 25b is also bonded by a small vertically extending wall 31b to prevent the chips from sliding outwardly to surface 20b. On the termination point of feeding track 25b is provided a chip nest 32b. The bottom of the nest 32b is formed by a carbide insert 27b in order to prevent undue wear, etc. that may otherwise disrupt the operation of the bowl 19 over a prolonged period of use. A vertically extending wall 38b is provided in carbide insert 27b to serve as a continuation of the outside wall 31b of feeding track 25b. A nest case is provided which is formed of two thin metal plates 28b and 29b. Plate 29b is positioned beneath 28b and provides the necessary clearance to position plate 28b above the surface of the bowl. Plate 28b is provided with two protrusions 30b and 36b. A semiconductor chip upon arrival to nest 32b must pass under projections 30b and 36b. In operation while the chip in the nesting station 32b is being picked up by the vacuum needle 18, the next chip in line is positioned under ledge 38b which guards same from being moved out of position, etc. The cut-out between 30b and 38b is provided to facilitate cleaning to the feeding track. As most clearly shown in FIG. 6B, an L-shaped probe stop 40b is seated in the bowl adjacent the nest 32b. The upper surface 42b serves as an abutment for the vacuum needle 18 as it moves into position to pick up the semiconductor chip C positioned in the nest 32b.

Chip orientation sensor

Figure 61:
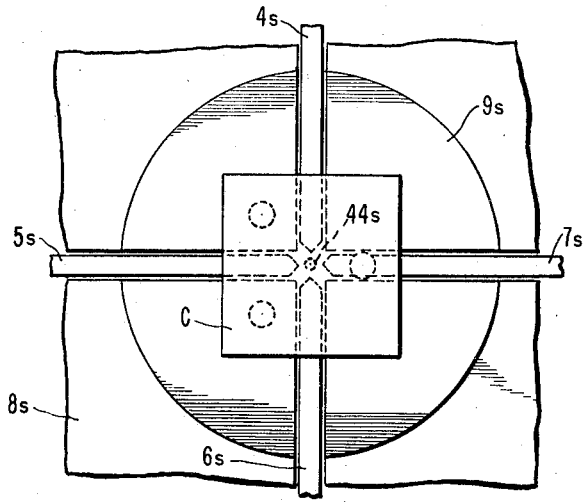
FIG. 61 is a detailed view in greatly enlarged scale showing the sensing station of the chip orientation sensor of our invention.

After the semiconductor chip is picked up from the vibratory bowl feeder 19 it is transferred to the chip orientation sensor 20 to determine the relative location of the terminal ball contacts B preparatory to its placement on the substrate. Basically, the function of the chip orientation sensor 20 is to determine the position of the ball terminals and produce an electrical signal that will enable the chip orientor 21 to reposition the chip if it is positioned improperly. The ball contacts on the semiconductor chip are arranged in a triangular pattern, as illustrated in FIG. 61. The chip C must be oriented on the probe 18 to the proper position so that it can be placed in the proper relation on the substrate when the probe arrives over the tape belt conveyor 3.

Figure 60:
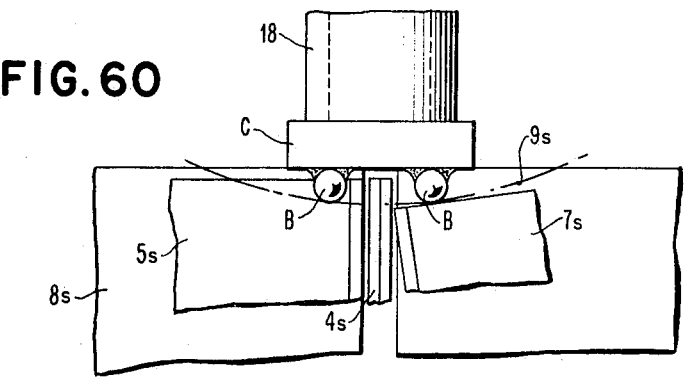
FIG. 60 is a detailed view in broken section in greatly enlarged scale of a side elevational view of the sensing station.
Figure 59:
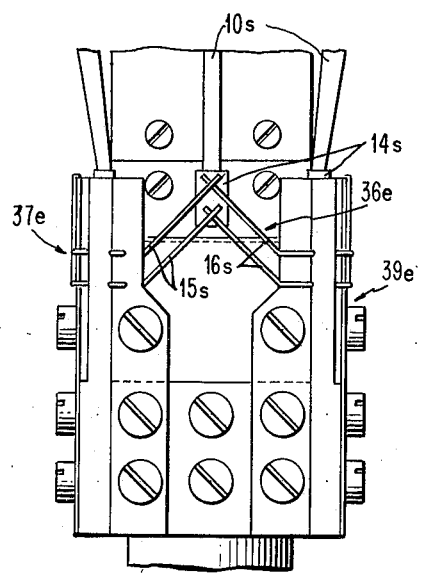
FIG. 59 is a detailed view in broken section taken on line 59—59 of FIG. 57.
Figure 76:
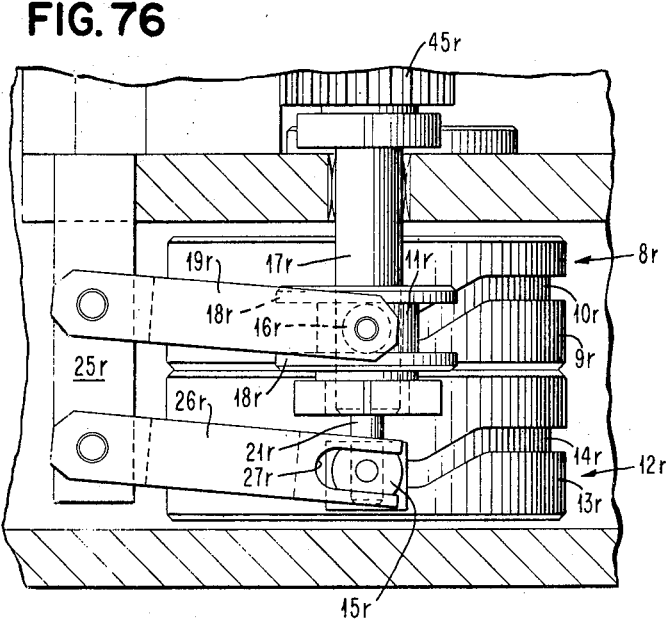
FIG. 76 is a detailed view showing the front elevation of the camming mechanisms for actuating the turret head and the clamp release mechanism.
Figure 77:
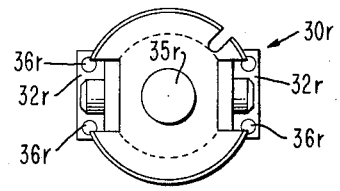
FIG. 77 is a top elevational view in enlarged scale of the substrate clamp.

In FIGS. 56 to 61 there is illustrated a preferred specific embodiment of the semiconductor chip orientation sensor 20 for use on the combination apparatus of the invention. The chip orientation sensor 20 has a base 2s which serves as a mounting element for the numerous components of the sensor. A head 3s is affixed to the top of base 2s, as most clearly shown in FIGS. 57 and 58. The actual sensing elements of the orientation sensor 20 are four separate blade elements 4s, 5s, 6s and 7s, shown in greatly enlarged scale in FIG. 61. When a semiconductor chip C is moved downwardly over the blades and properly positioned relative to same, one of the ball contacts B will depress one, and only one, of the blades. In FIG. 60 there is illustrated a ball contact B depressing blade 7s, it can be seen that since the semiconductor chip is square there are four possible angular positions in which it can be positioned on the probe 18, and only one of which is the proper position.

The four blades 4s, 5s, 6s and 7s are positioned in a blade guide 8s in which there are provided four separate slots that receive the blades. As most clearly indicated in FIG. 60, a concave depression 9s is machined in the top surface of blade guide 8s. The concave depression 9s allows sufficient clearance for the two remaining ball terminals B and do not contact and depress the knife blades. As more clearly shown in FIG. 57, each of the blades is supported on an L-shaped pivot arm 10s. Upright pivotal supports 11s, provided with bifurcated portions 12s to receive and pivotally support arms 10s, are mounted in base 2s. It can be seen that when a blade is depressed the lower end of the L-shaped arm 10s is pivoted outwardly. The lower end of arms 10s are provided with insulating pads 14s which serve as a means to close contacts 15s and 16s of electrical switches 36e, 37e, 38e and 39e. Both contacts 15s and 16s are mounted on base 2s and insulated therefrom. Outward movement of the lower end of arm 10s forces the electrical contacts 16s outwardly into contact with contacts 15s to close the electrical switch. It can be seen, assuming that the semiconductor chip is not defective, that each of the four possible positions will produce a different signal considering the four separate switches. An electrical signal is then produced with this switch arrangement which is used to actuate a chip T-bar orientor at the following station to properly turn the chip on the probe, if such is necessary, when it arrives at the station.

Figure 56:
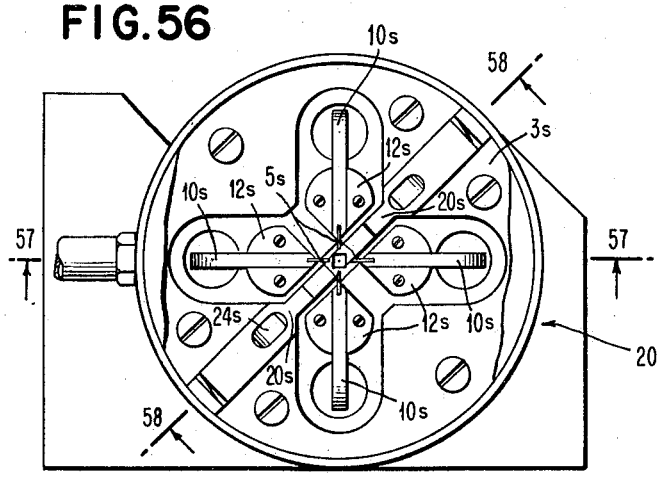
FIG. 56 is a top plan view of a specific embodiment of the chip orientation sensor apparatus of our invention.
Figure 57:
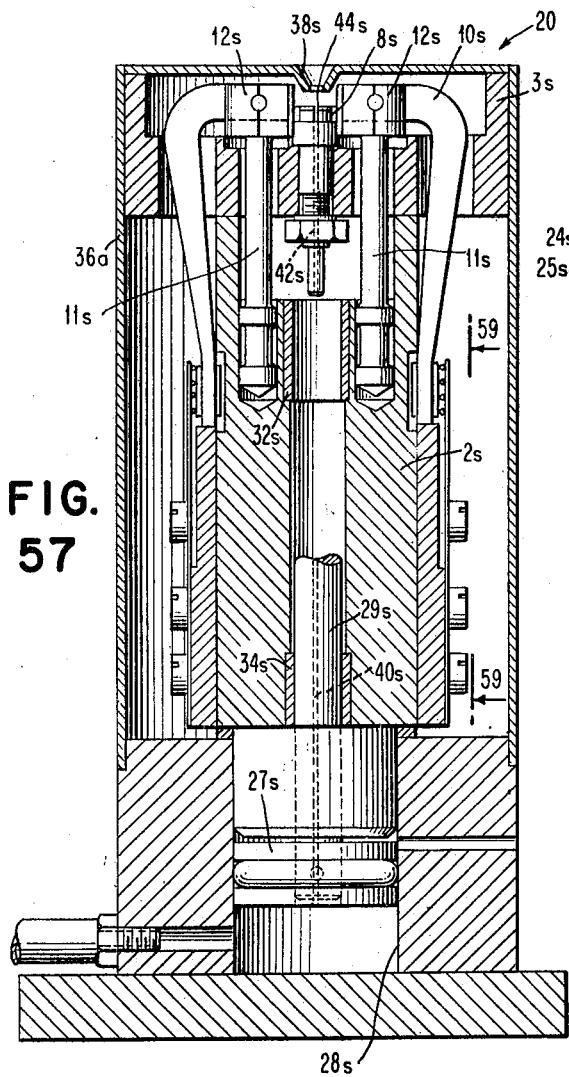
FIG. 57 is a vertical sectional view taken on line 57—57 of FIG. 56.
Figure 58:
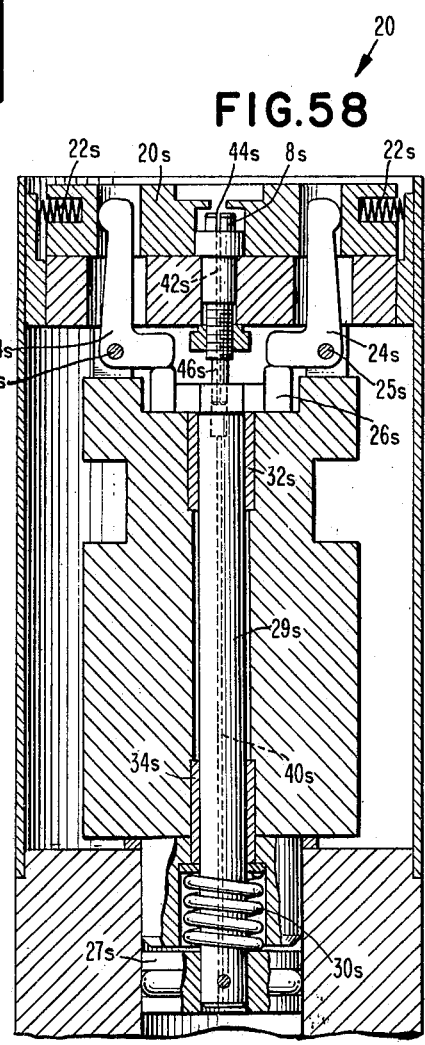
FIG. 58 is a vertical sectional view taken on line 58—58 of FIG. 56.

In order to more accurately position the semiconductor chip C relative to the blades 4s, 5s, 6s and 7s, a pair of opposing guide jaws 20s are provided which are positioned above the blades. In FIGS. 56 and 58, there is depicted the structure of the guide jaws. The jaws 20s are each provided with two diagonal and transverse surfaces adapted to slidably engage the adjacent edges of the chip. Compression springs 22s are provided to bias the jaws 20s inwardly into operative engagement with a chip to be positioned over the blades. The jaws in effect form a guide channel that corrects any minor misalignment of the chip. In order to open the jaws 20s after the sensing operation is complete, there is provided an air operated actuating mechanism. Two L-shaped arms 24s are pivotally mounted on the head by pins 25s with the upper leg portions in abutting engagement with the jaws 20s and with the lower end portions directed radially inwardly. An abutment element 26s engages both of the inwardly directed legs of arms 24s. A piston 27s is slidably mounted in a cylinder 28s and connected to piston rod 29s. Upward movement of piston 27s forces the abutment element 26s upwardly into actuating engagement with the arms 24s, thus spreading the jaws to allow easy removal of a semiconductor chip from the sensing station. The jaws 20s are opened sufficiently wide to allow a chip that is slightly irregular in shape to leave the station unhindered by the jaws. Closure of the jaws accurately and positively aligns the chip over the blades in position for the sensing operation. Spring 30s biases the piston 27s downwardly to allow springs 22s to close the jaws. A piston rod 29s is slidably supported by sleeve bearings 32s and 34s. Piston 29s is also provided with a longitudinally extending air passage 40s which communicates with air passage 42s, which terminates in opening 44s in the center of blade guide 8s. In operation, when air under pressure is admitted to cylinder 28s, air passes through passages 40s and 42s to escape through openings 44s to blow the chip from the sensing station if it should become dislodged from the probe or any part thereof. The air blast is delayed for an instant that it takes for the top portion of piston rod 29s to couple with the extending tube 46s. A cylindrically shaped housing 36s having a central aperture 38s encloses the entire chip orientation sensor mechanism.

In operation, a semiconductor chip C with the ball terminals extending downwardly is lowered by the pickup probe through aperture 38s and between the jaws 20s which are normally in closed guiding position. The chip is then gently urged downwardly with one ball contact of the chip depressing one of the blades which makes possible the production of an electrical signal. Unless only a single blade is forced down the chip is rejected from the probe after it is removed from the sensor. If, however, the chip is held in an upside down position on the probe, all the blades will be actuated. This will also produce a signal instructing the machine to blow the chip off the probe. Further, if the terminal ball contact intended to contact the knife blade is missing or off location, no blades will be contacted. In this instance the chip will also be rejected. After the sensing operation is completed, the guide jaws are opened by the piston and cylinder, and the probe with chip still attached raised and moved to the chip T-bar orientor 21. An instant after the jaws 20s are opened a stream of air will issue from opening 44s to blow out the chip if it should become dislodged from the probe, or any part thereof that may have broken off. This leaves the sensing station clear to receive the next chip.

CHIP T-BAR ORIENTOR

After the semiconductor chip C has been picked up on the vacuum needle 18, the position of the ball contacts B is determined by the chip orientation sensor 20. Since there are four possible positions that the ball contacts B can assume, since the chip is square in shape, the probability is that three out of four times the chips will need to be oriented to the proper position on the probe prior to its placement on the substrate. This function is performed by the chip T-bar orientor 21. A preferred specific embodiment of the chip orientor unit is detected in FIGS. 62 through 66.

In general, the chip C while held on the probe or vacuum needle 18 is rotated to the desired position by the chip orientor 21. The chip orientor 21 has a head 2t provided with a T-shaped configuration 3t, which when properly oriented with the chip will form a mechanical engagement with the triangularly arranged ball terminals on the lower side of the chip. The mechanical engagement between a typical semiconductor chip C and the T-shaped configuration 3t on head 2t is clearly illustrated in FIGS. 62, 63 and 64 of the drawings. As shown, the two sectors 18t on opposite sides of the upright bar of the T-shaped configuration are each defined by a pair of downwardly inclined intersecting planar surfaces, while the sector 19t is defined by a single downwardly inclined planar surface. This configuration has the function of accurately centering the ball terminals B of chip C. Thus, the chip is aligned with reference to the ball contacts, rather than the side edges of the chip. The position of the balls is critical in the positioning of the chip on the substrate.

The chip T-bar orientor 21 has a base 4t in which is mounted a four-position stepping motor 5t. The motor 5t is mounted with the shaft 6t in an upright vertical position as shown in FIG. 65 of the drawings. A head support 8t is mounted on the top of base 4t above motor 5t. Shaft 10t is rotatably mounted in head support 8t by two bearings 11t and 12t. The head 2t with the T-shaped configuration facing upwardly is rigidly fixed to shaft 10t and protrudes above the top of head support 8t. The shaft 6t of motor 5t is connected in driving relation to shaft 10t by a Geneva drive mechanism consisting of a Geneva driver 14t and a Geneva wheel 16t, as illustrated in FIG. 65. A detailed view of the Geneva drive mechanism is shown in FIG. 66.

In operation an electrical signal produced by the chip orientation sensor 20, described previously, is utilized to drive motor 5t to thereby position the head 2t in the proper relative position to engage the ball terminals B of the chip C when it is transferred to the chip orientor 21. The Geneva drive mechanism provides a very precise positioning of the head 2t. Even in the event that the motor 5t stops several degrees from the exact desired angular location, this discrepancy will not cause a material change in the positioning of the head 2t. When the head 2t is rotated to the proper position, the probe 18 with a semiconductor chip affixed will be lowered by the turret head 17 into engagement with the head 2t. The motor 5t is then actuated by a suitable circuit arrangement to rotate the head 2t and also the chip relative to the pickup probe to the desired position which will then permit it to be properly placed on the substrate. The chip C is thus properly oriented on the probe 18 of turret placement head 17 relative to substrates being indexed on tape conveyor 1. The critical positioning is properly orienting the ball terminals so that they will contact the lands of the printed circuitry. The orientor of our invention very precisely positions the ball terminals B with the sloping surfaces of the sectors 18t and 19t of head 2t. Even though the ball terminals B may be slightly dislocated on the chip relative to the edges thereof, an accurate positioning of the chip is obtained both angularly and in the x–y plane.

CLAMP ASSEMBLY

FIGS. 67 and 68 show closed and open positions, respectively, of a clamp assembly which serves to reorient the position of each substrate to the desired reference position prior to the performance of a work function thereon so that each substrate will have work done on it exactly in the position desired. Referring to FIGS. 67 and 68, a bar or shaft 10c is caused to reciprocate in the direction shown by arrows 11c by any suitable power source such as by cam or pneumatic means (not shown). Attached to the bar 10c is a slotted member 12c which is preferably composed of three separate members, the outer two of which are of spring steel and longer than the intermediate center member to form the slot shown. Adjustment means in the form of a threaded screw 13c and nut 14c serve to vary the width of the slot by the cooperative engagement of the screw 13c with lined-up threaded apertures in the separate members of the slotted member 12c. Accordingly, a pin 15c is inserted in the slot of the slotted member 12c and held by the slotted member 12c for movement therewith. Pin 15c is attached to a movable lever arm 16c having an integral or connected extending lever arm portion 18c. The lever arm 16c pivots into the closed position shown in FIG. 67, when the bar 10c is moved to the right. Since pivot 17c is fixed, lever arm portion 18c swings to the upper position shown in FIG. 67 causing link arm 20c to also shift upwardly. Link arm 20c is connected to lever arm portion 18c by the engagement between bifurcated portion 19c located at one end of lever arm portion 18c and pin 21c connected to link arm 20c. Lever arms 22c and 24c are pivotally connected to opposite ends of link arm 20c by means of movable, tapered, zero backlash pivots 23c and 25c. Lever arms 22c and 24c are respectively connected by means of fixed, tapered, zero backlash pivots 27c and 29c to lever arm portions 26c and 28c positioned above the tape. Accordingly, lever arms 22c and 26c and lever arms 24c and 28c swing about the fixed pivots 27c and 29c respectively during the actuation of the clamp assembly. Lever arm portions 26c and 28c each contain right angle cut-out portions with a pair of work contact discs 30c of wear resistant material, such as tungsten carbide located in each cut-out portion.

Accordingly, in FIG. 67 the lever arm 22c with the lever arm portion 26c and the lever arm 24c with the lever arm portion 28c are shown in closed position whereby the tungsten carbide discs 30c of each set of lever arms contact opposite corners of the substrate and thereby precisely adjust or set the substrate in a fixed position on the belt B. It is advantageous to permit the pins of the substrate to be displaced freely in the holes in the belt which preferably have a larger diameter than the pins. In the position shown in FIG. 67, the substrate has its pins extending through the apertures in the belt and through slots 32c formed upward from depressed area 34c located in support member 36c. The depressed area 34c consists of a piece of metal which is located below the 6 mil thick stainless steel belt so that the clamping action and positioning of the substrate can be achieved without possible damage to the belt. Fixed pivots 17c, 27c, and 29c are attached to support member 36c.

In the open position as shown in FIG. 68, the bar 10c is moved to the left and the lever arm 16c moves accordingly, causing the extended lever arm portion 18c to move downwardly or counterclockwise towards the bar 10c. Link arm 20c also moves counterclockwise with lever arm portion 18c, causing movable pivots 23c and 25c to swing into the position shown and thereby force lever arm portions 26c and 28c to swing away from the substrate. Accordingly, in this position the clamping assembly is open and the substrate is permitted to move with the belt.

The geometrical characteristics of this type of clamp provide centering to the imaginary center of the clamp rather than to the center of the object being clamped. With this type of centering action, precise centering and squaring of a square object is achieved with errors in centering held to ±.000012 inch. In achieving this high degree of accuracy, the portion of link arm 20c extending between pins 23c and 25c is equal to the distance between pins 27c and 29c. Similarly, lever arm 22c is the same as lever arm 24c and lever arm 26c is the same as lever arm 28c.

The spring action of the left handed portion of the slotted member 12c allows for variation in the size of the article being clamped and, in addition, provides an over ride spring effect in the clamping action.

In order to achieve the high degree of accuracy that is required to position the substrate S on the belt 1 (FIG. 68A) it is essential that the center of the fixed pivot pin 27c and 29c of each of the lever arms 26c and 28c be on a line with the substrate contact portions of the pair of discs 30c of each lever arm 26c and 28c which line must be substantially normal to the diagonal line through the contacted corners of the square substrate S. Hence, variations in the size of the substrate and even rectangular substrates can be accurately positioned provided that the above requirement is met.

Furthermore, in order to achieve consistently positive orientation of the center of the substrate S to the imaginary center of the clamping assembly it is preferred that the discs 30c be located close to the apex of the right angle cut-out portions in the lever arms 26c and 28c. Preferably, the line of contact that each disc 30c makes with the substrate S is less than a third of the distance between the clamped substrate corner and the center of the contacted side of the substrate.

FIG. 68A illustrates the space between pins 38c of the substrate S and the perforations in the belt 1. Accordingly, the substrate S is permitted limited freedom of motion in the belt 1 and the clamping assembly accurately positions the substrate S within the limits permitted by the perforations in the belt 1.

CHIP PRESENCE SENSOR

After the semiconductor chips C have all been positioned on the substrate at the respective chip positioning stations, the substrate is moved by the tape conveyor 1 to the chip presence sensor station. The preferred structure for the chip presence sensor 22 is illustrated in FIGS. 69, 70 and 71 of the drawing. A vertically movable sensing head 1p is mounted above the conveyor directly over the indexed position of the substrate S, as clearly shown in FIG. 69. The sensing head 1p has a plurality of longitudinally reciprocal protruding pins 4p, shown most clearly in FIG. 70, which are arranged in the same relative locations as the chips on the substrate. Obviously, the pins 4p can be repositioned to accommodate substrates of different design. When the sensing head is lowered, the pins are depressed into the head by the respective semiconductor chips on the substrate. If a chip is missing, the pin intended to sense its presence will not be depressed thereby providing a signal to indicate that the substrate is defective. Within head 1p are provided electrical switches which are actuated by the aforementioned pins. Appropriate electrical circuitry is provided to detect, via the electrical switches associated with the pins, whether or not all the chips are present. When a missing chip is detected a signal is sent to the subsequent station, which will be described hereinafter, to remove the substrate from the conveyor. In practice, each of the switches associated with the pins remains open when the pins are extended. When the pins are retracted by contact with a semiconductor chip properly positioned, the switches are closed, thus providing a signal that the substrate is complete as to chips. The circuitry is such that a single open switch will signal the subsequent rework head station to remove the substrate. Also provided on the bottom of head 1p is a plurality of protruding elements 5p which extend slightly beyond the chip sensing pins 4p when they are in extended position. Elements 5p provide a reference guide for pins 4p relative to the top surface of the module, and also prevent the ends of pins 4p from contacting any flux on the top of the module in the event that the thickness of the substrate varies. Flux, if allowed to come into contact with pins 4p, would likely cause sticking, etc., resulting in erratic and undependable performance.

The head 1p is mounted for vertically reciprocal movement relative to conveyor 1. Head 1p is mounted on the lower end of reciprocal shaft 6p which is slidably mounted in bearings 7p and 12p, in turn mounted in horizontal frame elements 8p and 11p, respectively. Frame element 8p is rigidly mounted relative to the tape conveyor 2p by upright frame elements 9p and 10p. A compression spring 14p is provided to bias the head 1p and shaft 6p downwardly. An arm 15p is pivotally connected at one end to a lug 16p, and articulatively connected at the other end to the upper end of shaft 6p. Longitudinal movement of rod 17p caused by cam 18p and cam follower 19p causes reciprocal movement of head 1p. Torque is transmitted from shaft 27 to shaft 20p, whereupon the rotational movement is converted to reciprocal movement by cam 18p and cam follower 19p. The reciprocal movement of shaft 17p is in turn transmitted to shaft 6p and head 1p through arm 15p, in abutting engagement with the upper end of shaft 17p. As can be seen, the head 1p is in effect lowered over the module, with the force exerted downwardly being the additive effect of the weight of the head and associated elements, and the biasing force exerted by spring 14p. It can be seen that the head is not mechanically forced downwardly. With the arrangement described, damage or breakage of the elements of the apparatus is not likely in the event that a substrate extends upwardly beyond the anticipated vertical distance, as for example, a module not seated properly in the tape conveyor belt.

REWORK HEAD

After the substrate has been moved through the chip presence sensor 22, where each substrate is characterized as either an "accept" or a "reject" they are moved to the rework head, indicated as 23. This final station can be selectively programmed to remove from the tape conveyor 1 either all of the accepted substrates or all of the rejected substrates, or remove the rejected substrates and replace them with acceptable substrates. The rework head selects the substrates for removal in response to an electrical signal originating in the chip presence sensor 22. In other words, the chip presence sensor 22 detects whether or not all of the semiconductor chips are present in position on the substrate and then sends a signal to the rework head through an appropriate electrical circuit which causes the head to operate in the manner desired when the substrate is subsequently indexed to the rework head 23 from the chip presence sensor 22.

A preferred specific embodiment of a rework head 23 for use in the chip positioning machine is illustrated in FIGS. 72 through 78 of the drawings. In FIG. 72, there is shown a preferred specific embodiment of the driving mechanism of the rework head 23.

In the proper timing, sequence shaft 28 is caused to rotate by the driving mechanism of the chip positioning machine. The shaft 28 is keyed to a gear 1r, which in turn engages gear 2r on jack shaft 3r. On the lower end of jack shaft 3r is provided a spur gear 4r which meshes with spur gear 5r, which is rigidly keyed or otherwise secured to cam driving shaft 6r. It can be seen that rotation of drive shaft 28 causes a corresponding rotation of the cam driving shaft 6r. Rigidly secured to the lower end of cam driving shaft 6r are the turret cam 8r, and the clamp release cam 12r, whose function will become more apparent in the discussion that follows. The turret cam 8r consists of a cam actuator 9r provided with a camming groove 10r which slidably receives cam follower 11r. The turret cam 8r performs the function of moving the rework head indexing turret 20r in an up and down direction in order to pick up and deposit substrates S held in clamp 30r. In general, in operation, the turret of 20r moves downwardly over a substrate positioned on tape conveyor belt 1, the clamp 30r is opened to grip the substrate, the clamp closed, and the turret moved upwardly in order to clear the pins of the substrate S from the conveyor belt 1. Cam 12r, consisting of a cam actuator 13r provided with a camming groove 14r which slidably receives the cam actuator 15r, performs the function of opening the jaws 32r of clamp 30r when it is desired to release the substrate S. The specific structure of the turret cam 8r and the clamp release cam 12r is shown more clearly in FIG. 76 of the drawing. As shown, cam actuator 11r is connected to pins 16r disposed between the radial flanges 18r affixed to the lower end of turret shaft 17r. The pins 16r are supported on a U-shaped support arm 19r pivotally supported to element 25r. The pins 16r are secured to the ends of the U-shaped support and extend inwardly. The cam follower 11r is generally in alignment with pins 16r and extend outwardly from one of the legs of the support 19. As is believed apparent, rotation of cam 8r will cause a longitudinal reciprocation of turret shaft 17r, which is free to rotate independently of cam actuator 11r. Cam actuator 15r is stabilized by a pivotable U-shaped support 26r which is pivotally mounted at the base to element 25r. As most apparent in FIG. 76, U-shaped support 26r is provided with a longitudinally extending slot 27r in each leg which receives cam actuator 15r and allows it to slide longitudinally free of binding etc. Cam actuator 15r is pinned to clamp actuator rod 21r. Clamp actuator rod 21r does not rotate, but assumes the same angular position during reciprocation by the clamp release cam 12r.

Figure 78:
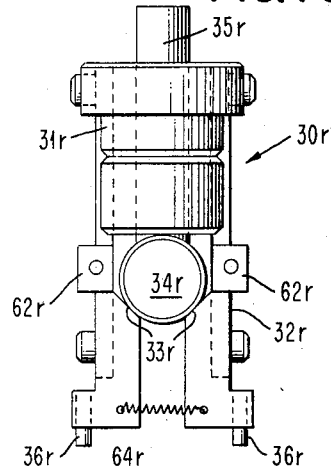
FIG. 78 is a detailed view showing a side elevation in enlarged scale of the clamp shown in FIG. 77.

As most clearly shown in FIG. 78 of the drawings, the substrate clamp 30r has a head 31r on which are mounted articulated jaws 32r. Hinges 62r allow the lower portions of the jaws to open. The jaws 32r are each provided with an inclined camming surface 33r on the inside facing surfaces thereon. A cylindrically shaped clamp actuator 34r, mounted on the lower end of clamp release rod 35r, provides the mechanism to open the jaws 32r of clamp 30r. Downward movement of clamp release rod 35r forces the cylindrically shaped clamp camming actuator 34r into engagement with the camming surfaces 33r which provide outwardly biasing force component, which force the jaws outwardly. A spring 64r biases the jaws into closed position. On the lower end of the jaws 32r are provided pegs 36r which frictionally grip the substrates S when in engagement. A clamp release bar 37r, mounted on the top of clamp actuator rod 21r, has adjustable abutment screws 38r which are positioned to actuate the clamp release rods 35r of clamps 30r when the turret 20r positions the clamp in receiving and discharging positions. As is believed from the foregoing description, the clamp release bar 37r, mounted on the top of clamp actuator rod 21r, maintains the same angular position relative to the chip positioning apparatus and tape conveyor 1, being positioned generally with one end over the conveyor and the other end over the loading or unloading station.

Figure 75:
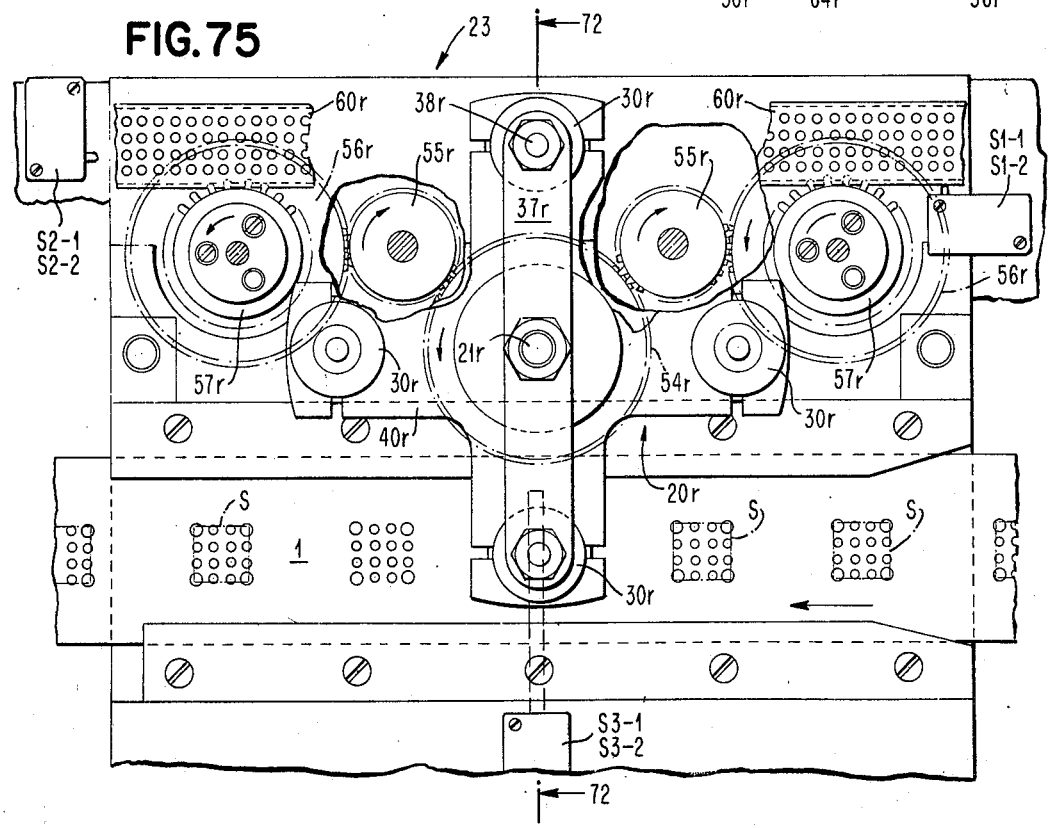
FIG. 75 is a top plan view of a preferred specific embodiment of the rework head 23 illustrating its relative position in regard to the tape conveyor belt.

As can be seen in FIG. 72 of the drawings, the heads 31r of clamp 30r are rigidly mounted in the turret head 40r of turret 20r. As can be seen in FIG. 75, the turret head 40r is provided with four radially extending arms on each of which there is mounted a substrate clamp 30r. The turret head 40r is rotatably mounted on shaft 17r which can be longitudinally reciprocated as explained previously. The turret head cam 8r provides the means for longitudinally reciprocating turret shaft 17r, and the clamp release cam 12r provides the means to reciprocate clamp actuator rod 21r, which in turn opens the clamp jaws 32r of clamps 30r.

As illustrated in FIG. 72, a Geneva drive mechanism having a Geneva driver 42 rigidly mounted on shaft 6r is operatively engaged with Geneva wheel 43r. A spur gear 44r is rigidly mounted on the lower end of wheel 43r. Spur gear 44r is operatively engaged with a relatively wide spur gear 45r rigidly secured to turret shaft 17r. It can be seen that an angular driving engagement will be maintained between spur gears 44r and 45r during reciprocation of shaft 17r due to the width or thickness of spur gear 45r. As indicated in FIG. 72, rotation of shaft 6r will cause an intermittent angular rotation of the turret 20r which is characteristic of the Geneva drive mechanism. In FIG. 73 is shown the specific arrangement and construction of the Geneva driver 42r and Geneva wheel 43r.

On the upper side of Geneva driver 42r is provided a second Geneva driver 50r which is operatively engaged in Geneva wheel 52r. Rigidly mounted on the top of Geneva wheel 52r is a spur gear 53r operatively engaged with spur gear 54r. Gear 54r is rotatably disposed on shaft 17r and is therefore not in driving engagement therewith. As illustrated in FIG. 75, gear 54r is in meshing driving engagement with idler gears 55r, which in turn are in meshing engagement with gears 56r.

Integral with gears 56r are two tray engaging sprockets 57r which are provided with teeth that engage a gear rack in the side of the tray 60r. It can therefore be appreciated that rotation of shaft 6r by gear 1r causes rotation of the Geneva driver 50r, in turn driving Geneva wheel 52r, in turn driving the tray indexing sprocket 57r. The rotation of gear 1r will produce a generally intermittent rotation of sprocket 57r, characteristic of a Geneva drive, which indexes or moves the trays 60r to the next position making available either a new substrate and/or a position to place a substrate, depending on the operation being programmed. The specific construction of the Geneva drive consisting of Geneva driver 50r and Geneva wheel 52r used to move the substrate trays 60r is shown in detail in FIG. 74 of the drawings.

The various gear ratios, the angular settings of the various gears, the Geneva drive dimension, and the camming arrangements necessary in the aforedescribed apparatus to provide the proper sequence of steps and mode of operation is believed to be an exercise of mechanical skill and will therefore not be described in detail.

As mentioned previously, the rework head of the chip positioning machine can be used in any suitable manner. It can be programmed to remove either all of the acceptable substrates from the tape conveyor belt 1 and place same in trays, or on another conveyor line. It can also be used to remove only the rejected substrates and load same onto another conveyor line or tray, or it can be used to remove rejected substrates from the tape conveyor 1 and replace them with acceptable substrates taken from a tray or other type of storage handling device.

The preferred mode of operation of the rework head 23 is to remove rejected substrates in response to a signal from the chip presence sensor, and replace the defective substrate with an acceptable one taken from a tray. At the same time, the defective substrate is placed in the tray in which the acceptable one was removed. In this mode of operation a number of trays of acceptable substrates are placed in operative position on the rework head which over a period of time removes the acceptable substrates, places same in the conveyor belt to substitute for defective substrates and also places the defective substrates in the tray. Thus, at the end of a period of time there is an exchange of good for defective substrates, which defective substrates can then be manually repaired or discarded.

A more specific mode of operation of the rework head 23 can be described as follows. Assume that a substrate S with one or more semiconductor chips missing is moved through the chip presence sensor 22 in which the missing chip or chips is detected. In response to the absence of a chip, a signal is produced which is programmed to the rework head 23. The substrate S upon arriving at the rework head station must be removed and a good substrate substituted therefor. The turret 20r is advanced 90 degrees with one of the clamps 30r is position over the substrate S.

The rework turret head 20r is indexed to a position over the substrate S by the driving engagement of the Geneva drives 42r and 43r, in turn in driving engagement with spur gears 44r and 45r. When the clamp is in position over the substrate, the entire turret head 20r is lowered into position with the turret cam 8r, which longitudinally reciprocates the turret shaft 17r. Before the clamps 30r are over the substrate they are opened by the action of the clamp actuator rod, in turn operatively driven by the clamp release cam 12r. The camming grooves 10r and 14r are formed to make possible the correct timing, that is the opening of the clamps 30r prior to their arrival at the pickup station. At the same time that one of the clamps 30r is moved downwardly over the tape conveyor belt 1, the opposite clamp on the turret 20r is also lowered over a tray 60r containing a number of good substrates. The clamps are subsequently closed over both the good and the defective substrates, the turret head 40r moved upwardly and indexed 90 degrees. This places the remaining intermediate opposite turret arms over the conveyor and the tray 60r respectively. During the previous cycle in which there was detected by the chip presence sensor a defective substrate, the arm of the turret 40r approaching the tape belt 1 had picked up a good substrate from the tray 60r. The opposite clamp approaching the tray had previously picked up a defective substrate from the belt in the previous cycle. The opposite arms and turret 40r are then lowered over the tape conveyor belt 1 and the tray 60r, the clamps 30r released, and the substrates placed in the respective positions.

It is understood that various modifications and changes can be made to the rework head 23r without departing from the spirit of the invention.

CONTROL LOGIC

The sequence of operations and logic functions performed by the electrical control system are shown in the logic flow diagrams of FIGS. 79 to 84 inclusive and will now be described. The manner in which the electrical components perform these operations and logic functions is described in detail below in connection with the control circuitry. For convenience these electrical components are referred to in the present description of the logic flow diagrams by the reference numerals in parentheses.

Figure 79:
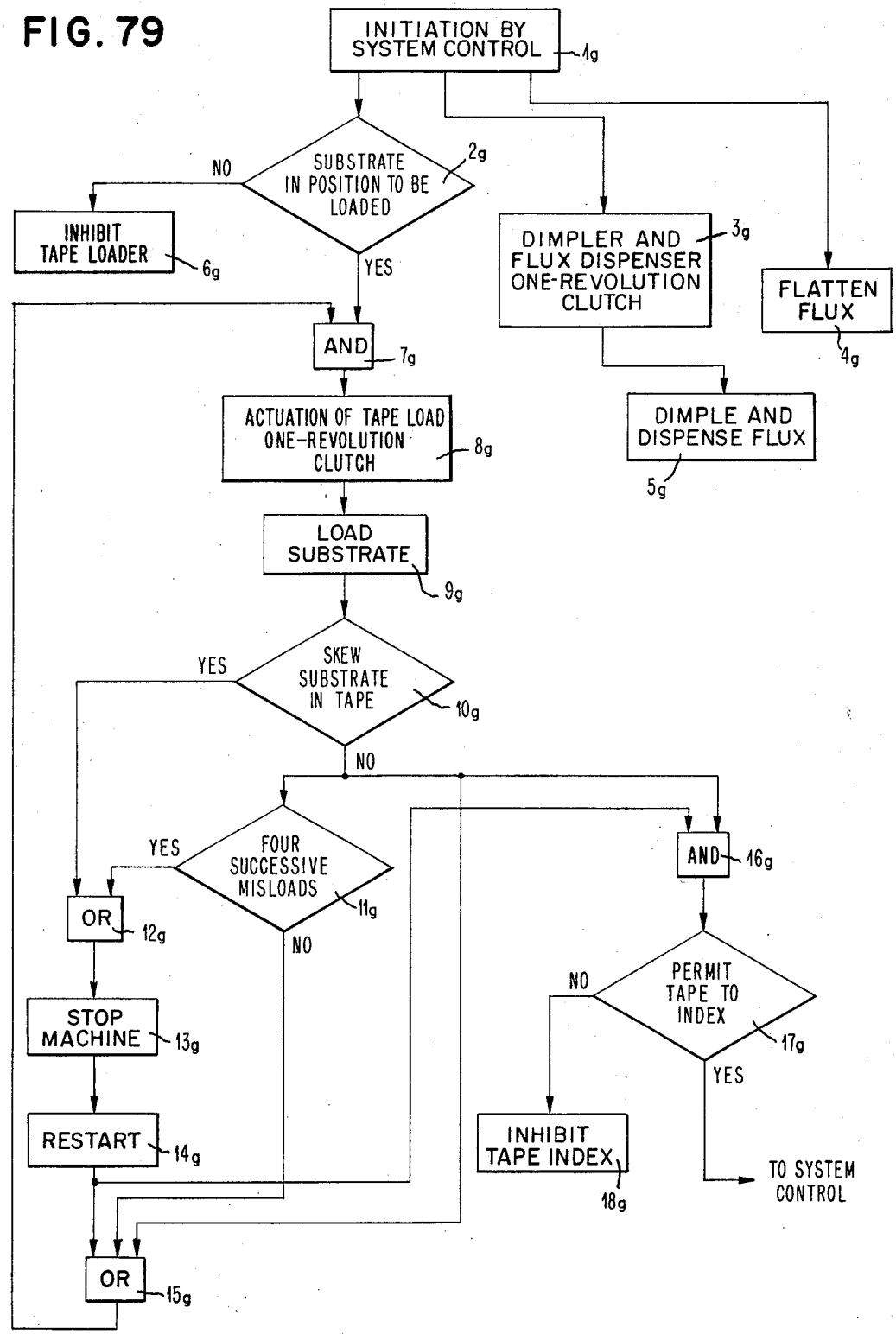

Referring first to FIG. 79, there is shown the logic flow diagram for the initial operations comprising loading the substrates onto the conveyor tape, dimpling the substrate land pads, dispensing flux upon the pads, and flattening the flux. This portion of the control logic is initiated by a signal pulse from the system control as indicated at 1g (6e). The first logic decision is whether a substrate S is in a position to be loaded onto the conveyor tape 1 and is symbolized, as are all of the logic decisions shown in FIGS. 79 to 84 inclusive by a diamond-shaped figure enclosing the appropriate legend as shown at 2g (1e, 2e, 3e). Since the dimpler 6, flux dispenser 9 and flux flattener 15 may oprate without injury even though there is no substrate present at each of these operating stations, these operations are shown at 3g, 4g, and 5g as following from the initiation by the system control at 1g irrespective of the decision at 2g as to whether the substrate is in a position to be loaded onto the conveyor tape. The electrical components for 3g are (7e, K3, K3-2, 11e), for 4g are (16e, K4-1, 17e) and for 5g are (12e, 13e).

In the event that the answer to the decision 2g is negative as shown at the line designated "NO" the tape loader 5 is inhibited at 6g. If the answer to this decision is affirmative as at the line designated "YES" and leading to the "AND" function box designated 7g (7e, 8e, K1-1, K2, K2-1) the tape loader one revolution clutch 29 will be actuated at 8g (9e, 19e, K2-2) provided that the "AND" operation at 7g receives a signal from the "OR" function at 15g to be described below.

A substrate S is then loaded onto the conveyor tape 1 at 9g and a logic decision must be made at 19g (18e, K5) as to whether the substrate S is skewed: that is, not lying properly flat upon the conveyor tape 1. An affirmative decision shown by the line designated "YES" leads to the "OR" function at 12g thereby causing the machine to stop as shown at 13g. A negative decision as to whether the substrate S is skewed as shown by the line designated "NO" leads to an "OR" function 16g, and also to said "OR" function 15g, and also to a logic decision 11g as to whether there have been four successive misloads: that is, whether substrates S are missing from four successive locations on the conveyor tape (19e–23e, K3-4). An affirmative decision designated by the line marked "YES" leads to the "OR" function at 12g and stops the machine at 13g. A negative decision designated by the line marked "NO" leads to said "OR" function at 15g.

The "OR" function at 16g leads to a logic decision at 17g as to whether the conveyor tape may index (22e, 23e, K5-1, 124e). A negative decision designated by the line marked "NO" inhibits the tape index at 18g. An affirmative decision designated by line marked "YES" sends an information pulse to that effect to the system control.

Referring now to FIG. 8, there is shown the initial portion of the logic flow diagram corresponding to the control circuit of one of the chip placement heads 17, it being understood that each of the several heads 17 have an identical circuit so that only one will be described. The logic initiated by a pulse from the system control as indicated at 19g (25e). A logic decision is first made at 20g (26e, 27e, K-7) as to whether a substrate S is present on the conveyor tape 1. A negative determination designated by the line marked "NO" inhibits indexing of the chip placement head 17 as indicated at 21g so that chips C will not be placed upon the empty conveyor tape.

If a substrate S is present at that operative station as designated by the line marked "YES" this results in actuation of the chip placement head one-revolution clutch 31 at 22g (29e, 30e, K7-2). Describing the sqeuence of operations of one of the vacuum needles 18 on the head 17, actuation of the one-revolution clutch 31 causes this needle 18 to pick up a chip C from the vibratory bowl feeder 19 as symbolized by the operation at 23g. The one-revolution clutch 31 for the placement head 17 is then actuated at 24g (29e, K7-2, 30e) to carry the needle 18 with the chip C thereon to the chip orientation sensor 20 where a logic decision is made at 25g (35e) as to the number of chip balls sensed. If only the collector ball is sensed as designated by the line marked "ONE BALL" this is characterized as an "ACCEPT" condition as shown at 26g (70e, K18-2, 19-2 to 21-2, K22, 18-3 to 21-3). If none of the chip balls or more than one chip ball is sensed this is deemed a "REJECT" condition as at 27g (72e, K22-2, K23). The chip ball sensor 20 also determines the initial orientation of the chip C on the needle 18 as shown at 28g (34e, 36e to 39e, K8 to K11)

The chip placement head 17 is then again indexed by actuation of its one-revolution clutch 31 at 29g (29e, K7-2, 30e). A logic decision is made at 32g (40e, 41e, K8-1 to K11-1) with respect to the initial orientation of the chip sensed at 28g. This initial orientation is compared with the selected "home" position. If the initial orientation of the chip C is such that it is already at the "home" position, the chip is merely engaged but not rotated by the T-bar chip orientor 21 at 33g. If the initial orientation is not at the "home position" the T-bar is rotated at 34g (K6-2, 46e to 49e, K17-1 to K17-4, 50e to 56e) to an orientation corresponding to that of the chip C. The T-bar then engages the chip C at 35g and the T-bar together with the chip engagd thereby are rotated at 36g (K6-2, 60e to 63e, K12-2e to K15-2e, 51e to 56e) to the selected home position.

In the event that the number of chip balls sensed at 25g was either none or more than one ball so as to result in a "REJECT" condition at 27g, the chip is blown off the vacuum needle 18 at 31g (74e, K22-3, 75e).

Figure 80:
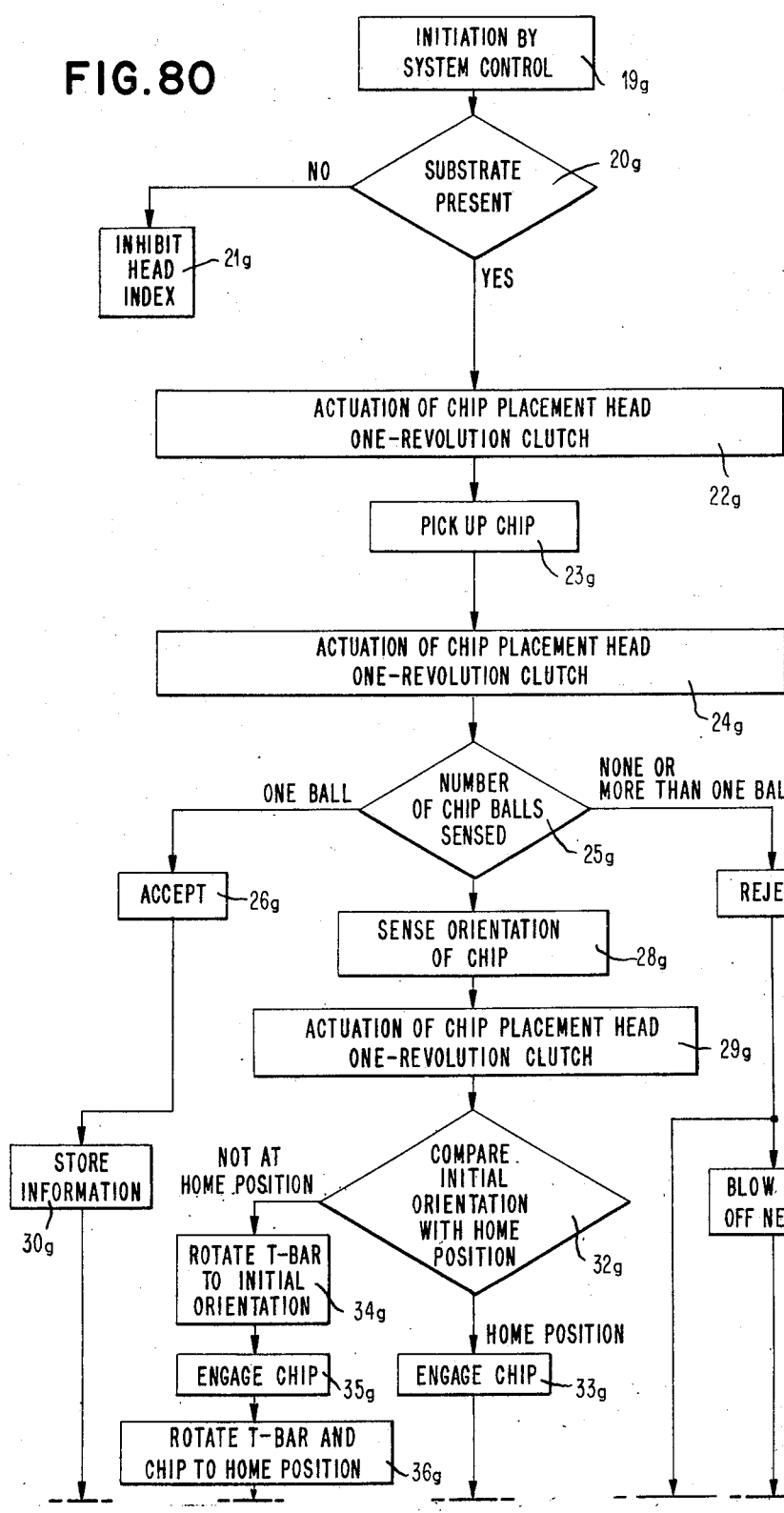
Figure 81:
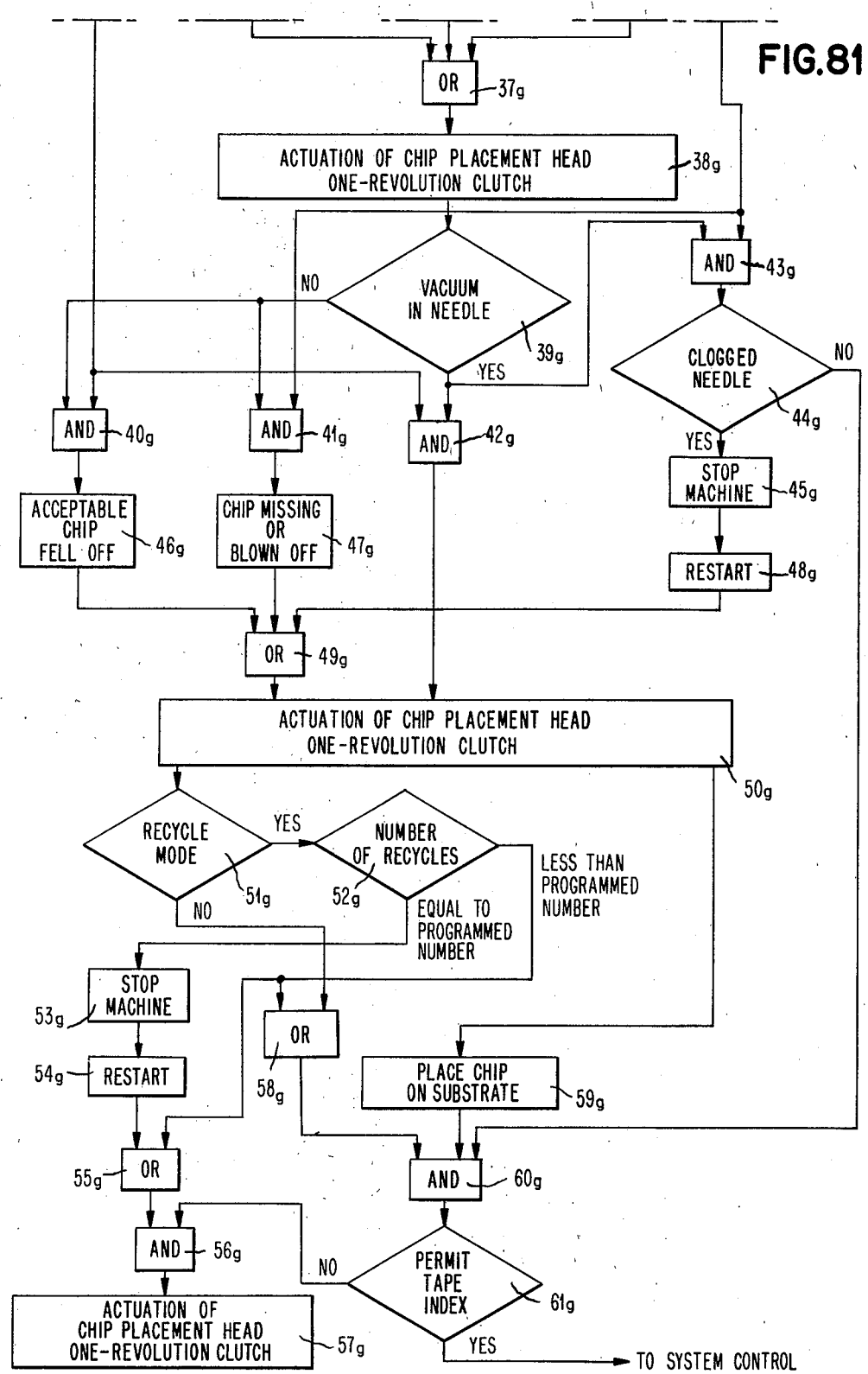

Referring now to FIG. 81, the "OR" function at 37g is satisfied by either the "ENGAGE CHIP" operation at 33g (FIG. 80) or the "ROTATE T-BAR AND CHIP TO HOME POSITION" operation at 36g, so as to cause actuation of the chip placement head one-revolution clutch 31 at 38g (FIG. 81) (29e, K7-2, 30e) and thereby index chip placement head 17 to move the vacuum needle 18 with the oriented chip C thereon. During this indexing movement, a logic decision is made at 39g (VDI) as to whether there is vacuum in the needle 18. A negative determination designated by the line marked "No" is fed to both of the "AND" operations at 40g and 41g. The "AND" function at 40g also requires a signal from the "STORE INFORMATION" operation at 30g (FIG. 80). The "AND" operation 41g must also be satisfied by a signal from the chip blow-off operation at 31g (FIG. 80). Said signal is also fed to an "AND" operation at 43g.

An affirmative decision that there is vacuum in the needle 18 and designated by the line marked "Yes" is sent to the "AND" operation at 43g and also to an "AND" operation at 42g which must also be satisfied by the "STORE INFORMATION" signal from 30g in FIG. 80.

Fulfillment of both input conditions of the "AND" function at 40g indicates that the chip C was originally acceptable but that there is now no vacuum in the needle 18 thereby indicating that the lower open end of the needle is exposed to the atmosphere and that therefore the acceptable chip must have fallen off the needle 18. This conclusion is shown at 46g (72e, VDI, K26).

Fulfillment of both of the input conditions of the "AND" function at 41g indicates that at the time of chip ball sensing at 25g either there was no chip C on the vacuum needle 18 or that the chip was defective and was subsequently blown off at 31g in FIG. 80. This conclusion is shown at 47g (72e, VDI, K26) in FIG. 81.

Fulfillment of both of the input conditions at the "AND" operation 42g indicates that the chip C was originally sensed at 25g as acceptable and is still on the lower end of the vacuum needle 18 by virtue of the affirmative decision at 39g.

If the chip was blown off at 31g in FIG. 80 but, nevertheless, there is an affirmative indication at 39g that there is still vacuum in the needle 18, then both of the input conditions to the "AND" function at 43g are fulfilled thereby indicating that there is flux or other foreign matter clogging and closing off the lower open end of the vacuum needle 18 so as to maintain a vacuum therein in the absence of a chip C mounted thereon. The logic decision at 44g (72e, VDI, K24-2, K25) as to whether there is a clogged needle then becomes affirmative as designated by the line marked "Yes" to stop the machine at 45g (K25). If either of these input conditions to the "AND" function at 43g is not fulfilled, then the decision at 44g is negative as designated by the line marked "No." If the machine is stopped at 45g due to a clogged needle determination at 44g, it may be manually restarted again at 48g after the clogged needles are serviced or replaced.

The "OR" function at 49g transmits a signal to actuate the chip placement head one-revolution clutch 31 at 50g (29e, K7-2, 30e) in response to either of the chip conditions at 46g or 47g or the restart condition at 48g. The chip placement head 17 will also be actuated at 50g in response to a signal from the "AND" operation at 42g to the effect that the chip was both accepted at 26g in FIG. 80 and is still on the needle 18 to maintain a vacuum therein as indicated at 39g in FIG. 81.

A manual switch (not shown) may be provided to set the control circuitry for operation in a recycle mode which is the normal preferred operative procedure. In this event, the logic decision at 51g will be affirmative as designated by the "YES" line leading to another logic decision at 52g (76e, K26-3, 77e) which compares the number of recycles of the chip placement head 17 to the programmed number of recycles. That is, the programmed number is manually selected and when the number of head recycles reaches this number the machine is stopped at 53g. If the number of recycles is less than the programmed number, a signal is transmitted to the "OR" operation at 58g which also receives a signal in the event that the recycle mode decision at 51g is negative.

In the event that the machine is stopped at 53g, after it is serviced to remove the cause or defect which produced the excessive number of recycles, it may be manually restarted as at 54g thereby transmitting a signal to the "OR" operation at 55g which also receives a signal in the event that the number of recycles is determined at 52g to be less than the programmed number. Either one of these inputs of the "OR" operation at 55g transmits a signal to the "AND" operation at 56g.

The previous actuation of chip placement head one-revolution clutch 31 at 50g results in the operation of placing a chip C upon the substrate S as symbolized at 59g. This transmit a signal to the "AND" operation at 60g which also has inputs from the "OR" operation at 58g and the negative determination of the "CLOGGED NEEDLE" decision at 44g. In the event that all three of these input conditions are met, there will be an affirmative determination at the logic decision 61g which determines that the tape 1 may index, thereby sending a signal to the system control through the line designated "YES."

In the event that one or more of the input conditions to the "AND" operation at 60g is not met, the decision at 61g (78e, 77e, K25-2, K28-2, 80e) will be negative to transmit a signal through the line designated "NO" to the "AND" operation at 56g. Satisfaction of both input conditions of the latter transmits a pulse thereby causing actuation of the chip placement head one-revolution clutch 31 at 57g. This results in recycling of the chip placement head 17 while the conveyor tape 1 remains stationary so as to permit the next vacuum needle 18 on the head 17 to attempt to place a chip C upon the same substrate S upon which the previous needle 18 had failed to place a chip.

Figure 82:
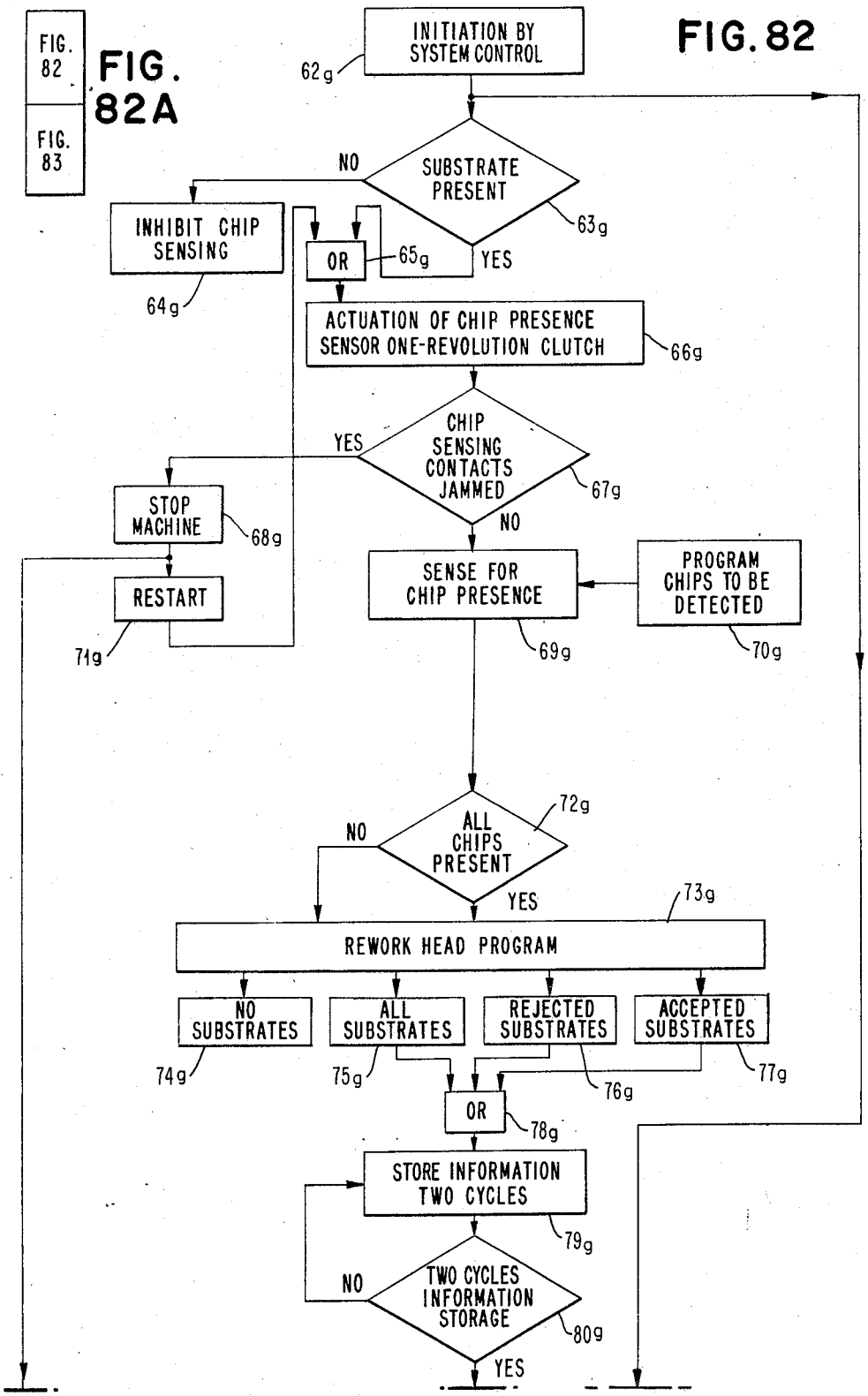
Figure 83:
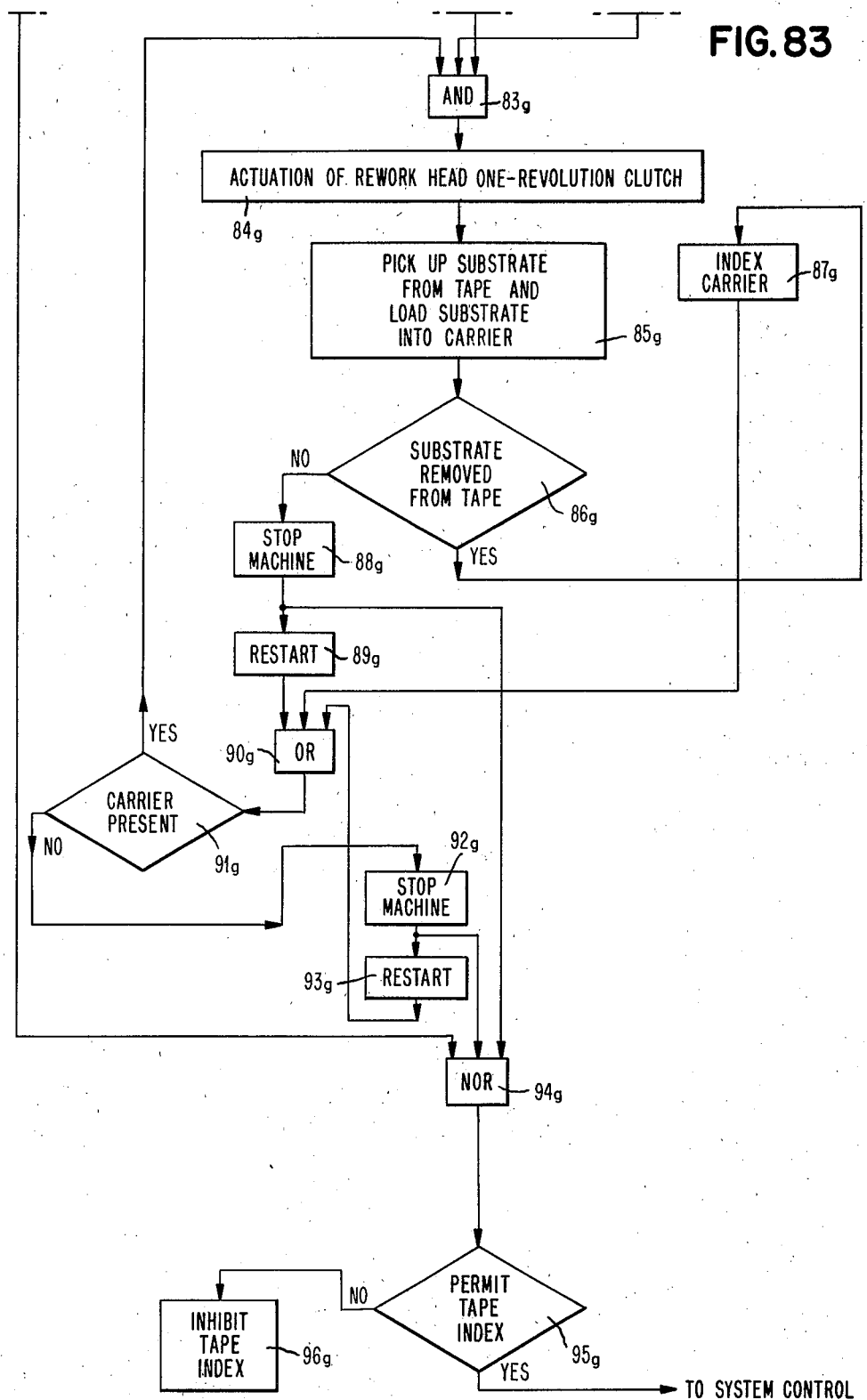

Referring now to FIG. 82, there is shown the initial portion of the logic flow diagram relating to the electrical circuitry for controlling the chip presence sensor 22 and rework head 23. The logic operations are initiated at 62g (81e) by a signal from the system control. The decision as to the detection of a substrate is indicated at 63g (83e, K29, 82e). A negative determination transmits a signal through the line marked "NO" so as to inhibit the chip sensing operation at 64g. An affirmative determination at 63g is transmitted through the line marked "YES" and "OR" function 65g so as to actuate the one-revolution clutch 32 of the chip presence sensor 22 at 66g (96e, K55, K30-1 to K30-12, K31-1 to K42-1).

The first decision by the sensor 22 is to determine whether its own sensing contacts are jammed as a 67g. An affirmative determination is transmitted through the line marked "YES" so as to stop the machine at 68g. A negative determination indicating that none of the sensing contacts is jammed is transmitted through the line marked "NO" so that the sensor 22 may perform its main function of sensing for the presence of chips on the substrate as indicated at 69g (88e, 89e, 90e, K31 to K42). This operation is controlled by a manually selectable program at 70g (99e, 99e-1 to 99e-12) which indicates those chip positions on the substrate which are to be sensed for the presence of chips thereon. In the event that the machine is stopped at 68g, it may be manually restarted as indicated at 71g thereby transmitting a signal to the "OR" operation at 65g (85e, K29-2, 86e).

The sensing operation at 72g results in a decision as to whether all the chips C are present on the substrate S in those chip locations selected by the program at 70g. The substrate S is thereby characterized as either an "ACCEPTED" substrate or a "REJECTED" one. The rework head may be programmed at 73g (98e, K43-2 to K54-2, K56) so as to pick up either no substrates as at 74g (85e, K29-2, 86e), or all substrates as at 75g (106e-4), or "rejected" substrates as at 76g (105e, 106e-3, K64-2), or "accepted" substrates as at 77g (105e, 106e-2, K56-2). No information is transmitted from the "no substrates" condition 74g so that, in the event of the selection of this program, the rework head 23 remains inoperative.

The information as to whether all the chips are present at the programmed locations on the substrate, combined with the rework head programmed information at 75g, 76g, 77g is transmitted to the "OR" operation at 78g (105e, 106e-2, K56-2( K64-2) and this information is then stored for the time required for the sensed substrate to travel from the chip presence sensor 22 to the rework head 23 where the information is finally utilized by the latter. This information storage operation is indicated at 79g, and at 80g (K57 to K61) there is indicated a decision as to whether the information was stored for the required two cycles.

If the determination at 80g (K57, K58, K59, K69, K61) is negative then the "store information" operation at 80g is repeated until the required two cycles is obtained. The affirmative determination that the information was stored for two cycles at 80g is transmitted through the line marked "YES" to the input of the "AND" operation at 83g in FIG. 83. Said "AND" operation 83g has a second input connected to the affirmative determination output marked "YES" of the "CARRIER PRESENT" decision at 91g (S1-1). If both decisions at 81g, 91g are affirmative the one-revolution clutch 33 of the rework head 23 is actuated at 84g, (108e, 109e, K61-2, K65) causing the rework head 23 to remove a substrate S from the conveyor tape 1 and to load the substrate into a carrier as symbolized at 85g.

At 86g (53-1 a decision is made as to whether the rework head 23 succeeded in its task of picking up the substrate S and removing it from the conveyor tape 1. A negative determination is transmitted through the line marked "NO" to stop the machine at 88g. An affirmative determination is transmitted through the line marked "YES" to the "INDEX CARRIER" operation at 87g (S2-1).

This operation transmits a signal to the "OR" function at 90g which also has inputs from "RESTART" operations at 89g and 93g. Transmission of a signal through any of these inputs is transmitted through "OR" function 90g to initiate a logic decision at 91g as to whether a carrier is present to receive the substrate S removed from conveyor tape 1 by rework head 23.

If this determination is affirmative a signal is is transmitted through the line marked "YES" to the "AND" operation 83g so that the rework head one-revolution clutch 33 will not be actuated at 84g unless a carrier is present to receive the removed substrate S.

If no carrier is present the decision at 91g is negative to transmit a pulse through the line marked "NO" so as to stop the machine at 92g and thereby transmit a signal to the "NOR" function at 94g. The latter also receives a signal in response to the machine stopping operation at 88g and also the machine stopping operation shown in FIG. 82 at 68g. If none of these inputs to the "NOR" function at 94g is energized, the "PERMIT TAPE INDEX" decision at 95g (113e, K55-2, S1-2, S-2, S3-2 114e) is affirmative to transmit a signal on the line marked "YES" to the system control. However, if any of the inputs to the "NOR" function 94g is energized, the decision at 95g is negative so as to inhibit the indexing of the conveyor tape at 96g.

Referring now to FIG. 84, there is shown the logic flow diagram for the system control. As noted above, when each of the chip placement heads 17 has properly completed its operation, a signal is transmitted to the system control. These signals are designated No. 1 to No. 12 inclusive for the twelve heads. At 97g (K102 through K113 inclusive) there is indicated the program which selects those of the chip placement heads which are to be in operation. For example, the substrate S may require the placement of only six chips thereon in which case only six of the twelve chip placement heads 17 will be in operation while the others remain idle.

At 98g (115e, K101-1, through K114-1) there is indicated an "AND" operation with inputs from those of the chip placement heads 17 which are programmed at 97g as being in operation. Also fed into the "AND" operation 98g are signals from the tape loader control and the control for the chip presence sensor and rework head. Therefore, the "AND" operation 98g will transmit a signal only if the tape loader 5, chip presence sensor 22, rework head 23 and all of the operative chip placement heads 17 have performed their respective operations.

At 99g it is indicated that the control system may be set by a manual switch (not shown) for either automatic or manual operation. In the event of manual operation the machine will operate only through one single cycle as indicated at 100g and the manual operation button must again be actuated by the operator for each succeeding cycle of operation. This arrangement is used solely for set up and servicing, the normal mode of operation being automatic.

In either event, a signal is transmitted through the "OR" function 101g to cause actuation of the tape index one-revolution clutch 50 thereby causing the substrate clamps to open at 103g, the conveyor tape 1 to index at 104g, and the clamps to close again at 105g. Initiating signals are then sent to all the operating stations as indicated at 106g whereby the entire above-described cycle of operation is repeated.

CONTROL CIRCUITRY

The electrical control circuitry which performs the above-described logic functions is shown schematically in FIGS. 85 to 106 and will now be described. Referring first to FIG. 85 in conjunction with FIG. 4, the reference numeral 1e indicates generally a photodetector to sense the arrival of a substrate from the tray unloader. Photodetector 1e comprises a light bulb 2e and a photosensitive cell 3e. The latter extends between the B+ line and a sensitivity control potentiometer 4e having a resistance which is made variable by a movable wiper 5e. Control 4e adjusts the sensitivity of the photosensitive cell 3e to compensate for variations in the ambient lighting conditions. In series between control 4e and the ground bus G is a relay K1 which will be energized when photodetector 1e detects the movement of a substrate.

The reference numerals 6e and 7e indicate two of a plurality of pulse timing switches are actuated by cams to make and break the switch contacts at predetermined instants in the operating cycle so as to time the length of the pulse transmitted by each switch. The actuating cams are drivingly rotated by the series of belts 79, 80, 81 shown in FIG. 4 so that each switch actuating cam rotates 360° during each cycle of machine operation. The "ON" time of each of these pulse timing switches is designated by the letter M followed by the instant in degrees at which the switch will close or make so as to initiate the pulse, and also by the letter B to indicate the instant in degrees at which the switch will open or break to terminate the pulse. The pulse is generated by virtue of the fact that when the respective timing switch makes or closes, the right-hand terminal of the switch rises to the potential level of the B+ bus. Since such pulse timing switches are conventional and well-known in the art, their mechanical construction will not be further described.

Since pulse timing switches 6e and 7e are in series, they perform a logical "AND" function in that the right-hand terminal of switch 7e will be at the potential of B+ only when both switches 6e and 7e are closed. During this "ON" period, and if relay contacts K1-1 have been closed by energization of relay K1, relay K2 will be energized. The latter controls one-revolution clutch 29 (FIG. 4) which actuates tape loader 5 in the following manner. It will be noted that each set of relay contacts is designated by the reference number of its respective relay followed by a numeral to distinguish the several contact sets corresponding to the same relay.

Energization of relay K2 closes relay contacts K2-2 to permit pulse timing switch 9e to energize solenoid 10e switch actuates tape loader one-revolution clutch 29. Tape loader 5 thereby operates to load a substrate S onto conveyor tape 1. Relay K2 is held by the pulse from timing switch 8e through the closed contacts K2-1.

Dimpler 6 and flux dispenser 9 are so constructed that they may function during each and every cycle without being damaged even though there is no substrate to be operated upon. Therefore control relay K3 which controls one-revolution clutch 30 actuating dimpler 6 and flux dispenser 9 is energized each and every cycle by pulse timing switches 6e and 7e irrespective of whether a substrate is present to energize relay K1. Relay K3 is maintained energized by pulse timing switch 8e through its own set of contacts K3-1. Dimpler 6 and flux dispenser 9 are actuated by one-revolution clutch 25 (FIG. 4) actuated by solenoid 11e which is energized by pulse timing switch 9e through the closed contacts K3-2 of energized relay K3. The actual dispensing of the flux F is effected by energization of solenoid 13e by pulse timing switch 12e.

Pulse timing switch 14e energizes flux flattening control relay K4 through the closed contacts K3-3 of relay K3. Relay K4 is maintained energized by pulse timing switch 15e through the closed contacts K4-1. Flux flattening head 15 (FIG. 4) is actuated by solenoid 17e when the latter is energized by pulse timing switch 16e through the closed contacts K4-2 of relay K4. Flux flattening head 15 thereby emits a jet of air against the flux charge F previously dispensed onto substrate S so as to reduce the height of the flux to prevent it from contacting and clogging the lower ends of the needles 18 of chip positioning heads 17.

Located after tape loader 5 and before dimpler 6 is a skewed-substrate detector switch 18e having a feeler arm which contacts any substrate S not lying flat upon conveyor tape 1. This skewed condition closes switch 18e to energize relay K5. Located three tape index positions after loader 5 is a missing substrate switch 19e which is normally closed but which is opened when its feeler arm engages a substrate on conveyor tape 1. Hence the absence of a substrate on conveyor tape 1 energizes relay K6. Pulse timing switch 20e then actuates a successive missing substrate counter 21e through the closed contacts K3-4, once for each cycle that missing substrate relay K6 is energized to close its contacts K6-1.

Associated with counter 21e is a program selector 23e which enables the machine to be set up so that when a predetermined number of successive tape positions are devoid of substrates, the whole machine will be stopped for repair. Program selector 23e comprises a series of normally-closed switches 223e having one end joined to a common terminal in series with relay contacts K5-1. A switch selector arm 323e connects pulse timing switch 22e with the left-hand terminal with a selected one of the switches 223e.

Counter 21e is constructed in the conventional manner so that when the count of successive missing substrates reaches a certain number a respective one of the switches 223e will open. By adjusting arm 323e so as to select a particular one of the switches 223e, the set-up operator may select the number of successive missing substrates registered on counter 21e which will cause the selected switch 223e to open. In this event pulse timing switch 22e will not energize relay K101 through normally closed relay contacts K5-1 and normally closed "not in manual" switch 124e. As will be described below, energization of relay K101 indicates that loader 5, dimpler 6 and fluxers 9, 15 are functioning properly so as to permit the machine to continue operation. Non-energization of relay K101 caused by the registration by counter 21e of the programmed number of successive missing substrates will stop the machine for repair or adjustment.

Referring now to FIG. 86, there is shown the initial portion of one of the plural identical circuits each controlling a respective one of chip placement heads 17. Since all of these circuits are identical, only one will be shown and described. Pulse timing switches 25e and 26e are in series so that the output of switch 26 will be the logical "AND" function of both switches. In series with the output of switch 26e is a substrate presence detector switch 27e. Each switch 27e of said plural identical circuits is physically located one tape index position before its respective chip positioning head 17. If a substrate S is present so as to close detector switch 27e, the concurrent transmission of pulses by system pulse timing switch 25e and pulse timing switch 26e will energize chip positioning control relay K7 so as to close contacts K7–1 to maintain relay K7 energized through pulse timing switch 28e and also to close contacts K7–2 to permit pulse timing switch 29e to energize the chip positioning one-revolution clutch control solenoid 30e. The latter in turn actuates one-revolution clutch 31 (FIG. 4) to actuate chip positioning head 17 through one cycle of oepration.

Vibratory feeder bowl 19 must not vibrate during the time interval when vacuum needle 18 is picking up a chip C from the pick-up point of the bowl. The solenoid motor 33e which vibrates bowl 19 is energized during the proper portion of the cycle by pulse timing switch 31e through the feed control 32e.

The printed circuit pattern on substrate S is designed so that the collector pad P, that is, that portion of the conductive land L which receives the collector ball B of chip C, may be oriented in a direction toward either of the four lateral edges of substrate S. Therefore, before chip C is positioned by vacuum needle 18 onto the pads P of substrate S, chip C must first be angularly oriented so that its balls B correspond to the orientation of the pads P at that particular location on substrate S to which chip C is to be assembled. Chip C is first oriented by vibratory feeder bowl 19 to any random one of four possible angular orientations which are designated as the first, second, third and fourth quadrants, depending upon the direction in which the collector ball is located. Each of these quadrants is indicated schematically at 236e, 237e, 238e and 239e wherein the collector ball is designated by the solid circular area and the base and emitter balls are shown as nonsolid circles.

Since the initial orientation of chip C on the end of vacuum needle 18 is randomly in any one of these four possible angular orientations, it is first necessary to sense each chip to detect which of these four possibilities has materialized. The T-bar 2t of the chip orientor 21 is then rotated to the same orientation as chip C and the T-bar 2t then engages balls B of chip C. The T-bar 2t together with chip C is then rotated to the selected "home" position thereby finally orienting chip C to the desired orientation so as to properly align balls B with the respective land pads P upon which balls B will rest when chip C is positioned upon substrate S.

In order to determine the initial orientation of chip C when it is first picked up from the pick-up location of vibratory bowl feeder 19 by vacuum needle 18, there is provided a chip ball sensing device indicated generally by the reference numeral 35e and comprising a plurality of switches 36e, 37e, 38e, 39e, each adapted to be closed when its respective feeler arm is actuated by contact with a collector ball B of the chip C being sensed. Each of these switch feeler arms will be engaged by a collector ball B when the latter is in a respective one of the four quadrants. That is, the feeler arm of switch 36e will be engaged by a collector ball in the first quadrant, that of switch 37e by a collector ball in the second quadrant, that of 38e by a collector ball in the third quadrant, and that of switch 39e by a collector ball in the fourth quadrant.

The switches 36e, 37e, 38e, 39e have one terminal connected to a common junction in turn connected to a pulse timing switch 34e and the other terminal connected to a respective one of the relays K8, K9, K10, K11 thereby energizing one of the latter when its corresponding switch is closed by virtue of the collector ball making contact with that switch feeler arm in that particular quadrant.

In order that the printed circuit pattern may be designed so that the collector pad P is oriented in any selected one of the four directions the control circuitry is arranged so that any one of the four quadrants may be selected as the "home" position in which the collector ball B will lie after chip C has been finally oriented and is ready for positioning upon the pads P of substrate S. In order to select which of the four quadrants will be "home" position for each chip placement head 17, the circuit components are switched by conventional means to provide any selected one of the four network configurations shown in FIGS. 87 to 90 inclusive. FIG. 87 shows the first quadrant as the "home" position, FIG. 88 the second quadrant, FIG. 89 the third quadrant, and in FIG. 90 the fourth quadrant is the "home" position.

For the purposes of illustration, let it be assumed that the circuit is programmed so that the first quadrant is selected as the "home" position and that when chip C is initially picked up on the end of vacuum needle 18 from vibratory bowl feeder 19 it is oriented so that its collector ball B is in the second quadrant as shown schematically at 237e. Therefore, when the chip orientation is sensed, the feeler arm of switch 37e will be engaged by the collector ball B to close switch 37e and thereby permit a pulse from pulse timing switch 34e to be transmitted to relay K9 thereby energizing the latter.

Referring now to FIG. 87 which is the circuit configuration for the first quadrant as the "home" position, the energization of relay K9 will close its contacts K9–1 to transmit a pulse from pulse timing switch 40e through diode CR1 to energize relay K13 thereby indicating that chip C is initially 90° in a clockwise direction from the "home" position. Relay K13 will be held closed through its own contacts K13–1 by pulse timing switch 45 shown in FIG. 91.

Figures 92, 93, 94, 95:
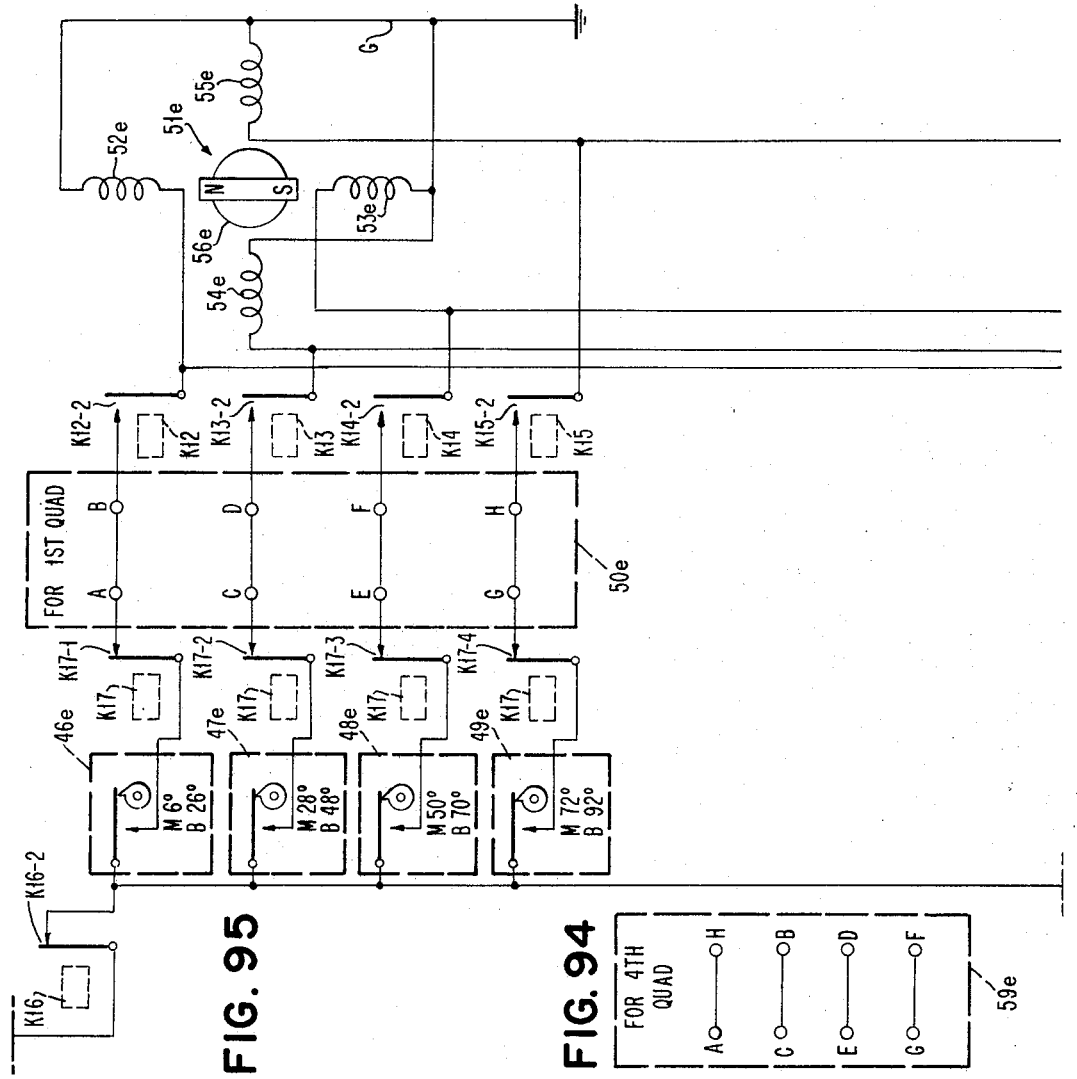

Referring now to FIG. 95 there is shown the control circuitry to first rotate the T-bar chip orientor to pick-up orientation in alignment with the initial orientation of the chip on vacuum needle 18, and then to rotate the T-bar and chip C therewith to the final selected "home" position.

For this purpose there are provided a plurality of pulse timing switches 46e, 47e, 48e, 49e having one end connected to a common junction in turn connected to the B+ line through the normally-closed relay contacts K16–2. The opposite end of each of these pulse timing switches is connected to a respective one of the normally-closed relay contacts K17–1, K17–2, K17–3, K17–4 connected in turn to the respective terminals A, C, E, G. The latter terminals are connected respectively to the group of terminals B, D, F, H in a manner depending upon which quadrant is selected as the "home" position. FIG. 95 indicates at 50e the mode of connection when the first quadrant is selected as the "home" position. The interconnections between these terminals for the second, third and fourth quadrants as the "home" position is indicated respectively at 57e, 58e and 59e in FIGS. 92 to 94. Each of the terminals B, D, F and H is connected to a respective pair of normally-open relay contacts K12–2, K13–2, K14–2, and K15–2.

The reference numeral 51e indicates generally a conventional stepping motor comprising four fixed field windings 52e, 53e, 54e and 55e located around an armature 56e at spaced angular intervals of 90 degrees. The rotating armature 56e is in the form of a permanent magnet having a north pole at one end and a south pole opposite thereto. When one of the windings 52e, 53e, 54e, 55e is energized it generates lines of magnetic flux oriented in the particular respective direction of the axis of the energized winding to cause the north pole of armature 56e to align itself with said winding. By energizing windings 52e, 53e, 54e, 55e in sequence in a counterclockwise direction, armature 56e will be rotated counterclockwise in angular increments of 90 degrees each time the next succeeding winding is energized.

Returning to the illustrative example in which the first quadrant was selected as the "home" position and the initial orientation of chip C on vacuum needle 18 was such that the collector ball B was oriented in the second quadrant as symbolized at 237e to close switch 37e and thereby energize relays K9 and K13, energization of the latter relay closes its contacts K13–2 in FIG. 95 to permit pulse timing switch 47e to energize stepping motor field winding 54e. This causes armature 56e of stepping motor 51e to rotate 90 degrees. Since the T-bar of chip orientor 21 is mechanically driven by stepping motor armature 56e, said T-bar is thereby rotated 90 degrees to the second quadrant orientation in alignment with the ball orientation of chip C.

Since only relay K13 was energized whereas relays K12, K14 and K15 were not energized in this particular example, relay contacts K12-2, K14-2 and K15-2 remain open and hence pulse timing switches 46e, 48e and 49e do not energize the other field windings 52e, 53e and 55e of stepping motor 51e.

At 180 degrees later in the cycle a pulse is transmitted through pulse timing switch 60e in FIG. 99 and relay contacts K17-5 which were previously closed by energization of relay K17 by pulse timing switch 217e in FIG. 91. This also opens relay contacts K17-1, K17-2, K17-3 and K17-4 in FIG. 95 to disconnect pulse timing switches 46e, 47e, 48e and 49e from stepping motor windings 52e, 53e, 54e and 55e.

Figure 99:
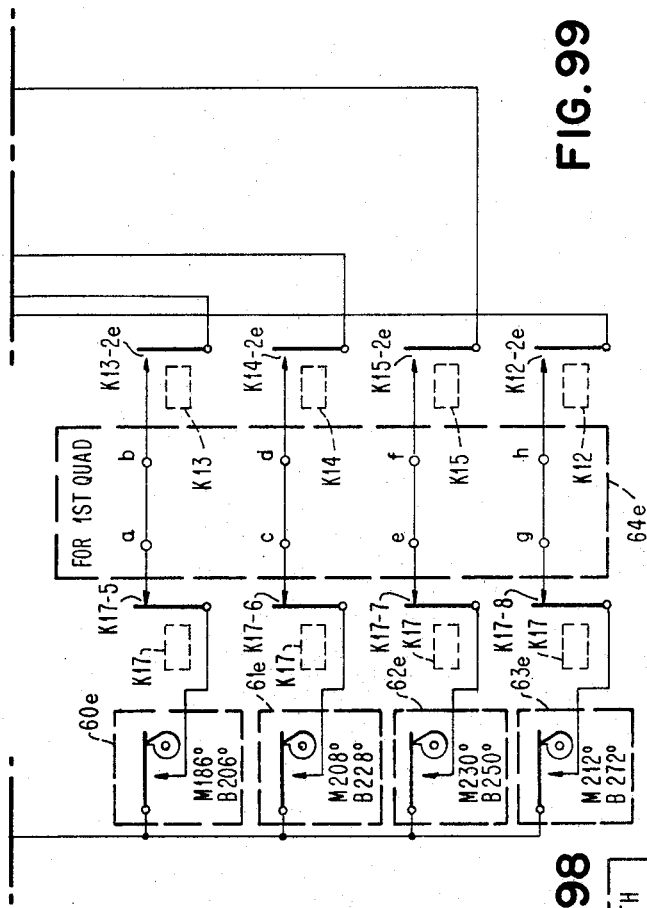
Figure 98:
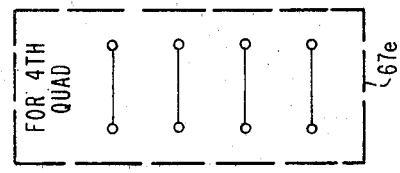
Figure 97:
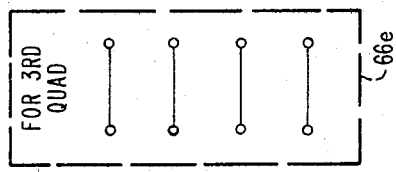
Figure 96:
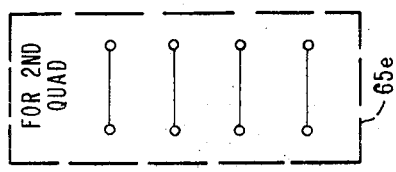

The reference numerals 60e, 61e, 62e and 63e in FIG. 99 indicate a plurality of pulse timing switches having their input ends joined together and connected in series with relay contacts K16-2. Each of these switches is connected to one of the group of terminals a, c, e, g through a respective one of the normally-open contacts K17-5, K17-6, K17-7, K17-8. Terminals a, c, e, g are connected to another group of terminals b, d, f, h in the manner shown at 64e in FIG. 99 when the circuitry is programmed for the first quadrant as the "home" position. When programmed so that one of the other quadrants is the "home" position, these terminal groups are connected in the manner shown at 65e, 66e and 67e in FIGS. 96 to 98.

Now that the T-bar of chip orientor 21 has been oriented so as to be in alignment with the ball configuration of the chip C, the T-bar is rotated by stepping motor 51e to angularly displace chip C to the desired "home" position with its collector ball B in the first quadrant as shown at 236e in FIG. 86.

Since relay K13 is energized, contacts K13-2a are open so that pulse timing switch 60e does not energize field winding 54e of stepping motor 51e. At 22 degrees after the initiation of the pulse transmitted through switch 60e pulse timing switch 61e sends a pulse through relay contacts K17-6 which was previously closed by energization of relay K17 by pulse timing switch 217e. Since relay K14 is not energized, contacts K14-2 remain closed and the pulse transmitted by switch 61e energizes winding 53e of stepping motor 51e.

At 22 degrees later in the cycle, pulse timing switch 62e transmits a pulse through relay contacts K17-7 and K15-2a to stepping motor winding 55e. Motor armature 56e and the chip orientor T-bar are thereby angularly displaced through another 90 degree increment. At 22 degrees later in the cycle, pulse timing switch 63e transmits a pulse through relay contacts K17-8 and normally closed contacts K12-2 to energize winding 52e of stepping motor 51e, and thereby rotating motor armature 56e and the T-bar through another 90 degree increment. This final angular displacement brings armature 56e together with the T-bar and chip C to the final "home" position with the collector ball B of chip C in the first quadrant as shown at 236e in FIG. 86.

To illustrate briefly the mode of operation when chip C is oriented on vacuum needle 18 so that its collector ball B is initially in the first quadrant "home" position, the feeler arm of switch 36e will then be contacted by collector ball B to close switch 36e and thereby energize relay K8 through pulse timing switch 34e. This closes relay contacts K8-1 in FIG. 87 to permit pulse timing switch 40e to energize relay K16 thereby indicating that chip C is already in the programmed "home" position. Energization of relay K16 opens normally-closed relay contacts K16-2 so as to prevent any pulses from being transmitted through any of the pulse timing switches 46e, 47e 48e, 49e and 60e, 61e, 62e, 63e. As a result stepping motor 51e and the T-bar of chip orientor 21 remain stationary and are neither rotated to align the T-bar with the chip nor rotated to orient the chip, since the latter is already in the final programmed "home" position.

As a further example, let it be assumed that the initial orientation of chip C on vacuum needle 18 is such that collector ball B is in the fourth quadrant as shown at 239e, in FIG. 86. Collector ball B will then contact the feeler arm of switch 39e to close the latter and thereby energize relay K11 thus closing relay contacts K11-1 to permit pulse timing switch 40e to transmit a pulse through diodes CR4, CR5 and CR6 thereby energizing relays K13, K14 and K15. This indicates that the sensed chip is 270 degrees clockwise from the programmed "home" position. The energization of these relays closes the normally-open relay contacts K13-1, K14-1 and K15-1 which hold these relays energized for the duration of the pulse transmitted through timing switch 45e, and also closes the normally-open relay contacts K13-2, K14-2 and K15-2 to permit pulse timing switches 47e, 48e and 49e to energize stepping motor windings 54e, 53e and 55e in sequence, thereby rotating the chip orientor T-bar 270 degrees to align it with chip C.

Stepping motor 51e and chip orientor T-bar are then angularly displaced to the first quadrant "home" position in the following manner. Pulse timing switches 60e to 63e inclusive close at the angular phase instants designated in FIG. 99. Since relays K13, K14 and K15 are energized, the normally-closed relay contacts K13-2e, K14-2e and K15-2e are open, thereby preventing pulse timing switches 60e, 61e and 62e from energizing stepping motor windings 53e, 54e and 55e. Since relay K12 is not energized, its normally-closed contacts K12-2e remain closed to permit pulse timing switch 63e to transmit a pulse to energize stepping motor winding 52e thereby rotating motor armature 56e and the chip orientor T-bar 90 degrees to orient the chip at the "home" position with the collector bar in the first quadrant as shown at 236e in FIG. 86.

In a similar manner the control circuitry can be initially set up and programmed so that either the second, third or fourth quadrants becomes the "home" position to which chip C will be finally oriented, so that when chip C is placed upon the conductive lands L of printed-circuit substrate S the balls B of the chip C will be in proper alignment with the land pattern at that particular chip location of the printed circuit. In the event that one of these other quadrants is selected as the "home" position, conventional switching is provided so that the components of circuit 41e in FIG. 87 are reconnected in the manner shown at 42e in FIG. 88 for the second quadrant, at 43e in FIG. 89 for the third quadrant, and at 44e in FIG. 90 for the fourth quadrant. Also, the terminal connecting network 50e of FIG. 95 is changed to the network 57e of FIG. 92 for the second quadrant, the network 58e of FIG. 93 for the third quadrant, and the network 59e of FIG. 94 for the fourth quadrant. Similarly, the terminal connecting network 64e of FIG. 99 is changed to the network 65e of FIG. 96 for the second quadrant, the network 66e of FIG. 97 for the third quadrant, and the network 67e of FIG. 98 for the fourth quadrant.

If chip C is initially picked up by vacuum needle 18 with its collector ball B oriented in the third quadrant as at 238e in FIG. 86, then switch 38e will be closed to energize relay K10 closing its contact K10-1 in FIG. 87, to energize relay K13 through diode CR2 and relay K14 through diode CR3. The chip orientor T-bar is thereby rotated to the third quadrant, then engages chip C, and then re-orients the latter to the programmed "home" position, all in a manner which will be obvious from the above description in connection with the previous illustrative examples.

If at the time of chip ball sensing the chip C is properly held on the end of vacuum needle 18 so that its collector ball B is oriented in one of the four proper angular positions, and if chip C has the correct number of balls B at the proper locations thereon, then only one ball B will be contacted by the feeler arm of one of the switches 36e to 39e inclusive. However, if chip C is defective or is misaligned on vacuum needle 18 in a skewed position or is angularly displaced from one of the four quadrant orientations, then either none or more than one of switches 36e to 39e may be actuated during the chip ball sensing operation. In order to determine if only one ball is detected by one of the switches 36e to 39e there are provided in FIG. 100 a pulse timing switch 68e and a series of relays K18, K19, K20, K21 to be energized thereby through normally-open contact relays K8-2, K9-2, K10-2, K11-2 respectively. Relays K18 to K21 inclusive are maintained energized through their own respective contacts K18-1, K19-1, K20-1, K21-1 and pulse timing switch 69e.

For purposes of illustration, let it be assumed that during the chip ball sensing operation the relay K9 is energized thereby closing normally-open relay contacts K9-2 to energize relay K19 during the "make" condition of pulse timing switch 68e. Relay K19 is maintained energized through its own contacts K19-1 by pulse timing switch 69e. The other relay contacts K8-2, K10-2, K11-2 and K18-1, K20-1, K21-1 remain open.

Relay K22 is thereby energized to indicate an "accept" condition to the effect that one and only one ball was detected during the chip orientation sensing operation, and is maintained energized through its own contacts K22-1 by pulse timing switch 71e. Relay K22 is energized for this "accept" condition by a pulse timing switch 70e through an EXCLUSIVE-OR circuit comprising normally-closed pairs of relay contacts K18-2 and K19-2 in series with two double-throw relay contact pairs K20-2 and K21-2 between pulse timing switch 70e and relay K22. Extending between switch 70e and relay K22 is another series network comprising double-throw relay contact pairs K18-3 and K19-3 and normally-closed relay contact pairs K20-3 and K21-3.

It will be seen that the pulse transmitted by timing switch 70e will pass through the EXCLUSIVE-OR circuit to energize relay K22 if any one, but not more than one, of these pairs of relay contacts is actuated. More specifically, if none of the relays K18 to K21 is energized so that none of the relay contact pairs of the EXCLUSIVE-OR circuit is actuated, both of the series paths between pulse timing switch 70e and relay K22 will remain open so as to prevent the energization of the latter. Similarly, if more than one of the relays K18 to K21 inclusive is energized as a result of more than one chip ball B being sensed by device 35e to close more than one of the switches 36e to 39e, then more than one pair of contacts of the EXCLUSIVE-OR circuit will be actuated. This again maintains both series paths open between pulse timing switch 70e and relay K22 so as to prevent energization of the latter.

The non-energization of relay K22 is the "reject" condition which causes K22-3 in FIG. 101 to remain closed to permit pulse timing switch 74e to transmit a pulse energizing solenoid 75e. Furthermore, relay contacts K22-2 remain closed to permit pulse timing switch 72e to energize relay K23 to indicate a "reject" condition and which is held through its own contacts K23-1. This closes relay contacts K23-2 permitting pulse 70e to energize reject memory relay K24 held through its own contacts K24-1 by pulse timing switch 71e.

If the lower end of vacuum needle 18 is closed off either by the presence of a chip C thereon, or as a result of being clogged by flux or a dirt particle, then the pressure within needle 18 will be lower than atmospheric so as to actuate vacuum detector VD1 in FIG. 101. If the solenoid 75e has been actuated to blow off from needle 18 any chip which may be present thereon, then the actuation of vacuum detector VD1 must indicate that the vacuum is caused by a clogged needle. The energization of reject memory relay K24 closes contacts K24-2 to permit pulse timing switch 72e to transmit a pulse through the actuated vacuum detector VD1, to energize clog needle relay K25 held closed through its own contacts K25-1, thereby stopping the machine to permit removal of the flux or other contaminant from those vacuum needles 18 requiring this service.

In the event that the end of vacuum needle 18 is neither clogged nor closed off by the presence of a chip C thereon, the interior of the needle is then in communication with the atmosphere and vacuum detector VD1 will be actuated to indicate that there is no vacuum present within the needle. This permits pulse timing switch 72e to energize recycle control relay K26 which is maintained closed through its own contacts K26-1 by pulse timing switch 73e. The energization of relay K26 closes relay contacts K26-2 to permit pulse timing switch 70e to energize recycle memory relay K27 which is held closed through its own contacts K27-1 by pulse timing switch 71e. Pulse timing switch 72e then transmits a pulse through closed relay contacts K27-2 to energize recycle relay K28.

Referring again to FIG. 101 energization of relay K28 is maintained through its own contacts K28-1 and closes contacts K28-2 (FIG. 86) to permit pulse timing switch 24e to transmit a pulse which energizes chip positioning one-revolution clutch control relay K7, thereby closing contacts K7-2 permitting pulse timing switch 29e to energize chip positioning one-revolution clutch solenoid 30e, thereby causing the respective chip placement head 17 to proceed through another cycle of operation.

In the event that the next successive vacuum needle 18 of the chip placement head 17 produces the same "no vacuum" condition to initiate another recycle of the head 17, these successive recycles are counted as the head 17 continues its repeated attempts to pick up a chip C on the end of a vacuum needle 18 with the chip aligned so that only one ball B is detected by the chip ball sensing device 35e. However, after a predetermined number of recycles, the machine is shut down in the following manner. Each energization of recycle control relay K26 in FIG. 101 closes relay contacts K26-3 to permit pulse timing switch 76e to transmit a pulse to a successive recycle counter 77e. The latter is provided with a program selector indicated generally at 79e and comprising a selector arm 179e which may connect the output end of a pulse timing switch 78e to the left-hand terminal of a selected one of the normally-closed switches 279e.

Each of the latter remains closed until the counter 77e registers a certain number of recycle operations for the particular chip placement head 17. For example, the uppermost of the switches 279e opens when counter 77e registers two recycles, the next lowermost switch 279e opens when counter 77e registers four recycles, etc. Selector arm 179e is illustrated as having been adjusted to contact the second of the switches 279e, which switch will open when counter 77e registers four successive recycles. In this event, chip positioner functioning relay K102 (associated with the first chip placement head 17) will not be energized, thereby stopping the machine in a manner to be described below.

In the event that vacuum needle 18 is not clogged, relay K25 is not energized so that normally-closed contacts K25-2 in FIG. 101 remain closed. If, furthermore, chip ball sensing device 35e indicates an "accept" condition to energize relay K22 and thereby open contacts K22-2 to prevent energization of reject relay K23 which in turn maintains relay contacts K23-2 in FIG. 100 open to prevent energization of reject memory relay K24. This maintains contacts K24-2 in FIG. 101 open energization of recycle control relay K26 through diode D1 and thereby maintains contacts K26-2 in FIG. 100 open to prevent energization of recycle memory relay K27.

This in turn maintains contacts K27-2 in FIG. 101 open to prevent energization of recycle relay K28 and thereby maintains normally-closed contacts K28-2 closed. Assuming further that the "not-in-manual" switch 80e remains closed, it will thus be seen that pulse timing switch 78e will transmit a pulse through program selector 79e to energize chip placement head No. 1 functioning relay K102. This sends to the system control to be described hereinbelow a signal indicating that the first chip placement head 17 is functioning properly.

As noted above, each of the several chip placement heads 17 is controlled by a separate circuit arrangement as shown in FIGS. 86 to 101 inclusive, so that the electrical control system comprises as many of these circuit arrangements as there are chip placement heads 17. For purposes of illustration, it is assumed that the subject machine has twelve chip placement heads 17. Relay K102 designates proper functioning of the first chip placement head designated No. 1 and the corresponding relays of the other identical circuit arrangements associated with the other eleven chip placement heads 17 will be designated hereinbelow by the reference designations K103 to K113 inclusive.

After each substrate S has been operated upon by all of the chip placement heads 17, it is then carried by conveyor tape 1 to the chip presence sensing station 22 where the substrate is subjected to a test to determine if all of the chips C are positioned thereon. The control circuitry for this chip presence sensing operation is disclosed in FIGS. 102 to 103 and will now be described.

Referring first to FIG. 102, pulse timing switches 81e and 82e are connected in series with a substrate presence sensor switch 83e located one tape index position before chip presence sensing station 22. Sensor switch 83e is provided with a feeler arm which closes the switch in response to engagement with a substrate S present on conveyor tape 1 at that position. This permits pulse timing switches 81e and 82e to energize a chip sensing one-revolution clutch control relay K29 which is maintained closed through its own contacts K29-1 by pulsing timing switch 84e. Relay contacts K29-2 are thereby closed to permit pulse timing switch 85e to energize chip sensing one-revolution clutch solenoid 86e thereby actuating one-revolution clutch 32 (FIG. 4) which in turn actuates chip sensing head 22.

The reference numeral 90e indicates generally a chip presence sensor comprising series of twelve switches 90e-1 to 90e-12 inclusive, each of which may correspond to a particular chip location of substrate S and which will be closed when its respective feeler arm contacts and senses the presence of a chip C at that location. The left-hand terminals of said switches 90e-1 to 90e-12 are joined and connected in series with pulse timing switch 87e and their right-hand terminals are connected to a respective one of the twelve chip present relays K31 to K42 inclusive.

Before the actual chip presence sensing operation, chip presence sensor 90e is first tested to determine if any of the twelve switches 90e-1 to 90e-12 is accidentally jammed in a closed position. For example, suppose that switch 90e-2 is improperly closed before the chip presence sensing operation. In this event, relay K32 is energized to close contacts K32-1 thereby permitting pulse timing switch 96e to transmit a pulse energized chip sensor jammed relay K55 held closed by its own contacts K55-1 through a normally-closed restart switch 155e. This will stop the machine in a manner to be described below.

Whether the circuitry is sensing for a jam in one of the switches 90e-1 to 90e-12 or for the presence of chips C on substrate S is determined by chip sensing control relay K30. When the latter is not energized, then the series of twelve double-throw relay contacts K30-1 to K30-12 inclusive will be in the condition shown in the drawing so that when one or more of the twelve normally-open relay contacts K31-1 to K42-1 inclusive is closed due to jamming of one of the switches, 90e-1 to 90e-12 only the chip sensor jammed relay K55 will be energized but none of the chip present relays K43 to K54 inclusive will be energized.

Relays K43 and K54 are energized only when chip presence sensor 90e senses that the corresponding chips C are present on substrate S. This occurs during the chip sensing operation determined by pulse timing switch 88e which energizes chip sensing control relay K30 to actuate all of the double-throw contacts K30-1 to K30-12 inclusive, thereby placing the twelve chip present relays K43 to K54 inclusive in series with the respective relay contacts K31-1 to K42-1 inclusive. The latter close in accordance with energization of the respective relays K31 to K42 inclusive by closure of the respective switches 90e-1 to 90e-12 in response to the presence of a chip at the respective location on substrate S.

Pulse timing switch 95e thereby permits a pulse through the closed sets of contacts of the group K31-1 to K42-1 inclusive so as to energize those of the chip present relays K43 to K54 inclusive which correspond to locations on substrate S having chips C present thereon. Relays K43 to K54 inclusive are maintained energized for a longer period of time than the actual duration of the physical sensing operation through their own respective relay contacts K43-1 to K54-1 inclusive by pulse timing switch 97e.

Having sensed the pattern of chips C present on substrate S, it is then necessary to determine whether this pattern is an acceptable one; that is, whether the chips actually present constitute all of those that are supposed to be present, or whether one or more chips are missing. For this purpose there is provided a chip sensing program selector shown in FIG. 103 and indicated generally by the reference numeral 99e. This selector comprises a series of twelve switches 99e-1 to 99e-12 inclusive, each adapted when closed to short-circuit a respective one of the twelve normally-open relay contacts K43-2 to K54-2 inclusive, arranged in series between pulse timing switch 98e and accept substrate relay K56. Energization of the latter indicates that the substrate S has thereon the required number of chips C at the sensed locations.

Since the printed-circuit pattern on a substrate S may be designed so as to have any number of transistor or diode chips up to a total of twelve in number, chip sensing program selector 99e is set by manually closing those of the twelve switches 99e-1 to 99e-12 which correspond to sensing locations where no chips are to be positioned for the particular printed-circuit pattern, whereas those switches corresponding to locations where chips are to be positioned are left in the open condition shown in the drawing. For example, assuming that it is desired to sense only the presence of chips in the first two positions corresponding to the switches 90e-1 and 90e-2; that is, to determine the presence of chips designated No. 1 and No. 2, then program selector 99e is set by closing all of the ten switches 99e-3 to 99e-12 while switches 99e-1 and 99e-2 are left in the open condition. Therefore the presence of chip No. 1 and chip No. 2 results in the closure of switches 90e-1 and 90e-2 to energize relays K31 and K32 thereby closing relay contacts K31-1 and K32-1 to permit pulse timing switch 95e to energize relays K43 and K44 through the actuated double-throw relay contacts K30-1 and K30-2 respectively. This causes closure of relay contacts K43-2 and K44-2 in FIG. 103 thereby permitting a pulse from timing switch 98e to flow through these closed contacts and also through the ten closed swiches 99e-3 to 99e-12 inclusive, thereby energizing accept substrate relay K56. If chip No. 1 and/or chip No. 2 is not present during the sensing operation, then switch 99e-1 and/or 99e-2 remains open so that relay K31 and/or K32 is not energized thereby preventing the energization of relay K43 and/or relay K44. This prevents the closure of contacts K43-2 and/or contacts K44–2 thereby opening the series path between pulse timing switch 98e and accept substrate relay K56. Therefore relay K56 is not energized in the event that one or both of the two sensed chips is missing.

Once it is determined that a particular substrate is accepted or rejected by energization or non-energization of accept substrate relay K56, the next consideration is whether rework output head 23 is programmed so as to pick up from the tape either all rejected substrates, or all accepted substrates, or all substrates, or no substrates. Those substrates picked up by rework head 23 are placed in tray carriers whereas those substrates not so picked up continue on conveyor tape 1 toward the discharge end of the latter. Generally, rework head 23 is programmed to remove all rejected substrates from tape 1 and to permit the accepted substrates to continue on tape 1 toward the next apparatus which is usually an oven (not shown) which permanenly joins chip balls B to the substrate land pads P on which they have been placed by the subject chip positioning machine.

Figure 104:
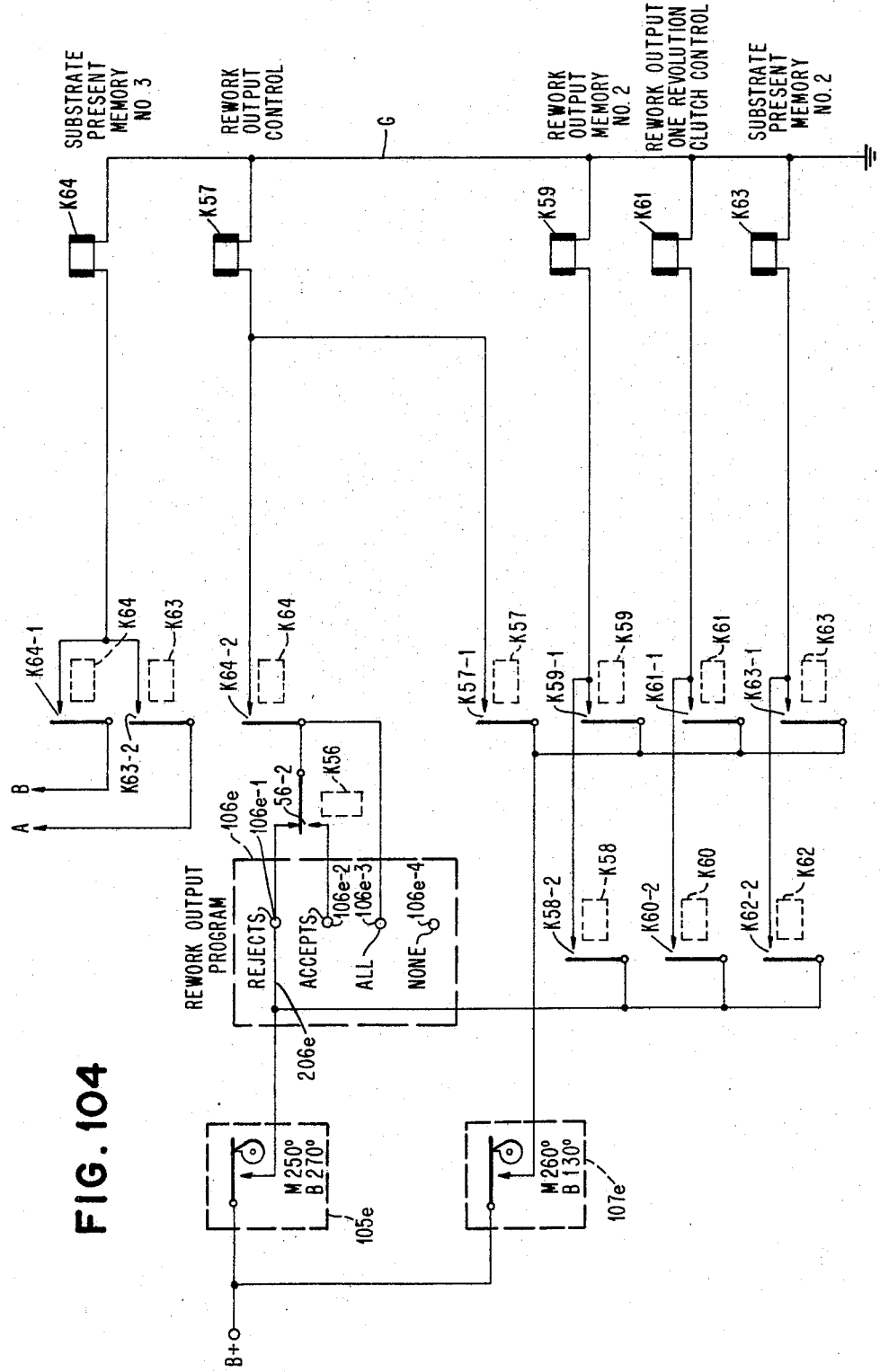
Figure 105:
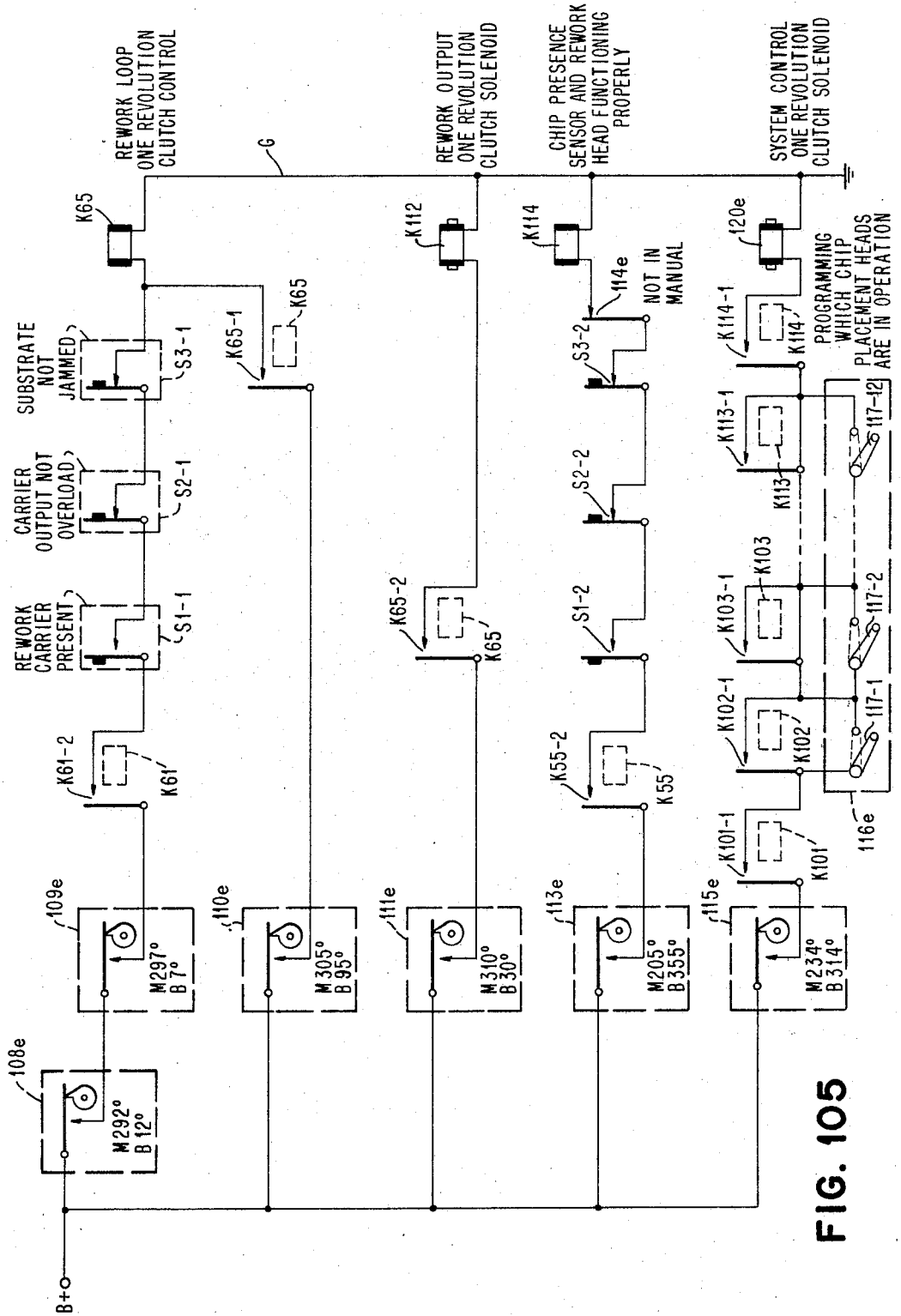

Referring now to FIG. 104 a rework output program selector is indicated generally by the reference numeral 106e and comprises a wiper arm 206e manually movable so as to contact either terminal 106e–1 to program rework output head 23 to remove rejected substrates S from the tape 1, or terminal 106e–2 to remove accepted substrates, or terminal 106e–3 to remove all substrates, or terminal 106e–4 to remove no substrates. Rework head 23 is generally utilized to remove the rejected substrates from conveyor tape 1 and therefore program selector 106e is shown in the drawings with the wiper arm 206e in contact with the "Rejects" terminal 106e–1.

If substrate S is accepted, accept substrate relay K56 will be energized and held by its own contacts K56–1 and pulse timing switch 104e to actuate relay contacts K56–2 thereby opening the circuit between terminal 106e–1 and rework output control relay K57 so that the latter will not be energized by pulse timing switch 105e. However, if substrate S is rejected, then relay K56 will not be energized so that relay contacts K56–2 remain in the condition shown in the drawing to complete a path from pulse timing switch 105e to rework output control K57, thereby energizing the latter.

Rework head 23 is to be actuated only when a substrate S is actually present on tape 1 at the rework station. As noted above, the presence of substrate S is detected by sensor switch 83e at a location one tape index position before chip presence sensing station 22. The information as to whether a substrate is present on tape 1 must therefore be retained in a memory for a duration of four index positions until the sensed substrate, or the portion of the tape where the substrate is missing, eventually reaches rework head 23. This memory function which retains the information as to the presence of a substrate is provided by the circuitry now to be described.

FIG. 106 shows the pulse timing sequence for the several relays constituting the substrate presence memory circuitry. The reference designation of each pulse timing switch (which transmits the pulse to energize each relay for the phase durations indicated by the respective horizontal lines) is placed to the left of each of these lines. Thus, for example, substrate present relay K29 is energized through pulse timing switch 82e from 297 degrees to 7 degrees and by pulse timing switch 84e from 305 degrees to 95 degrees, whereas substrate present memory relay K62 is energized through pulse timing switch 98e from 40 degrees to 60 degrees and through pulse timing switch 104e from 50 degrees to 280 degrees.

Figure 103:
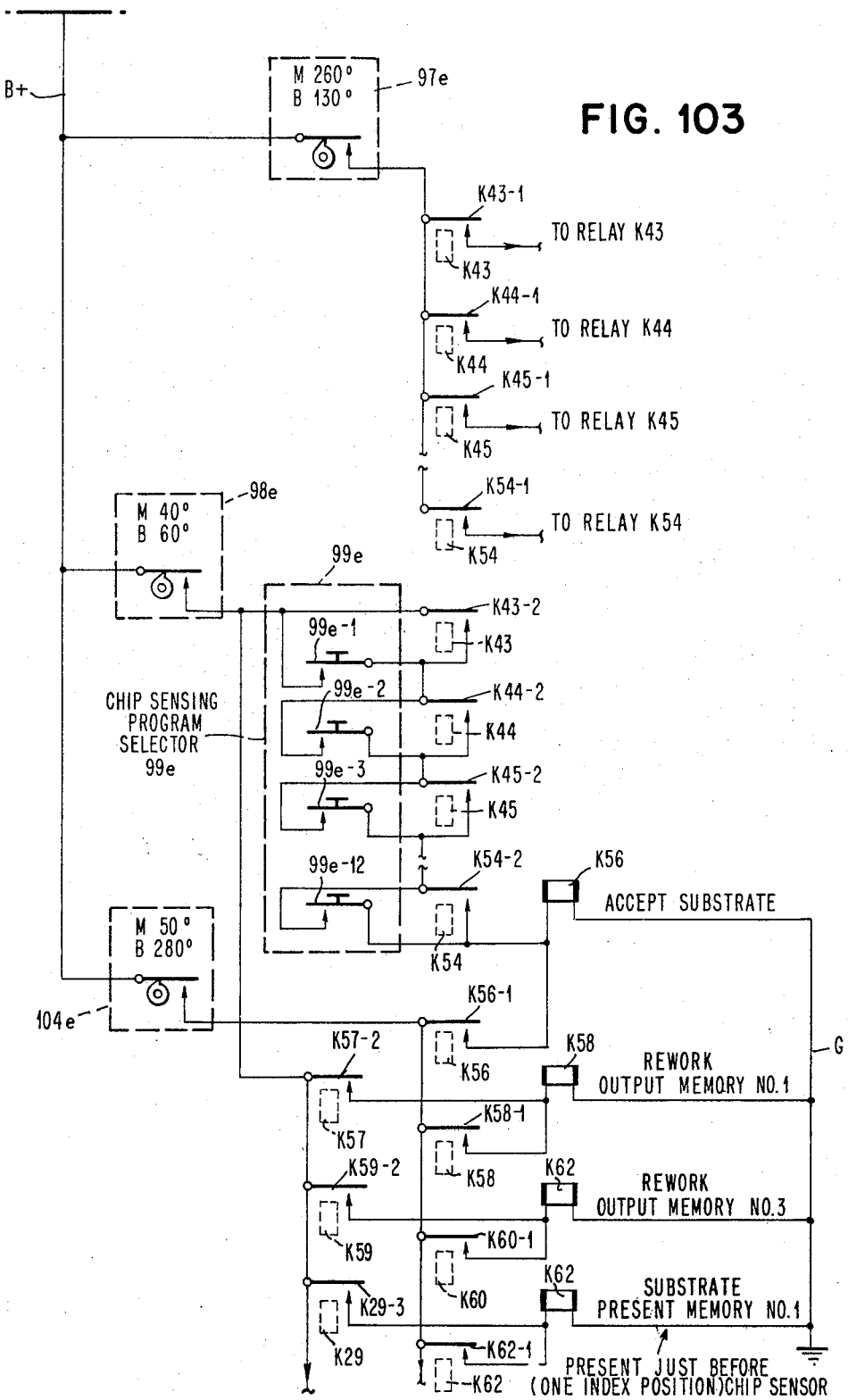

If a substrate S is present so as to close substrate presence sensor switch 83e, relay K29 is energized through system pulse timing switch 81e and pulse timing switch 82e from 290 degrees to 95 degrees as shown in FIG. 102 and also in FIG. 106. Referring now to FIG. 103 energization of relay K29 closes relay contacts K29–3 thereby permitting pulse timing switch 98e to energize a first substrate present memory relay K62 from 40 degrees to 60 degrees.

Referring back to FIG. 103 relay K62 is held energized through its own contacts K62–1 from 50 degrees to 280 degrees thereby closing its contacts K62–2 in FIG. 104 to energize a second substrate present memory relay K63 through pulse timing switch 105e from 250 degrees to 270 degrees. Relay K63 is held energized from 260 degrees to 130 degrees through its own contacts K63–1 and pulse timing switch 107e. This closes relay contact K63–2 to energize a third substrate present memory relay K64 from 40 degrees to 60 degrees through pulse timing switch 98e.

At the same time that relay K63 is being controlled by relay K62, relays K30 to K54 inclusive are being controlled by chip presence sensor 90e. Relays K43 to K54 inclusive are energized at 250 degrees to 270 degrees and are held through their own respective contacts K54–1 from 260 degrees to 130 degrees. Accept relay K56 is energized by pulse timing switch 98e from 40 degrees to 60 degrees and is held energized by its own contacts K56–1 and pulse timing switch 104e from 50 degrees to 280 degrees.

Assuming that rework output program selector 106e is set so that wiper arm 206e is in contact with "rejects" terminal 106e–1 and that the particular substrate in question is a "reject" so that accept relay K56 is not energized and double-throw contacts K56–2 remain in the condition shown in the drawing, then rework output control relay K57 will be energized from 250 degrees to 270 degrees by pulse timing switch 105e. Relay K57 is held energized by its own contacts K57–1 from 260 degrees to 130 degrees through pulse timing switch 107e. Relay K57 when energized indicates that the particular substrate S that was sensed for the presence of chips thereon is to be removed by rework head 23 when the substrate arrives at rework station 23.

This information is transferred to a first rework output memory relay K58 which is energized from 40 degrees to 60 degrees through closed relay contacts K57–2 and pulse timing switch 98e. Relay K58 is held energized from 50 degrees to 280 degrees through its own relay contacts K58–1 and pulse timing switch 104e. This information is then transferred to a second rework output memory relay K59 which is energized from 250 degrees to 270 degrees through relay contacts K58–2 and pulse timing switch 105e. Relay K59 is held energized from 260 degrees to 130 degrees through its own contacts K59–1 and pulse timing switch 107e.

This information is then transferred to a third rework output memory relay K60 which is energized from 40 degrees to 60 degrees through relay contacts K59–2 and pulse timing switch 98e in FIG. 103. Relay K60 is held energized through its own contacts K60–1 and pulse timing switch 104e. The information is then transferred to rework output control relay K61 which is energized from 250 degrees to 270 degrees through relay contacts K60–2 and pulse timing switch 105e. Relay K61 is held energized through its contacts K61–1 and relay 107e from 260 degrees to 130 degrees, thereby closing contacts K61–2 in FIG. 105.

The latter figure shows the circuit which controls the actuation of rework head 23. In series with pulse timing switches 108e and 109e are said contacts K61–2, a normally-open switch S1–1 which is closed in response to the presence of a rework carrier or container to receive the removed substrates, a normally-closed switch S2–1 which remains closed unless the carriers are entirely filled, a normally-closed switch S3–1 which remains closed unless a substrate becomes jammed, and a rework one-revolution clutch control relay K65.

It will thus be seen that if the conditions actuating switches S1–2, S2–1, and S3–1 are normal, and if relay K61 is energized to close contacts K61–2, then relay K65 will be energized and maintained closed through its own contacts K65–1 by pulse timing switch 110e. This closes normally-open relay contacts K65–2 to transmit a pulse from pulse timing switch 111e to rework output one-revolution clutch solenoid 112e thereby actuating one-revolution clutch 33 which in turn actuates rework head 23.

In series with pulse timing switch 113e and normally-closed relay contacts K55–2 are switches S1–2, S2–2 and S3–2 which are actuated in response to the same conditions as the respective switches S1–1, S2–1 and S3–1 described above. The reference numeral 114e indicates a normally-closed switch which remains closed unless the machine is set for manual operation. In series therewith is a relay K114 which when energized indicates that the chip presence sensor 22 and rework heads 23 are functioning properly.

The circuitry described above comprises the controls for the individual operating stations, and the overall system control will now be described. Referring to FIG. 105a system pulse timing switch 115e is in series with the normally-open contacts K101–1 of relay K101, which when energized indicates that loader 5, dimpler 6 and fluxers 9, 15 are functioning properly. Connected thereto are the twelve normally-open relay contacts K102–1 to K113–1 inclusive of a chip head program selector indicated generally at 116e. Each of the latter relay contacts closes when its corresponding relay is energized to indicate that a respective one of the twelve chip placement heads 17 is functioning properly.

In parallel with each of these relay contacts K102–1 to K113–1 inclusive is a respective one of the series of twelve switches 117–1 to 117–12 inclusive which are left open when their respective chip placement heads 17 are in operation but which are manually closed when their respective heads 17 are to remain inoperative. In series with a program selector 116e are normally-open relay contacts K114–1 which close when relay K114 is energized to indicate that chip presence sensor 22 and rework head 23 are functioning properly.

Connected to K114–1 is a system control one-revolution clutch solenoid 120e which when energized causes the entire machine to proceed through the next cycle of operation. In view of the series connection of the several relay contacts between system pulse timing switch 115e and system control one-revolution clutch solenoid 120e the circuit performs a logical "AND" function in that solenoid 120e is not energized, and therefore the machine does not undergo the next cycle of operation, unless all of the relays K101 to K114 inclusive are either energized or shorted by switches 117–1 to 117–12 so as to indicate that loader 5, dimpler 6, flux dispenser 9 and flux flattener 15, those chip placement heads 17 that are programmed to be in operation, chip presence sensor 22 and rework head 23 have all functioned properly. In this event, solenoid 120e is energized to initiate the next cycle of operation of the machine. That is, one-revolution clutch 50 (FIG. 4) is actuated thereby to open all of the substrate clamps, index the conveyor tape to advance each substrate one index position, and close the clamps. Each operating station then performs its next cycle of operation.

What is claimed is:

1. A chip positioning machine for assembling semiconductor chips to printed-circuit substrates, said machine comprising:
   a chip placement station.
   means for conveying a substrate to said station.
   means for aligning said substrate at a predetermined location at said station.
   a chip supply means.
   means for selecting a chip from said supply means.
   means for displacing said selected chip to a predetermined orientation, and
   means for placing said oriented chip on said aligned substrate.

2. A chip positioning machine for automatically assembling semiconductor chips to printed-circuit substrates, said machine comprising:
   a plurality of chip placement stations,
   conveyor means for conveying a series of substrates to said stations in sequence and for approximately positioning one of said substrates at each respective one of said stations,
   clamping means for accurately aligning said approximately positioned substrates at predetermined precise locations at said respective stations,
   supply means for semiconductor chips each having contact element on a face thereof,
   means for successively dispensing chips from said supply means with said faces thereof disposed in a predetermined direction,
   vacuum needle means for successively picking up said dispensed chips,
   means for sensing the angular orientation of each of said chips on said needle means,
   means for rotating said sensed chips to a predetermined angular orientation, and
   means for moving said respective needle means toward said aligned substrates to place said oriented chips thereon.

3. A chip positioning machine for assembling semiconductor chips to the conductive lands of printed-circuit substrates, said machine comprising:
   means for dimpling the lands of a substrate,
   means for applying flux to said dimpled lands,
   means for flattening said flux,
   a chip placement station,
   means for conveying said substrate to said station,
   means for aligning said substrate at a predetermined location at said station,
   chip supply means,
   means for dispensing a chip from said supply means,
   means for angularly displacing said dispensed chip to a predetermined orientation, and
   means for placing said oriented chip onto the fluxed lands of said aligned substrate.

4. A chip positioning machine for automatically assembling semiconductor chips to the conductive lands of printed-circuit substrates, said machine comprising:
   a plurality of chip placement stations,
   a conveyor for carrying a series of substrates to said stations in sequence,
   supply means for semiconductor chips each having contact elements on a face thereof,
   means for successively dispensing chips from said supply means with said faces thereof disposed in a predetermined direction,
   vacuum needle means for successively picking up said dispensed chips,
   means for sensing the angular orientation of each of said chips on said needle means,
   means for rotating said sensed chips to a predetermined angular orientation on said needle means, and
   means for moving said respective needle means toward said substrates to place said oriented chips onto the lands thereof,
   means for sensing the presence of chips on each substrate, and
   means for removing from the conveyor those substrates which do not have the required number of chips thereon.

5. A chip positioning machine for automatically assembling semiconductor chips to the conductive lands of printed-circuit substrates, said machine comprising:
   means for dimpling the lands of a substrate,
   means for applying flux to said dimpled lands,
   means for flattening said flux,
   a plurality of chip placement stations,
   a conveyor for carrying a series of substrates to said stations in sequence,
   supply means for semiconductor chips each having contact elements on a face thereof, means for successively dispensing chips from said supply means with said faces thereof disposed in a predetermined direction,
vacuum needle means for successively picking up said dispensed chips,
means for sensing the angular orientation of each of said chips on said needle means,
means for rotating said sensed chips to a predetermined angular orientation on said needle means, and
means for moving said respective needle means toward said substrates to place said oriented chips onto the lands thereof.

6. A chip positioning machine for automatically assembling semiconductor chips to the conductive lands of printed-circuit substrates, said machine comprising:
means for dimpling the lands of a substrate,
means for applying flux to said dimpled lands,
means for flattening said flux,
a plurality of chip placement stations,
a conveyor for carrying a series of substrates to said stations in sequence,
supply means for semiconductor chips,
means for successively dispensing chips from said supply means with said faces thereof disposed in a predetermined direction,
holding means for successively picking up said dispensed chips,
means for sensing the angular orientation of each of said chips on said holding means,
means for rotating said sensed chips to a predetermined angular orientation on said holding means, and
means for moving said respective holding means toward said substrates to place said oriented chips onto the fluxed lands thereof.

7. A chip positioning machine for automatically assembling semiconductor chips to the conductive lands of printed-circuit substrates, said machine comprising:
means for dimpling the lands of a substrate,
means for applying flux to said dimpled lands,
means for flattening said flux,
a plurality of chip placement stations,
a conveyor for carrying a series of substrates to said stations in sequence and for approximately positioning a substrate at each respective one of said stations,
means for mounting the substrates on said conveyor for relative movement of the substrates with respect to the conveyor,
clamping means for accurately aligning each of said approximately positioned substrates at a predetermined precise location at said respective station while said substrates are on said conveyor,
supply means for semiconductor chips each having contact elements on a face thereof,
means successively dispensing chips from said supply means with said faces thereof disposed in a predetermined direction,
vacuum needle means for successively picking up said dispensed chips,
means for sensing the angular orientation of each of said chips on said needle means,
means for rotating said sensed chips to a predetermined angular orientation on said needle means,
means for moving said respective needle means toward said aligned substrates to place said oriented chips onto the fluxed lands thereof,
means for sensing the presence of chips on each substrate, and
means for removing from the conveyor those substrates which do not have the required number of chips thereon.

8. A chip positioning machine for assembling semiconductor chips to printed-circuit substrates, said machine comprising:
a chip placement station,
a conveyor movable to carry a substrate to said station,
means for stopping the conveyor when the substrate arrives at said station,
means for aligning said substrate at a predetermined location at said station,
chip supply means,
means for dispensing a chip from said supply means,
means for displacing said dispensed chip to a predetermined orientation,
means for positioning said oriented chip onto said aligned substrate,
means to detect whether said positioning means has successfully performed its function,
and means responsive to the faiure of the positioning means to perform its function for maintaining the conveyor stationary and for recycling said positioning means.

9. A chip positioning machine for assembling semiconductor chips to printed-circuit substrates, said machines comprising:
means for applying flux to the lands of a substrate,
a chip placement station,
means for conveying said substrate to said station,
means for aligning said substrate at a predetermined location at said station,
chip supply means,
means for dispensing a chip from said supply means,
suction means for holding said dispensed chip,
means for displacing said held chip to a predetermined orientation on said suction means,
means for moving said suction means toward said aligned substrate to place said chip thereon,
means to detect the absence of a chip on said suction means, and
means responsive to the absence of a chip on said suction means to deactivate said moving means and thereby prevent said suction means from contacting said flux.

10. A chip positioning machine for automatically assembling semiconductor chips to printed-circuit substrates, said machine comprising:
a chip positioning head including a rotatable turret spider,
a plurality of vacuum needle means mutually spaced on said spider,
means for angularly indexing said spider to move said needle means successively to a sequence of stations,
a first of said stations inlcuding a chip pickup location,
chip supply means,
means for dispensing a chip from said supply to said pickup location,
means for moving one of said needle means to said dispensed chip,
means for applying vacuum to said needle means to cause said dispensed chip to adhere thereto,
sensing means at a second of said stations for detecting the angular orientation of said chip adhered to said needle means,
orienting means at a third of said stations for angularly displacing said chip to a predetermined orientation while the chip adheres to said needle means,
a conveyor for carrying a substrate to a fourth of said stations,
clamping means for aligning said substrate at a predetermined location at said fourth station
means for moving said needle means to position said adhered chip adjacent to said substrate, and
means for deactivating said vacuum applying means to release said chip from said needle means and to permit said chip to adhere to said substrate.

11. A chip positioning machine for automatically assembling semiconductor chips to printed-circuit substrates, said machine comprising:
a chip positioning head including a rotatable turret member, a plurality of holding means mutually spaced on said member, means for angularly indexing said members to move said holding means successively to a sequence of stations, a first of said stations including a chip pickup location, chip supply means, means for dispensing a chip from said supply means to said pickup location, means for moving one of said holding means to said dispensed chip to pick up the latter, sensing means at a second of said stations for detecting the angular orientation of said chip adhered to said holding means, orienting means at a third of said stations for angularly displacing said chip to a predetermined orientation while the chip adheres to said holding means, a conveyor for carrying a substrate to a fourth of said stations, and means for moving said holding means to position said chip onto said substrate.

12. A chip positioning machine for automatically assembling semiconductor chips to printed-circuit substrates, said machine comprising:

a chip positioning head including a rotatable turret member, a plurality of vacuum needle means mutually spaced on said member, means for angularly indexing said members to move said needle means successively to a sequence of stations, a first of said stations including a chip pickup location, chip supply means, means for dispensing a chip from said supply means to said pickup location, means for moving one of said needle means to said dispensed chip, means for applying vacuum to said needle means to cause said dispensed chip to adhere thereto, a conveyor for carrying a substrate to a fourth of said stations, clamping means for aligning said substrate at a predetermined location at said fourth station, means for moving said needle means to position said adhered chip adjacent to said substrate, and means for deactivating said vacuum applying means to release said chip from said needle means and to permit said chip to adhere to said substrate.

13. A chip positioning machine for automatically assembling semiconductor chips to printed-circuit substrates, said machine comprising:

a plurality of chip positioning stations each adapted to to place a chip at a different predetermined position on a substrate, conveyor means for successively carrying a series of substrates to said stations in sequence, each of said stations having associated therewith:

clamping means for aligning a substrate at a predetermined location at the respective station, chip dispensing means, orienting means for rotating a dispensed chip to a predetermined angular orientation corresponding to the printed-circuit configuration of said position on the substrate, positioning means for placing said oriented chip onto said substrate at said predetermined position, and control means for activating said various means associated with each of said stations in timed relation with said means of the other stations.

14. A chip positioning machine for automatically assembling semiconductor chips to printed-circuit substrates, said machine comprising:

a plurality of chip positioning stations each adapted to to place a chip at a different predetermined position on a substrate, conveyor means for successively carrying a series of substrates to said stations in sequence, each of said stations having associated therewith:

clamping means for aligning a substrate at a predetermined location at the respective station, chip dispensing means, positioning means for placing said oriented chip onto said subtrate at said predetermined position, and control means for activating said various means associated with each of said stations in timed relation with said means of the other stations.

15. A chip positioning machine for assembling semiconductor chips to the conductive lands of printed-circuit substrates, said machine comprising:

means for applying flux to the lands of a substrate, a chip placement station, means for conveying said substrate to said station, means for aligning said substrate at a predetermined location at said station, chip supply means, means for dispensing a chip from said supply means, means for angularly displacing said dispensed chip to a predetermined orientation, and means for placing said oriented chip onto the fluxed lands of said aligned substrate.

16. A chip positioning machine for automatically assembling semiconductor chips to printed-circuit substrates, said machine comprising:

a plurality of chip placement stations, conveyor means for conveying a series of substrates to said stations in sequence and for approximately positioning one of said substrates at each respective one of said stations, supply means for semiconductor chips, means for successively dispensing chips from said supply means, holding means for successively picking up said dispensed chips, means for sensing the angular orientation of each of said chips on said holding means, means for rotating said sensed chips to a predetermined angular orientation, and means for moving said respective holding means toward said aligned substrates to place said oriented chips thereon.

17. A machine for positioning elements onto assemblies, said machine comprising:

an element placement station, means for conveying an assembly to said station, means for aligning said assembly at a predetermined location at said station, an element supply means, means for selecting an element from said supply means, means for displacing said selected element to a predetermined orientation, and means for placing said oriented element on said aligned assembly.

18. A machine for positioning elements onto assemblies, said machine comprising:

a plurality of element placement stations, conveyor means for conveying a series of assemblies to said stations in sequence and for approximately positioning one of said assemblies at each respective one of said stations, clamping means for accurately aligning said approximately positioned assemblies at predetermined precise locations at said respective stations, supply means for elements each having contact elements on a face thereof, means for successively dispensing elements from said supply means with said faces thereof disposed in a predetermined direction, means for successively holding said dispensed elements, means for sensing the angular orientation of each of said elements on said holding means, means for rotating said sensed elements to a predetermined angular orientation, and means for moving said respective holding means toward said aligned assemblies to place said oriented elements thereon.

19. A machine for positioning elements onto assemblies, said machine comprising:
an element placement station,
means for conveying an assembly to said station,
an element supply means,
means for dispensing an element from said supply means,
means for angularly displacing said dispensed element to a predetermined orientation, and
means for placing said oriented element onto said assembly.

20. A machine for automatically positioning elements onto assemblies, said machine comprising:
a plurality of element placement stations,
a conveyor for carrying a series of assemblies to said stations in sequence,
supply means for elements each having contact elements on a face thereof,
means for successively dispensing elements from said supply means with said faces thereof disposed in a predetermined direction,
holding means for successively holding said dispensed elements,
means for sensing the angular orientation of each of said elements on said holding means,
means for rotating said sensed elements to a predetermined angular orientation on said holding means, and
means for moving said respective holding means toward said assemblies to place said oriented elements onto the lands thereof,
means for sensing the presence of elements on each assembly, and
means for removing from the conveyor those assemblies which do not have the required number of elements thereon.

21. A machine for automatically positioning elements onto assemblies, said machine comprising:
a plurality of element placement stations,
a conveyor for carrying a series of assemblies to said stations in sequence,
supply means for elements each having contact elements on a face thereof,
means for successively dispensing elements from said supply means with said faces thereof disposed in a predetermined direction,
holding means for successively holding said dispensed elements,
means for sensing the angular orientation of each of said elements on said holding means,
means for rotating said sensed elements to a predetermined angular orientation on said holding means, and
means for moving said respective holding means toward said assemblies to place said oriented elements thereon.

22. A machine for automatically positioning elements onto assemblies, said machine comprising:
a plurality of element positioning stations each adapted to place an element at a different predetermined position on an assembly,
conveyor means for successively carrying a series of assemblies to said stations in sequence,
each of said stations having associated therewith,
clamping means for aligning an assembly at a predetermined location at the respective station,
element dispensing means, orienting means for rotating a dispensed element to a predetermined angular orientation corresponding to the printed-circuit configuration of said position on the assembly,
positioning means for placing said oriented element onto said assembly at said predetermined position, and
control means for activating said various means associated with each of said stations in timed relation with said means of the other stations.

23. A machine for automatically positioning elements onto assemblies, said machine comprising:
a plurality of element placement stations,
conveyor means for conveying a series of assemblies to said stations in sequence and for approximately positioning one of said assemblies at each respective one of said stations,
supply means for elements,
means for successively dispensing elements from said supply means,
holding means for successively picking up said dispensed elements,
means for sensing the angular orientation of each of said elements on said holding means,
means for rotating said sensed elements to a predetermined angular orientation, and
means for moving said respective holding means toward said aligned assemblies to place said oriented elements thereon.

24. A chip positioning machine for automatically assembling semiconductor chips to the conductive lands of printed circuit substrates, said machine comprising:
means for dumping the lands of a substrate,
means for applying flux to said dimpled lands,
means for flattening said flux,
a plurality of chip placement stations,
a conveyor for carrying a series of said fluxed substrates to said stations in sequence,
chip supply means,
means for selecting chips from said supply means,
means for displacing each of said selected chips to a predetermined orientation,
means for placing said oriented chips onto the fluxed lands of said substrate,
means for detecting whether said placement means is carrying a chip,
means responsive to the absence of a chip on said placement means for recycling said orienting and placement means while maintaining the substrate at said station,
means for sensing the presence of chips on each substrate, and
means for removing from the conveyor those substrates which do not have the required number of chips thereon.

References Cited
UNITED STATES PATENTS

| | | | |
|---|---|---|---|
| 2,494,474 | 1/1949 | Fermanian et al. | 219—85 |
| 2,915,201 | 12/1959 | Calehuff et al. | 214—1 |
| 3,056,317 | 10/1962 | Huber et al. | 228—6 |
| 3,083,291 | 3/1963 | Soffa et al. | 219—138 |
| 3,165,818 | 1/1965 | Soffa et al. | 29—203 |
| 3,314,296 | 4/1967 | Clark et al. | 74—24 |
| 2,970,370 | 2/1961 | Weaver et al. | 29—203 X |
| 3,134,167 | 5/1964 | Diekhoff | 29—203 |
| 3,337,941 | 8/1967 | Drop | 228—6 X |
| 3,344,900 | 10/1967 | Drop | 198—33 |
| 3,367,476 | 2/1968 | Aronstein et al. | |

THOMAS H. EAGER, Primary Examiner

U.S. Cl. X.R.

29—208, 211; 228—6

Disclaimer 3,499,203.—*Kendall Clark*, Poughkeepsie, *George C. Beck*, Fishkill, *Eugene J. Creighton* and *Frank L. De Turris*, Wappingers Falls, *Joseph G. Drop* and *Jean J. L. Godat*, Poughkeepsie, *Arne H. Larsen*, Wappingers Falls, *Thomas J. Rajac*, *George R. Santillo, Jr.*, and *Walter J. Schuelke*, Poughkeepsie, N.Y. CHIP POSITIONING MACHINE. Patent dated Mar. 10, 1970. Disclaimer filed Dec. 12, 1969, by the assignee, *International Business Machines Corporation*.

Hereby disclaims the terminal portion of the term of the patent subsequent to Nov. 12, 1985.

[*Official Gazette August 18, 1970.*]